(12) United States Patent
Kimura et al.

(10) Patent No.: US 10,374,855 B2
(45) Date of Patent: Aug. 6, 2019

(54) APPARATUS AND METHOD

(71) Applicant: SONY CORPORATION, Tokyo (JP)

(72) Inventors: Ryota Kimura, Tokyo (JP); Kazuyuki Shimezawa, Chiba (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/060,767

(22) PCT Filed: Dec. 2, 2016

(86) PCT No.: PCT/JP2016/085867
§ 371 (c)(1),
(2) Date: Jun. 8, 2018

(87) PCT Pub. No.: WO2017/115609
PCT Pub. Date: Jul. 6, 2017

(65) Prior Publication Data
US 2018/0359123 A1 Dec. 13, 2018

(30) Foreign Application Priority Data
Dec. 28, 2015 (JP) ................. 2015-256714

(51) Int. Cl.
*H03H 7/30* (2006.01)
*H04L 27/26* (2006.01)
(Continued)

(52) U.S. Cl.
CPC .......... *H04L 27/2607* (2013.01); *H04L 5/001* (2013.01); *H04L 5/0035* (2013.01);
(Continued)

(58) Field of Classification Search
CPC ... H04L 27/2607; H04L 5/001; H04L 5/0055; H04L 25/03343; H04L 25/03834; H04W 76/27; H04W 28/065; H04W 28/18
(Continued)

(56) References Cited

U.S. PATENT DOCUMENTS

| 2006/0013332 | A1 | 1/2006 | Rayburn | |
| 2009/0296833 | A1* | 12/2009 | Sawahashi | H04L 1/0007 375/260 |
| 2010/0222063 | A1* | 9/2010 | Ishikura | H04B 7/024 455/450 |

FOREIGN PATENT DOCUMENTS

| JP | 2015-164257 A | 9/2015 |
| WO | 2015/129873 A1 | 9/2015 |

OTHER PUBLICATIONS

International Search Report and Written Opinion of PCT Application No. PCT/JP2016/085867, dated Feb. 21, 2017, 07 pages of ISRWO.

* cited by examiner

*Primary Examiner* — Helene E Tayong
(74) *Attorney, Agent, or Firm* — Chip Law Group

(57) ABSTRACT

There is provided an apparatus including a communication unit that performs radio communication and a control unit that controls transmission from the communication unit to a terminal by narrowing at least one of a symbol interval of a complex symbol sequence in a time direction and a subcarrier interval of the complex symbol sequence in a frequency direction, the complex symbol sequence being converted from a bit sequence, the symbol interval and the subcarrier interval being set on a basis of a predetermined condition.

19 Claims, 50 Drawing Sheets

(51) Int. Cl.
  *H04W 28/18* (2009.01)
  *H04W 72/04* (2009.01)
  *H04L 5/00* (2006.01)
  *H04W 76/27* (2018.01)
  *H04L 25/03* (2006.01)
  *H04W 28/06* (2009.01)

(52) U.S. Cl.
  CPC .......... *H04L 5/0053* (2013.01); *H04L 5/0055* (2013.01); *H04L 25/03343* (2013.01); *H04L 25/03834* (2013.01); *H04L 27/26* (2013.01); *H04W 28/065* (2013.01); *H04W 28/18* (2013.01); *H04W 72/04* (2013.01); *H04W 76/27* (2018.02)

(58) Field of Classification Search
  USPC ........................................................ 375/229
  See application file for complete search history.

Subcarrier spacing $\Delta f$ [Hz]
<= Inverse of symbol period $1/T == \phi (1/T)$ [1/sec]
$(0 < \phi <= 1)$

APPARATUS AND METHOD

CROSS REFERENCE TO RELATED APPLICATIONS

This application is a U.S. National Phase of International Patent Application No. PCT/JP2016/085867 filed on Dec. 2, 2016, which claims priority benefit of Japanese Patent Application No. JP 2015-256714 filed in the Japan Patent Office on Dec. 28, 2015. Each of the above-referenced applications is hereby incorporated herein by reference in its entirety.

TECHNICAL FIELD

The present disclosure relates to an apparatus and a method.

BACKGROUND ART

In the conventional modulation schemes applied in standards such as LTE (Long Term Evolution)/LTE-A (Advanced), the symbol intervals of symbols modulated in accordance with PSK/QAM or the like are set in accordance with the Nyquist criterion such that temporally continuous symbols do not interfere with each other (i.e., no inter-symbol interference occurs). This allows a reception apparatus side to demodulate and decode reception signals with no special signal processing but attendant processing such as orthogonal frequency-division multiplexing (OFDM) or multiple-input and multiple-output (MIMO). However, from the perspective of frequency use efficiency, it is difficult to narrow the symbol intervals of the modulated symbols beyond conditions of the symbol intervals, so that the upper limit is defined in accordance with the given frequency bandwidth, the number of MIMO antennas, and the like. It is considered to extend the frequency band of the communication system from the existing microwave band to the submillimeter-wave band, the millimeter-wave band, or the like, which is higher frequency. However, the limit will be reached some day because of limited frequency band resources. In addition, MIMO also has a physical restriction as to the installation of antennas in an apparatus, so that this will also reach the limit.

Under such circumstances, the technology referred to as faster-than-Nyquist (FTN) has attracted attention. For example, Patent Literature 1 discloses FTN. FTN is a modulation scheme and a transmission scheme which narrow the symbol intervals of modulated symbols beyond the above-described conditions of the symbol intervals to attempt to improve frequency use efficiency. Although inter-symbol interference occurs between temporally continuous symbols in the process of modulation, and a reception apparatus side requires special signal processing to receive FTN signals, such a configuration makes it possible to improve frequency use efficiency in accordance with the way to narrow symbol intervals.

CITATION LIST

Patent Literature

Patent Literature 1: US 2006/0013332A

DISCLOSURE OF INVENTION

Technical Problem

Meanwhile, in the case where FTN is applied, as described above, inter-symbol interference occurs between temporally continuous symbols. Accordingly, signal processing is necessary to allow a reception apparatus side to receive FTN signals, and the signal processing can be a factor that increases the load on the reception apparatus side.

Accordingly, the present disclosure proposes an apparatus and a method capable of adaptively adjusting a symbol interval or a subcarrier interval in accordance with a communication environment.

Solution to Problem

According to the present disclosure, there is provided an apparatus including: a communication unit configured to perform radio communication; and a control unit configured to perform control such that transmission is performed from the communication unit to a terminal by narrowing at least one of a symbol interval of a complex symbol sequence in a time direction and a subcarrier interval of the complex symbol sequence in a frequency direction, the complex symbol sequence being converted from a bit sequence, the symbol interval and the subcarrier interval being set on a basis of a predetermined condition.

In addition, according to the present disclosure, there is provided a method including: performing radio communication; and performing, by a processor, control such that radio transmission is performed from the communication unit to a terminal by narrowing at least one of a symbol interval of a complex symbol sequence in a time direction and a subcarrier interval of the complex symbol sequence in a frequency direction, the complex symbol sequence being converted from a bit sequence, the symbol interval and the subcarrier interval being set on a basis of a predetermined condition.

Advantageous Effects of Invention

According to the present disclosure, as described above, it is possible to provide an apparatus and a method capable of adaptively adjusting a symbol interval or a subcarrier interval in accordance with a communication environment.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1A:
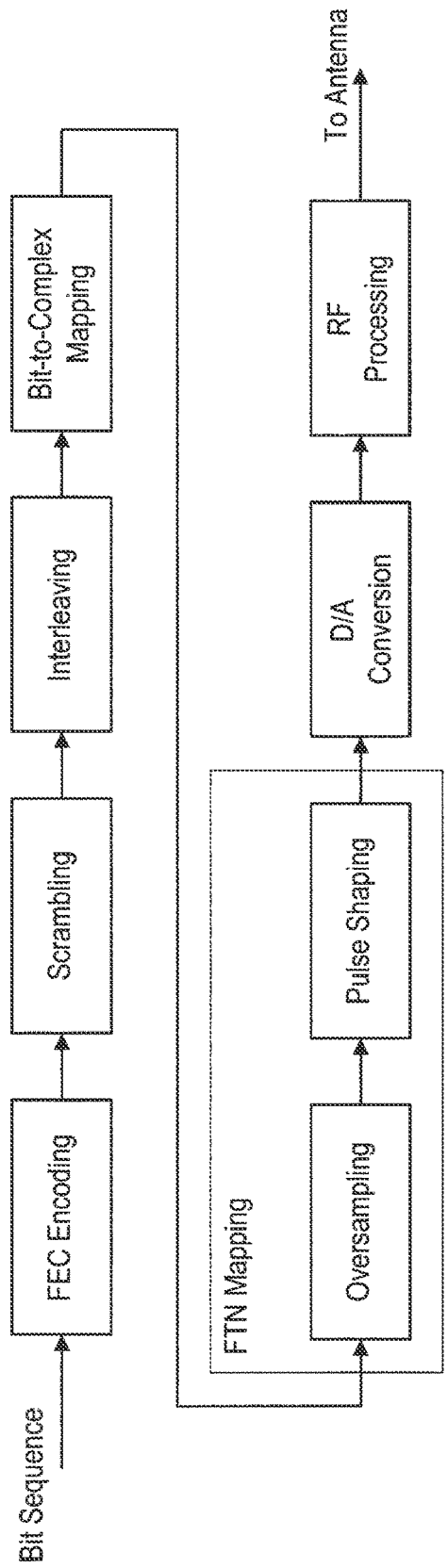
FIG. 1A is an explanatory diagram for describing an example of transmission processing in a case where FTN is employed.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. FTN
2. Technical Problem
3. Schematic Configuration of System
4. Configuration of Each Apparatus
4.1. Configuration of Base Station
4.2. Configuration of Terminal Apparatus
5. Technical Features
6. Modifications
6.1. Modification 1: Example of Control of Prefix
6.2. Modification 2: Example of Control according to Moving Speed of Apparatus
6.3. Modification 3: Extension to Multi-carrier Modulation
6.4. Modification 4: Introduction of Compression in Time Direction and Compression in Frequency Direction
7. Application Examples
7.1. Application Example regarding Base Station
7.2. Application Example regarding Terminal Apparatus
8. Conclusion

1. FTN

First, with reference to FIGS. 1 and 2, the overview of FTN will be described. In the conventional modulation schemes applied in standards such as LTE/LTE-A, the symbol intervals of symbols modulated in accordance with PSK/QAM or the like are set in accordance with the Nyquist criterion such that temporally continuous symbols do not interfere with each other (i.e., no inter-symbol interference occurs). This allows a reception apparatus side to demodulate and decode reception signals without performing special signal processing (except for attendant processing such as OFDM or MIMO. However, from the perspective of frequency use efficiency, it is difficult to narrow the symbol intervals of the modulated symbols beyond conditions of the symbol intervals, so that the upper limit is defined in accordance with the given frequency bandwidth, the number of MIMO antennas, and the like. It is considered to extend the frequency band of the communication system from the existing microwave band to the submillimeter-wave band, the millimeter-wave band, or the like, which is higher frequency. However, the limit will be reached some day because of limited frequency band resources. In addition, MIMO also has a physical restriction as to the installation of antennas in an apparatus, so that this will also reach the limit.

Under such circumstances, the technology referred to as faster-than-Nyquist (FTN) has attracted attention. FTN is a modulation scheme/transmission scheme which narrows the symbol intervals of modulated symbols beyond the above-described conditions of the symbol intervals to attempt to improve frequency use efficiency. Although inter-symbol interference occurs between temporally continuous symbols, and a reception apparatus side requires special signal processing to receive FTN signals, such a configuration makes it possible to improve frequency use efficiency in accordance with the way to narrow symbol intervals. Note that FTN has a considerable advantage that it is possible to improve frequency use efficiency without extending a frequency band or increasing an antenna.

For example, FIG. 1A is an explanatory diagram for describing an example of transmission processing in the case where FTN is employed. Note that, as illustrated in FIG. 1A, even in the case where FTN is employed, the processing up to adding an error correction code to and performing PSK/QAM modulation on a bit sequence is similar to the conventional transmission processing applied in the standards such as LTE/LTE-A. In addition, in the case where FTN is employed, as illustrated in FIG. 1A, FTN mapping processing is performed on the bit sequence on which PSK/QAM modulation has been performed. In the FTN mapping processing, over-sampling processing is performed on the bit sequence, and then a waveform shaping filter adjusts the symbol intervals beyond a Nyquist criterion. Note that, the bit sequence on which FTN mapping processing has been performed is subjected to digital/analog conversion, radio frequency processing and the like, and sent to an antenna.

Figure 1B:
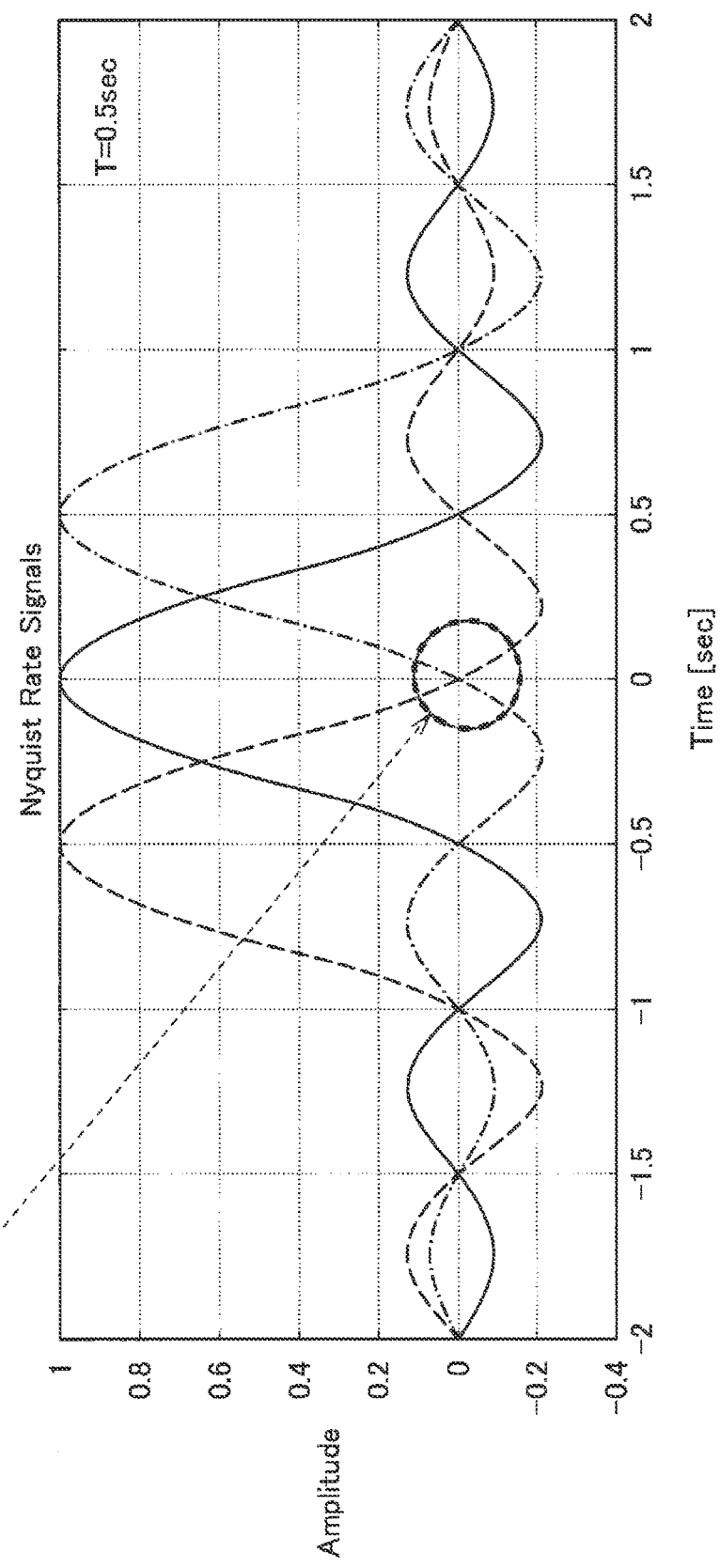
FIG. 1B is an explanatory diagram for describing an example of a waveform shaping filer output of a Nyquist rate signal.
Figure 1C:
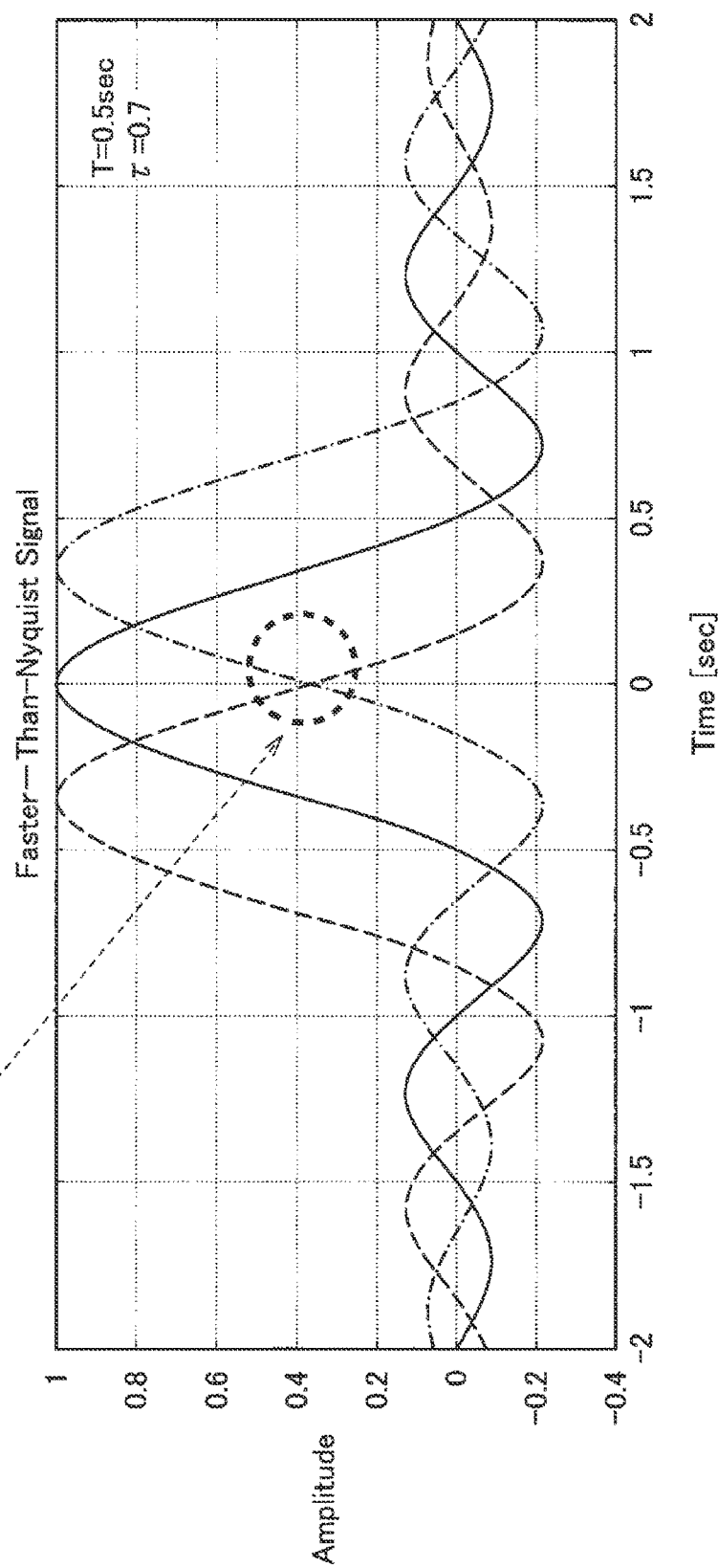
FIG. 1C is an explanatory diagram for describing an example of a waveform shaping filter output of a Faster-Than-Nyquist signal.

Comparison between waveform shaping filter outputs of a Nyquist rate signal and a Faster-Than-Nyquist signal is illustrated in each of FIGS. 1B and 1C. A conventional Nyquist rate signal is designed so that inter-symbol interference (ISI) does not occur since temporally continuous symbols are subjected to zero cross at a sample timing. On the other hand, in FTN, an effective symbol rate is increased by narrowing a symbol interval with a variable (herein referred to as a time compression coefficient t). In the example of FIG. 1C, a case of t=0.7 is illustrated. Inter-symbol interference is contained in an FTN signal itself since temporally continuous symbols are not subjected to zero cross even at a sample timing unlike a Nyquist rate signal.

Herein, from FIGS. 1B and 1C, it is necessary to be careful that a symbol length is the same between a Nyquist rate signal and an FTN signal. That is, in Faster-Than- Nyquist, the symbol length is not shortened (a signal bandwidth is not enlarged) to increase a speed.

Figure 2:
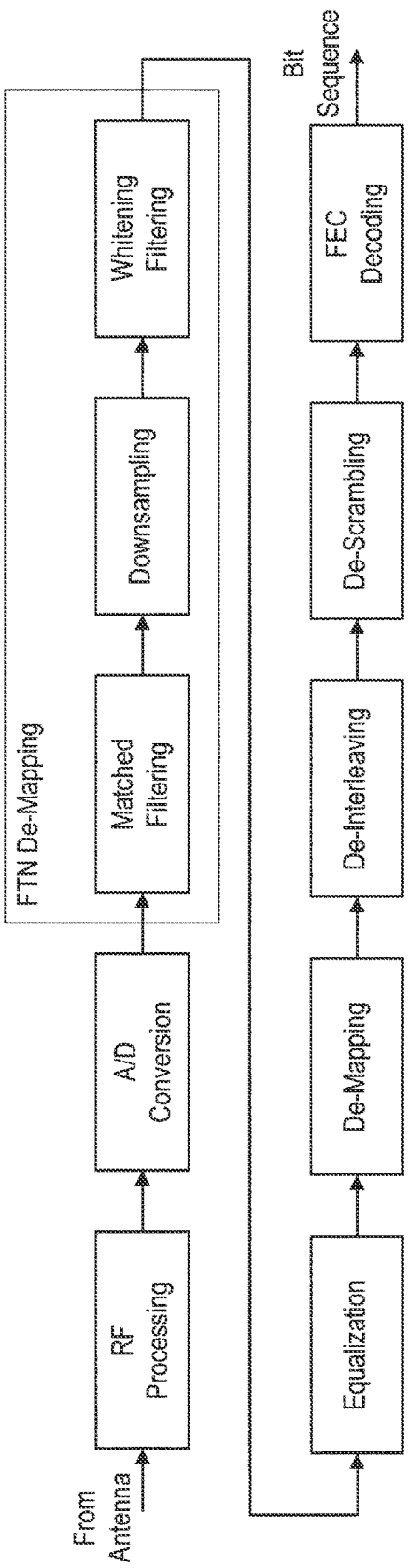
FIG. 2 is an explanatory diagram for describing an example of reception processing in the case where FTN is employed.

In addition, FIG. 2 is an explanatory diagram for describing an example of reception processing in the case where FTN is employed. A reception signal received at an antenna is subjected to radio frequency processing, analog/digital conversion and the like, and then FTN de-mapping processing is performed thereon. In the FTN de-mapping processing, a matched filter corresponding to a waveform shaping filter on a transmission side, downsampling, whitening processing of residual noise, and the like are performed on a reception signal converted into a digital signal. Note that channel equalization processing is performed on the digital signal (bit sequence) on which FTN de-mapping processing has been performed, and then the processing from de-mapping to error correction decoding is performed for an attempt to decode a transmission bit sequence similarly to the conventional reception processing applied in the standards such as LTE/LTE-A.

Note that, in the following description, it will be assumed that the simple term "FTN processing" in transmission processing represents FTN mapping processing. Similarly, it will be assumed that the simple term "FTN processing" in reception processing represents FTN de-mapping processing. In addition, the transmission processing and the reception processing described above with reference to FIGS. 1A to 2 are merely examples, but are not necessarily limited to the contents. For example, various kinds of processing accompanying the application of MIMO, various kinds of processing for multiplexing, and the like may be included.

With reference to FIGS. 1A to 2, the above describes the overview of FTN.

2. Technical Problem

Next, a technical problem according to an embodiment of the present disclosure will be described.

As described above, FTN is capable of improving frequency use efficiency without extending a band or increasing the number of antennas. Meanwhile, in the case where FTN is applied, as described above, inter-symbol interference occurs between temporally continuous symbols in the process of modulation. Therefore, signal processing (i.e., FTN de-mapping processing) for receiving FTN signals is necessary on a reception apparatus side. Therefore, it can be assumed that simply employing FTN alone excessively increases the load on a reception apparatus in FTN de-mapping processing, and deteriorates the communication quality of the overall system, for example, depending on the state or condition of communication, the performance of the reception apparatus, or the like (which will be collectively referred to as "communication environment" below in some cases).

Accordingly, the present disclosure proposes an example of a mechanism capable of adaptively adjusting a symbol interval in a more favorable manner in accordance with a communication environment in the case where FTN is applied.

3. Schematic Configuration of System

Figure 3:
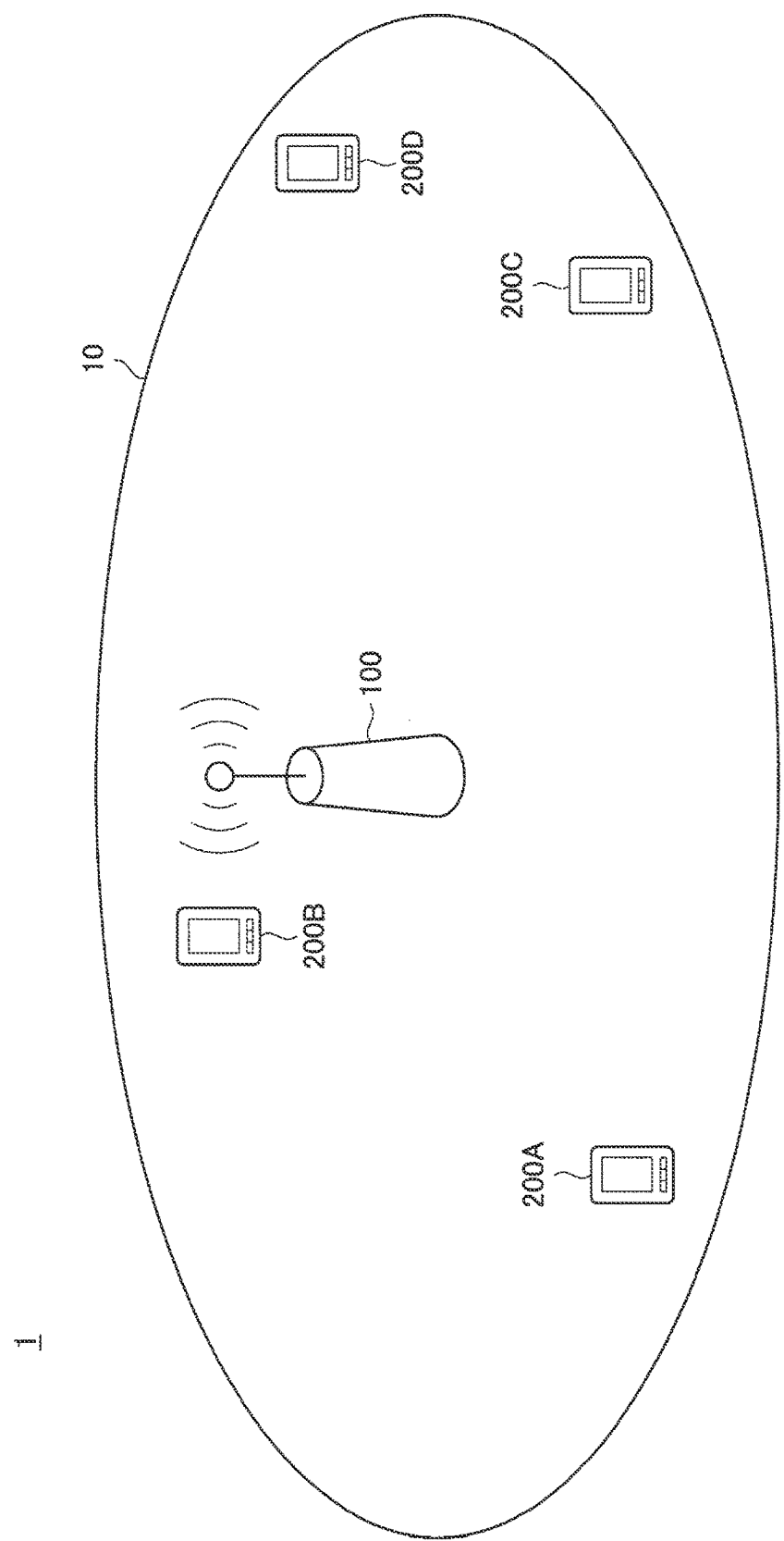
FIG. 3 is an explanatory diagram illustrating an example of a schematic configuration of a system according to an embodiment of the present disclosure.

First, the schematic configuration of a system 1 according to an embodiment of the present disclosure will be described with reference to FIG. 3. FIG. 3 is an explanatory diagram illustrating an example of the schematic configuration of the system 1 according to an embodiment of the present disclosure. With reference to FIG. 3, the system 1 includes a base station 100 and a terminal apparatus 200. Here, the terminal apparatus 200 is also referred to as user. The user can also be referred to as user equipment (UE). Here, the UE may be a UE defined in LTE or LTE-A, or may generally refer to a communication apparatus.

(1) Base Station 100

The base station 100 is a base station of a cellular system (or mobile communication system). The base station 100 performs radio communication with a terminal apparatus (e.g., terminal apparatus 200) positioned in a cell 10 of the base station 100. For example, the base station 100 transmits a downlink signal to a terminal apparatus and receives an uplink signal from the terminal apparatus.

(2) Terminal Apparatus 200

The terminal apparatus 200 can perform communication in a cellular system (or mobile communication system). The terminal apparatus 200 performs radio communication with a base station (e.g., base station 100) of the cellular system. For example, the terminal apparatus 200 receives a downlink signal from a base station and transmits an uplink signal to the base station.

(3) Adjustment of Symbol Intervals

Especially in an embodiment of the present disclosure, when transmitting data to the terminal apparatus 200, the base station 100 adjusts the symbol intervals between the symbols of the data. More specifically, the base station 100 performs FTN mapping processing on a bit sequence of transmission target data on a downlink to adjust the symbol intervals between the symbols of the data beyond a Nyquist criterion (i.e., make an adjustment such that the symbol intervals are narrower). In this case, for example, the terminal apparatus 200 performs demodulation and decoding processing including FTN de-mapping processing on a reception signal from the base station 100 to attempt to decode the data transmitted from the base station 100.

In addition, in an amplifier link, the symbol intervals between symbols based on FTN processing may be adjusted. In this case, the terminal apparatus 200 performs FTN mapping processing on a bit sequence of transmission target data to adjust the symbol intervals between the symbols of the data. In addition, the base station 100 performs demodulation and decoding processing including FTN de-mapping processing on a reception signal from the terminal apparatus 200 to attempt to decode the data transmitted from the terminal apparatus 200.

The above describes the schematic configuration of the system 1 according to an embodiment of the present disclosure with reference to FIG. 3.

4. Configuration of Each Apparatus

Next, with reference to FIGS. 4 and 5, the configurations of the base station 100 and the terminal apparatus 200 according to an embodiment of the present disclosure will be described.

<4.1. Configuration of Base Station>

First, with reference to FIG. 4, an example of the configuration of the base station 100 according to an embodiment of the present disclosure will be described. FIG. 4 is a block diagram illustrating an example of the configuration of the base station 100 according to an embodiment of the present disclosure. As illustrated in FIG. 4, the base station 100 includes an antenna unit 110, a radio communication unit 120, a network communication unit 130, a storage unit 140, and a processing unit 150.

(1) Antenna Unit 110

The antenna unit 110 emits a signal output by the radio communication unit 120 to the space as a radio wave. In addition, the antenna unit 110 converts a radio wave in the space into a signal and outputs the signal to the radio communication unit 120.

(2) Radio Communication Unit 120

The radio communication unit 120 transmits and receives signals. For example, the radio communication unit 120 transmits a downlink signal to a terminal apparatus and receives an uplink signal from the terminal apparatus.

(3) Network Communication Unit 130

The network communication unit 130 transmits and receives information. For example, the network communication unit 130 transmits information to another node and receives information from the other node. For example, the other node includes another base station and a core network node.

(4) Storage Unit 140

The storage unit 140 temporarily or permanently stores programs and various kinds of data for the operation of the base station 100.

(5) Processing Unit 150

The processing unit 150 provides the various functions of the base station 100. For example, the processing unit 150 may include a communication processing unit 151 and a notification unit 153. Note that the processing unit 150 can further include other components in addition to these components. That is, the processing unit 150 can also perform operations other than the operations of these components.

The communication processing unit 151 and the notification unit 153 will be described in detail below. The above describes an example of the configuration of the base station 100 according to an embodiment of the present disclosure with reference to FIG. 4.

<4.2. Configuration of Terminal Apparatus>

Next, an example of the configuration of the terminal apparatus 200 according to an embodiment of the present disclosure will be described with reference to FIG. 5. FIG. 5 is a block diagram illustrating an example of the configuration of the terminal apparatus 200 according to an embodiment of the present disclosure. As illustrated in FIG. 5, the terminal apparatus 200 includes an antenna unit 210, a radio communication unit 220, a storage unit 230, and a processing unit 240.

(1) Antenna Unit 210

The antenna unit 210 emits a signal output by the radio communication unit 220 to the space as a radio wave. In addition, the antenna unit 210 converts a radio wave in the space into a signal and outputs the signal to the radio communication unit 220.

(2) Radio Communication Unit 220

The radio communication unit 220 transmits and receives signals. For example, the radio communication unit 220 receives a downlink signal from a base station and transmits an uplink signal to the base station.

(3) Storage Unit 230

The storage unit 230 temporarily or permanently stores programs and various kinds of data for the operation of the terminal apparatus 200.

(4) Processing Unit 240

The processing unit 240 provides the various functions of the terminal apparatus 200. For example, the processing unit 240 includes an information acquisition unit 241 and a communication processing unit 243. Note that the processing unit 240 can further include other components in addition to these components. That is, the processing unit 240 can also perform operations other than the operations of these components.

The information acquisition unit 241 and the communication processing unit 243 will be described in detail below. The above describes an example of the configuration of the terminal apparatus 200 according to an embodiment of the present disclosure with reference to FIG. 5.

5. Technical Features

Next, technical features according to an embodiment of the present embodiment will be described with reference to FIGS. 6 to 23.

(1) Example of Time Resource Configuration

Figure 6:
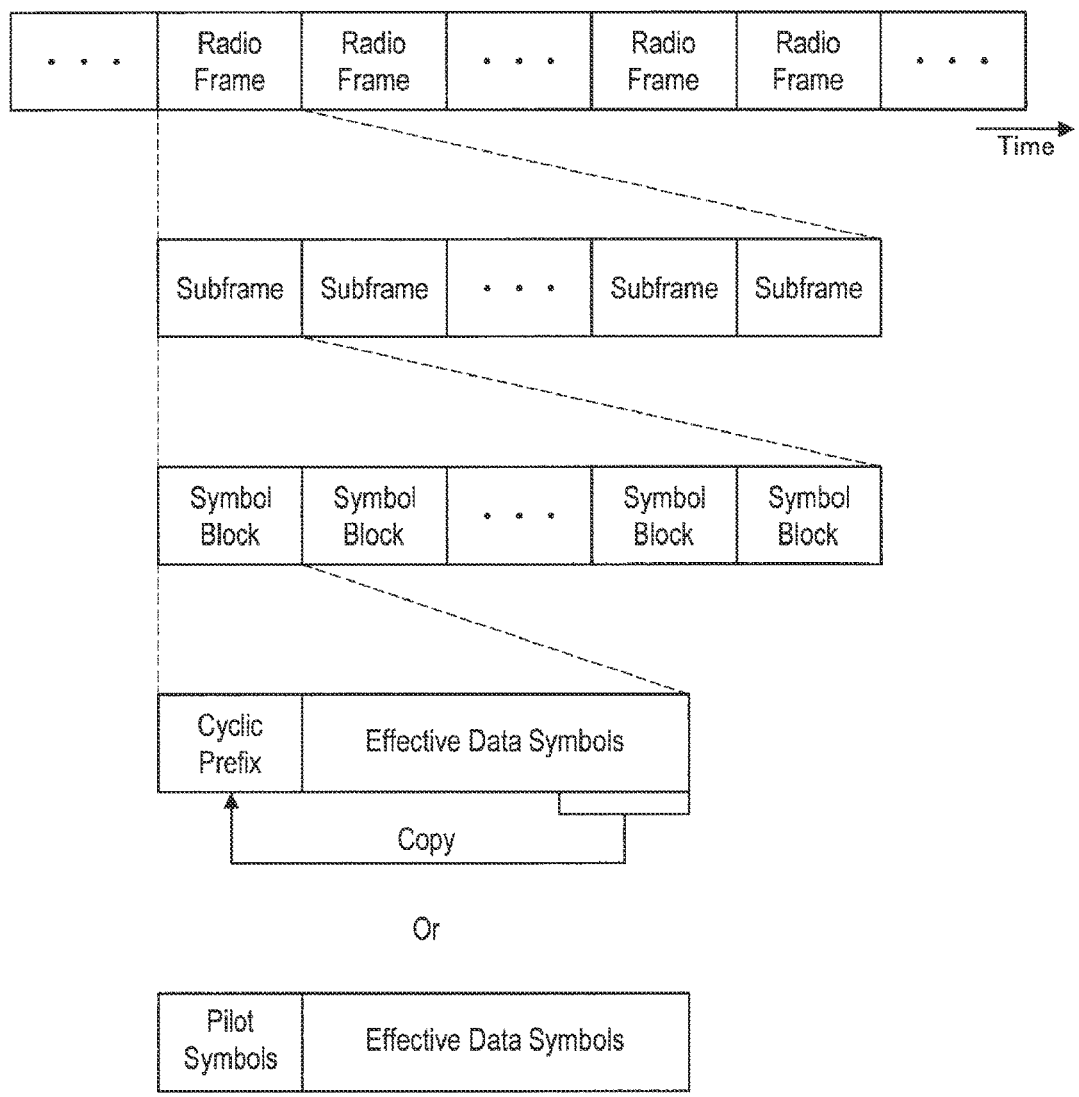
FIG. 6 is an explanatory diagram for describing an example of a configuration of a time resource in a case where FTN is supported.

First, with reference to FIG. 6, an example of the configuration of a time resource in the case where FTN is supported will be described. FIG. 6 is an explanatory diagram for describing an example of the configuration of a time resource in the case where FTN is supported.

In the example illustrated in FIG. 6, a time resource is divided into units referred to as radio frames along a time-axis direction. In addition, a radio frame is divided into a predetermined number of subframes along the time-axis direction. Note that, in the example illustrated in FIG. 6, a radio frame includes ten subframes. Note that a time resource is allocated to a user in units of subframes.

In addition, a subframe is divided into a predetermined number of units referred to as symbol blocks further along the time-axis direction. For example, in the example illustrated in FIG. 6, a subframe includes fourteen symbol blocks. A symbol block has a sequence portion including symbols for sending data, and a CP portion in which a part of the sequence is copied. In addition, as another example, a symbol block may have a sequence portion including symbols for sending data, and a sequence portion (so-called pilot symbols) including known symbols. Note that a CP or a pilot symbol can function, for example, as a guard interval.

With reference to FIG. 6, the above describes an example of the configuration of a time resource in the case where FTN is supported.

(2) Example of Processing in Transmission Apparatus

Next, with reference to FIGS. 7 to 10, an example of processing in a transmission apparatus that supports FTN will be described. FIGS. 7 to 10 are explanatory diagrams each for describing an example of the processing in the transmission apparatus that supports FTN. In the examples illustrated in FIGS. 7 to 10, it is assumed that FTN signals are transmitted to one or more users (i.e., the number $N_U$ of users (or the number of reception apparatuses) $\geq 1$). In addition, in the examples illustrated in FIGS. 7 to 10, multi-antenna transmission is assumed (i.e., the number $N_{AP}$ of transmission antenna ports (or the number of transmission antennas) $\geq 1$). Note that the transmission apparatus in the present description can correspond to both the base station 100 and the terminal apparatus 200. That is, on a downlink, the base station 100 corresponds to the transmission apparatus, and chiefly the communication processing unit 151 in the base station 100 executes processing described below. In addition, on an uplink, the terminal apparatus 200 corresponds to the transmission apparatus, and chiefly the communication processing unit 243 in the terminal apparatus 200 executes processing described below. In other words, the communication processing unit 151 or the communication processing unit 243 can function as an example of the control unit of the present disclosure. Note that the terminal apparatus 200 corresponds to a reception apparatus on a downlink, and the base station 100 corresponds to a reception apparatus on an uplink.

Figure 7:
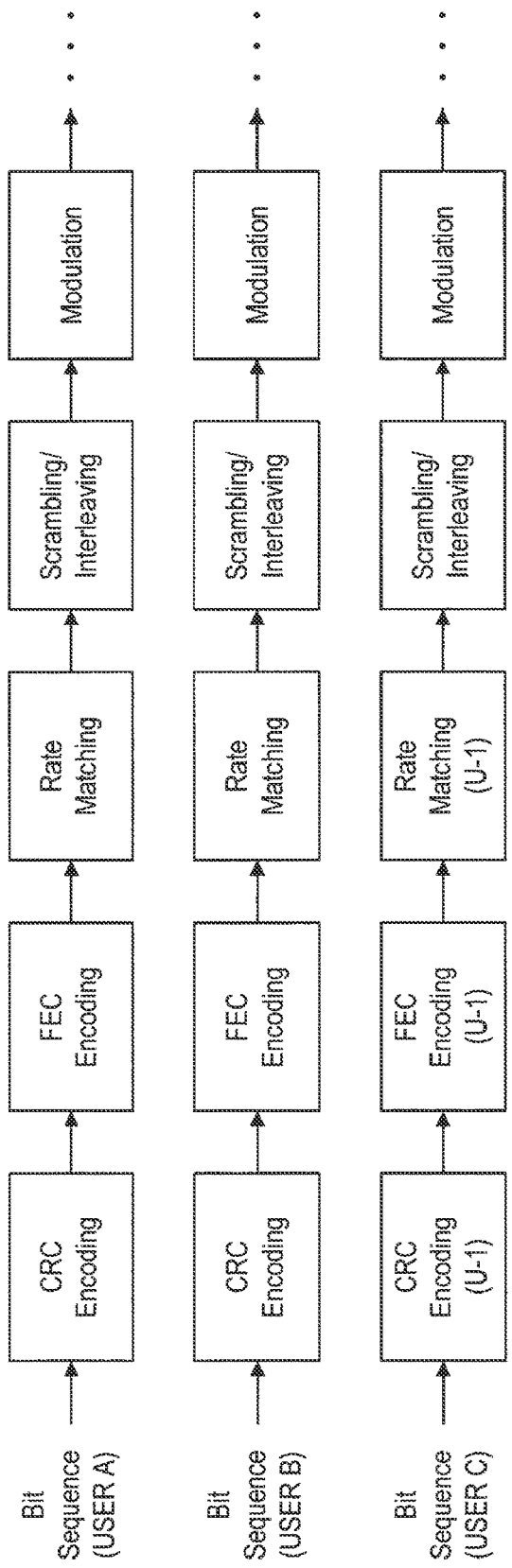
FIG. 7 is an explanatory diagram for describing an example of processing in a transmission apparatus that supports FTN.
Figure 8:
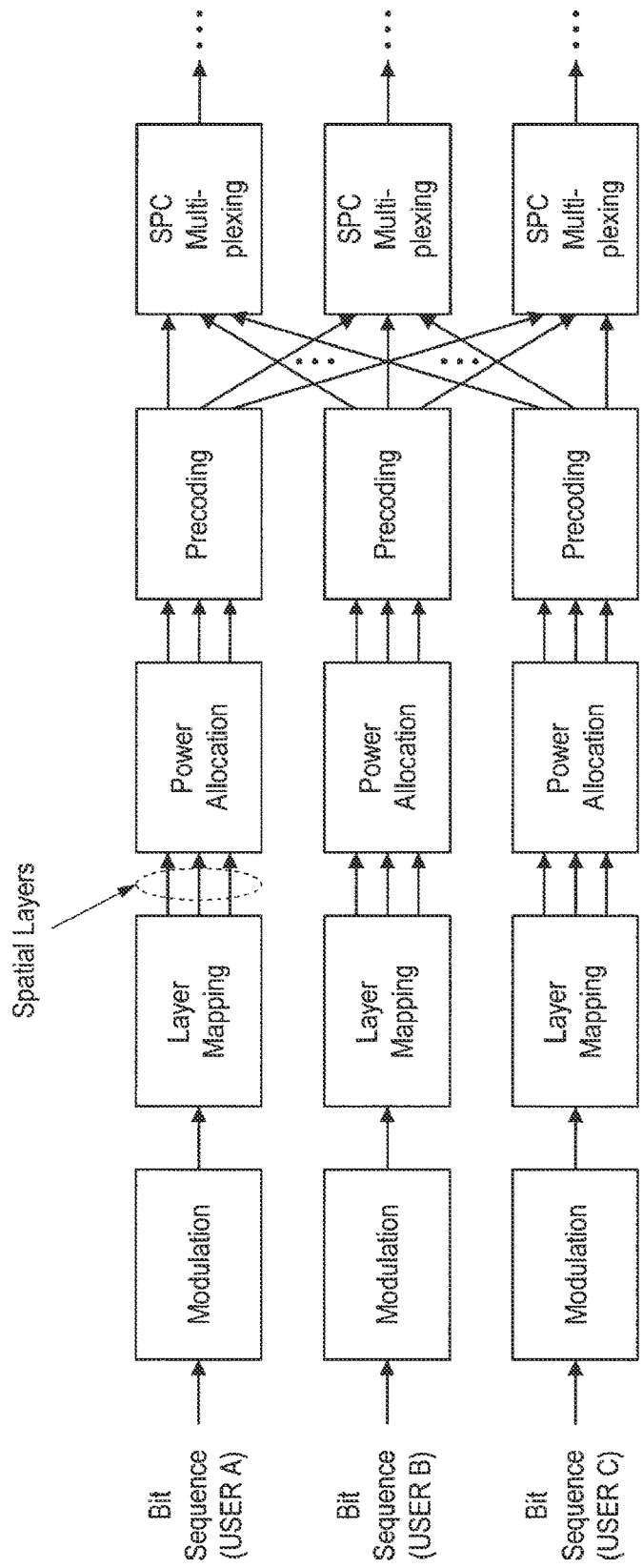
FIG. 8 is an explanatory diagram for describing an example of the processing in the transmission apparatus that supports FTN.

Specifically, in the examples illustrated in FIGS. 7 and 8, for example, the respective bit sequences (e.g., transport blocks) of a user A, a user B, and a user C are processed. For each of these bit sequences, some processing (such as cyclic redundancy check (CRC) encoding, forward error correction (FEC) encoding, rate matching, and scrambling/interleaving, for example, as illustrated in FIG. 7) is performed, and then modulation is performed. As illustrated in FIG. 8, layer mapping, power allocation, precoding, and SPC multiplexing are then performed, and a bit sequence of each antenna element is output. Here, description will be made, assuming that the respective bit sequences corresponding to an antenna p1, an antenna p2, and an antenna p3 are output.

Figure 9:
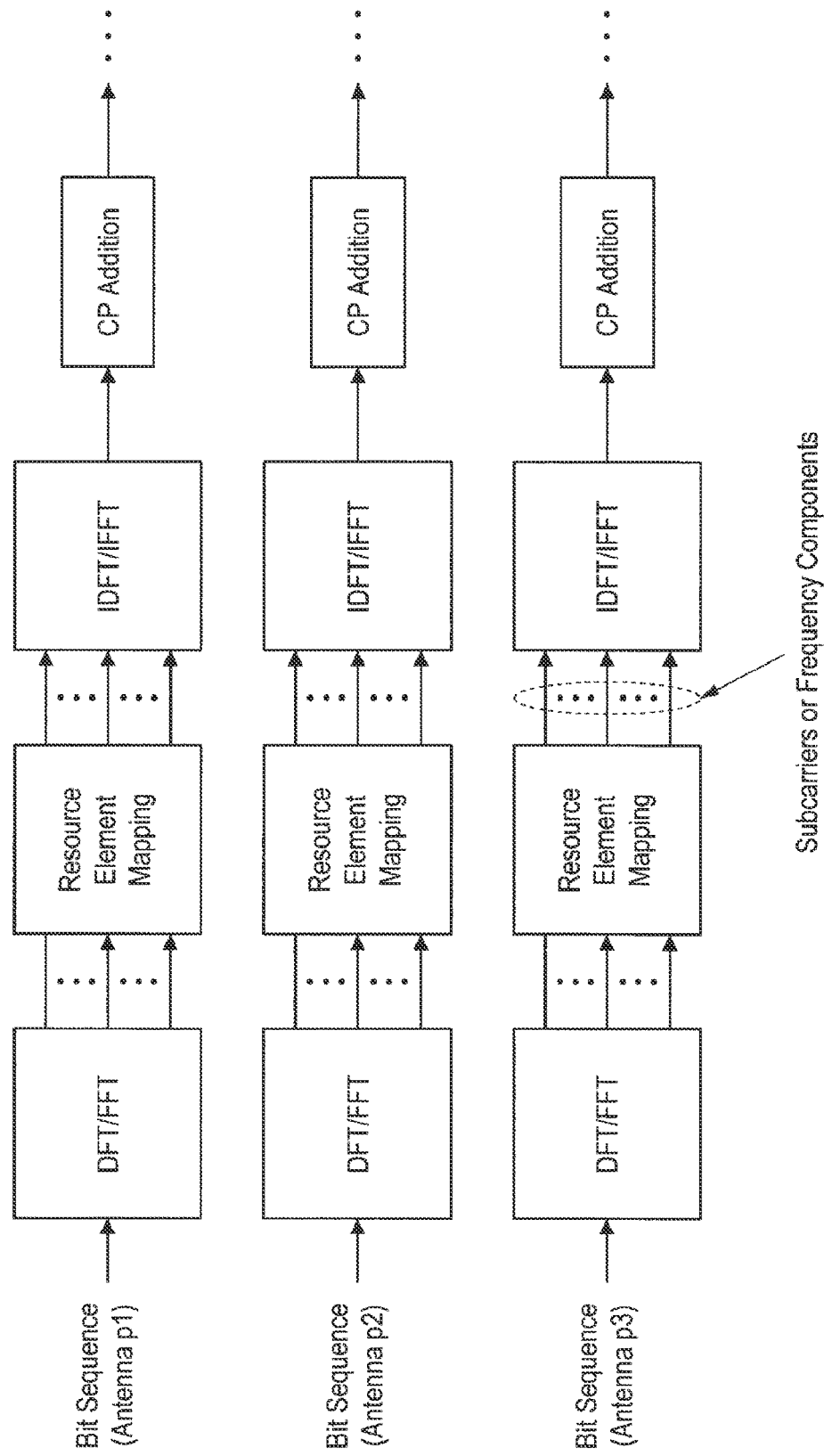
FIG. 9 is an explanatory diagram for describing an example of the processing in the transmission apparatus that supports FTN.
Figure 10:
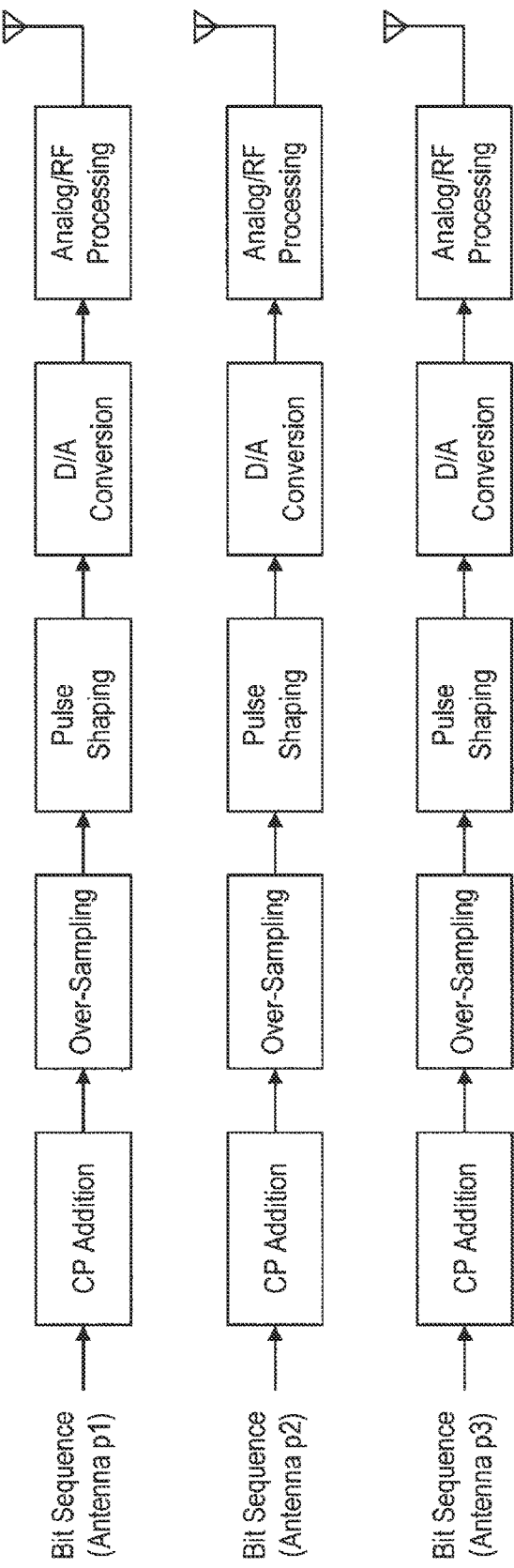
FIG. 10 is an explanatory diagram for describing an example of the processing in the transmission apparatus that supports FTN.

As illustrated in FIG. 9, discrete Fourier transform (DFT)/fast Fourier transform (FFT), resource element mapping, inverse discrete Fourier transform (IDFT)/inverse fast Fourier transform (IFFT), cyclic prefix (CP) insertion, and the like are performed on the respective bit sequences corresponding to the antenna p1, the antenna p2, and the antenna p3, and a symbol sequence of each antenna element to which a CP has been added is output. As illustrated in FIG. 10, as FTN processing, over-sampling and pulse shaping are then performed on the symbol sequence to which a CP has been added, and the output thereof is converted from digital to analog and radio frequency (RF).

Note that the processing of the transmission apparatus described with reference to FIGS. 7 to 10 is merely an example, but is not necessarily limited to the contents. For example, the transmission apparatus may be a transmission apparatus for which single antenna transmission is assumed. In this case, corresponding part of each processing described above may be replaced as appropriate.

With reference to FIGS. 7 to 10, the above describes an example of processing in a transmission apparatus that supports FTN.

(3) Transmission Signal Processing

Next, an example of transmission signal processing in the case where FTN is employed will be described. Note that, in the present description, a multi-cell system such as a heterogeneous network (HetNet) or a small cell enhancement (SCE) is assumed.

First, in the present description, it is assumed that an index corresponding to a subframe is omitted unless otherwise stated. In addition, in the case where the index of a transmission apparatus i and the index of a reception apparatus u are respectively set as i and u, the indexes i and u may be indexes that represent the IDs of the cells to which the corresponding apparatuses belong, or the IDs of the cells that are managed by the corresponding apparatuses.

Here, a bit sequence transmitted in a certain subframe t from the transmission apparatus i to the reception apparatus u is set as $b_{i,u}$. This bit sequence $b_{i,u}$ may be a bit sequence included in one transport block. In addition, description will be made in the present description, using, as an example, the case where one bit sequence is transmitted from the transmission apparatus i to the reception apparatus u. However, a plurality of bit sequences may be transmitted from the transmission apparatus i to the reception apparatus u, and the plurality of bit sequences may be included in a plurality of transport blocks and transmitted at that time.

First, processing such as encoding for CRC, FEC encoding (convolutional code, turbo code, LDPC code, or the like), rate matching for adjusting an encoding rate, bit scrambling, and bit interleaving is performed on the transmission target bit sequence $b_{i,u}$. Note that, in the case where each of these kinds of processing is used as a function, the bit sequences on which the respective kinds of processing have been performed are expressed as follows.

$$b_{CRC,i,u} = CRC_{ENC}(b_{i,u}, u, i, t)$$

$$b_{FEC,i,u} = FEC_{ENC}(b_{CRC,i,u}, u, i, t)$$

$$b_{RM,i,u} = RM(b_{FEC,i,u}, u, i, t)$$

$$b_{SCC,i,u} = SCR(b_{RM,i,u}, u, i, t)$$

$$b_{INT,i,u} = \pi(b_{SCR,i,u}, u, i, t) \qquad \text{[Math. 1]}$$

The bit sequence (e.g., bit sequence $b_{INT,i,u}$) on which the above-described bit processing has been performed is mapped to a complex symbol s (e.g., BPSK, QPSK, 8PSK, 16QAM, 64QAM, 256QAM, or the like), and further mapped to a spatial layer 1. Here, if the number of spatial layers for the reception apparatus u is represented as $N_{SLi,u}$, the transmission signal to which the bit sequence $b_{INT,i,u}$ has been mapped can be expressed in the form of a vector as follows.

$$s_{i,u} = \begin{bmatrix} s_{i,u,0} \\ \vdots \\ s_{i,u,N_{SL,i,u}-1} \end{bmatrix} \qquad \text{[Math. 2]}$$

$$s_{i,u,l} = [s_{i,u,l,0} \ \cdots \ s_{i,u,l,N-1}]$$

Note that, in the equation shown above, each element of a vector $S_{i,u,j}$ corresponds to the complex symbol s to which the bit sequence $b_{INT,i,u}$ is mapped.

Next, the respective kinds of processing of power allocation and precoding are performed on the transmission signal that has been mapped to the spatial layer. Here, in the case where the number of antenna ports (or the number of transmission antennas) in the transmission apparatus i is represented as $N_{AP,i}$, the transmission signal on which power allocation and precoding have been performed is shown as a vector $x_{i,u}$ below.

$$x_{i,u} = W_{i,u} P_{i,u} s_{i,u} \qquad \text{[Math. 3]}$$

$$= \begin{bmatrix} x_{i,u,0,0} & \cdots & x_{i,u,N_{EL,TTL}-1} \\ \vdots & \ddots & \vdots \\ x_{i,u,N_{AP}-1,0} & \cdots & x_{i,u,N_{AP}-1,N_{EL,TTL}-1} \end{bmatrix}$$

$$= \begin{bmatrix} x_{i,u,0} \\ \vdots \\ x_{i,u,N_{AP}-1} \end{bmatrix}$$

$$x_{i,u,p} = [x_{i,u,p,0} \ \cdots \ x_{i,u,p,N_{EL,TTL}-1}]$$

$$W_{i,u} = \begin{bmatrix} w_{i,u,0,0} & \cdots & w_{i,u,0,N_{SL,i,u}-1} \\ \vdots & \ddots & \vdots \\ w_{i,u,N_{AP,i}-1,0} & \cdots & w_{i,u,N_{AP,i}-1,N_{SL,i,u}-1} \end{bmatrix}$$

$$P_{i,u} = \begin{bmatrix} P_{i,u,0,0} & \cdots & P_{i,u,0,N_{SL,i,u}-1} \\ \vdots & \ddots & \vdots \\ P_{i,u,N_{SL,i,u}-1,0} & \cdots & P_{i,u,N_{SL,i,u}-1,N_{SL,i,u}-1} \end{bmatrix}$$

Note that, in the equation shown above, a matrix $W_{i,u}$ is a precoding matrix for the reception apparatus u. It is desirable that an element in this matrix be a complex number or a real number. In addition, a matrix $P_{i,u}$ is a power allocation coefficient matrix for transmitting a signal from the transmission apparatus i to the reception apparatus u. In this matrix, it is desirable that each element be a positive real number. Note that this matrix $P_{i,u}$ may be a diagonal matrix (i.e., matrix in which the components other than the diagonal components are 0) as described below.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SL,\mu}-1,N_{SL,\mu}-1} \end{bmatrix} \quad \text{[Math. 4]}$$

Here, a communication target of the transmission apparatus i is not limited to only the reception apparatus u, but can also be another reception apparatus v. Therefore, for example, a signal $x_{i,u}$ directed to the reception apparatus u and a signal $x_{i,v}$ directed to the other reception apparatus v can be transmitted in the same radio resource. These signals are multiplexed for each transmission antenna port, for example, on the basis of superposition multiplexing, superposition coding (SPC), multiuser superposition transmission (MUST), non-orthogonal multiple access (NOMA), or the like. A multiplexed signal $x_i$ transmitted from the transmission apparatus i is expressed as follows.

$$x_i = \sum_{u \in U_i} x_{i,u} \quad \text{[Math. 5]}$$

Note that, in the equation shown above, $U_i$ represents a set of indexes of the reception apparatus u for which the transmission apparatus i multiplexes signals. In addition, the following processing will be described, focusing on signal processing for each transmission antenna port p and each symbol block g.

A signal for each transmission antenna port is converted into a frequency component by performing time-frequency transform processing (e.g., DFT, FFT, or the like) on a time symbol sequence. Here, if the number of data symbols included in the symbol block g is represented as $N_{DS,g}$, a frequency component $x^-_{i,p,g}$ of a time symbol sequence $x_{i,p,g}$ of the symbol block g transmitted from the transmission apparatus i via a transmission port p can be expressed as follows. Note that, in the present description, it is assumed that "x-" represents a letter obtained by overlining "x." In addition, it is assumed that $F_N$ shown in the following equation represents a Fourier transform matrix having size N.

$$\bar{x}_{i,p,g} = F_{N_{DS,g}} x^T_{i,p,g} \quad \text{[Math. 6]}$$

$$= [\bar{x}_{i,p,g,0} \ \cdots \ \bar{x}_{i,p,g,N_{DS,g}-1}]^T$$

$$x_{i,p,g} = [x_{i,p,g,0} \ \cdots \ x_{i,p,g,N_{DS,g}-1}]$$

$$F_N = \begin{bmatrix} \exp\left(-j2\pi\frac{0 \cdot 0}{N}\right) & \cdots & \exp\left(-j2\pi\frac{0 \cdot (N-1)}{N}\right) \\ \vdots & \ddots & \vdots \\ \exp\left(j2\pi\frac{(N-1) \cdot 0}{N}\right) & \cdots & \exp\left(-j2\pi\frac{(N-1) \cdot (N-1)}{N}\right) \end{bmatrix}$$

A converted frequency component $x^-_{i,p,g}$ is mapped to a resource element along the frequency direction of a resource block. It is also possible to process this processing of mapping the frequency component $x^-_{i,p,g}$ to a resource element as shown in the following equation.

$$\tilde{x}_{i,p,g} = A_{i,p,g} \bar{x}_{i,p,g} \quad \text{[Math. 7]}$$

$$= [\tilde{x}_{i,p,g,0} \ \cdots \ \tilde{x}_{i,p,g,N_{IDFT}-1}]^T$$

Note that, in the equation shown above, $x^~_{i,p,g}$ represents a frequency component after the frequency component $x^-_{i,p,g}$ is mapped to a resource element. Note that, in the present description, it is assumed that "x~" represents a letter obtained by providing tilde to the top of "x." In addition, in the equation shown above, A represents a frequency mapping matrix having size $N_{IDFT} \times N_{DS,g}$. Here, in the case where a frequency component $x^-_{i,p,g,k'}$ of a component k' after frequency conversion is mapped to a frequency component $x^~_{i,p,g}$,k corresponding to a component k, a (k, k') component of a frequency mapping matrix is 0. It is desirable that the sum of the elements in each row of the matrix A be less than or equal to 1, and the sum of the elements in each column be less than or equal to 1.

Next, frequency-time conversion processing (e.g., IDFT, IFFT, or the like) is performed on the frequency component $x^~_{i,p,g}$ mapped to a resource element, the frequency component $x^~_{i,p,g}$ is converted into a time sequence again. Here, a time symbol sequence $d^~_{i,p,g}$ into which $x^~_{i,p,g}$ is converted is expressed as follows. Note that, in the present description, it is assumed that "d~" represents a letter obtained by providing tilde to the top of "d." In addition, in the equation shown below, $F^H$ represents a Hermitian matrix of F.

$$\tilde{d}_{i,p,g} = F^H_{N_{IDFT}} \tilde{x}_{i,p,g} \quad \text{[Math. 8]}$$

$$= [\tilde{d}_{i,p,g}(0) \ \cdots \ \tilde{d}_{i,p,g}(N_{IDFT}-1)]^T$$

In addition, a CP or a known symbol sequence is added for each symbol block to the time symbol sequence $d^~_{i,p,g}$ converted from a frequency component to a time sequence. For example, in the case where a CP having length $N_{CP,g}$ is added to the time symbol sequence $d^~_{i,p,g}$, a symbol sequence $d^\wedge_{i,p,g}$ to which a CP has been added is expressed as follows. Note that it is assumed that "d^" represents a letter obtaining by providing a hat to "d."

$$\hat{d}_{i,p,g} = [\hat{d}_{i,p,g}(0) \ \cdots \ \hat{d}_{i,p,g}(N_{IDFT,g} + N_{CP,g} - 1)]^T \quad \text{[Math. 9]}$$

$$[\tilde{d}_{i,p,g}(N_{IDFT,g} - N_{CP,g}) \ \cdots$$

$$\tilde{d}_{i,p,g}(N_{IDFT,g} - 1) \ \tilde{d}_{i,p,g}(0) \ \cdots \ \tilde{d}_{i,p,g}(N_{IDFT,g} - 1)]^T$$

Next, FTN processing is performed on the symbol sequence $d^\wedge_{i,p,g}$ to which a CP has been added. Note that the FTN processing includes over-sampling processing and pulse shaping filtering processing. First, focus is placed on over-sampling processing. If the number of over-samples is represented as Nos, a time symbol sequence $d'_{i,p}[n]$ after over-sampling is expressed as follows. Note that, in the equation shown below, an index g of a symbol block is omitted.

$$d'_{i,p}[n] = \begin{cases} \hat{d}_{i,p}\left(\frac{n}{N_{OS}}\right), & n = 0, N_{OS}, 2N_{OS}, \ldots \\ 0, & \text{otherwise} \end{cases} \quad \text{[Math. 10]}$$

In addition, pulse shaping processing that takes FTN into consideration is performed on the time symbol sequence $d'_{i,p}[n]$ after over-sampling. In the case where the filter factor of a pulse shape filter is represented as $\Psi_{i,p}(t)$, an output of pulse shaping processing is expressed as follows.

$$s_{i,p}(t) = \sum_{n} d'_{i,p}[n]\psi_{i,p}(t - n\tau_{i,p}T) \quad [\text{Math. 11}]$$

Here, in the case where the symbol length is represented as T, 1/T represents the symbol rate. In addition, $\tau_{i,p}$ is a coefficient regarding FTN, and has a real-number value within a range of $0<\tau_{i,p}\leq 1$. Note that, in the following description, the coefficient $\tau_{i,p}$ will be referred to as "compression coefficient" for the sake of convenience in some cases. It is also possible to regard the compression coefficient as a coefficient that connects the symbol length T to a symbol arrangement (i.e., symbol intervals) T' in FTN. In general, 0<T'≤T holds, and a relationship of $\tau_{i,p}$=T'/T≤1 is obtained.

Note that, in the conventional modulation scheme applied in the standards such as LTE/LTE-A, it is preferable that the filter factor be a filter (what is called, a filter (Nyquist filter) compliant with a Nyquist criterion) of a coefficient that has a value of zero per time T when the value at time zero peaks. A specific example of the filter compliant with a Nyquist criterion includes a raised-cosine (RC) filter, a root-raised-cosine (RRC) filter, and the like. Note that, in the case where a filter compliant with a Nyquist criterion in the above-described transmission processing in which FTN can be applied, $\tau_{i,p}$=1 makes the inter-symbol interference of the generated signal itself zero in principle.

Analog and radio frequency (RF) processing is then performed on the signal (i.e., output of pulse shaping filtering processing) on which FTN processing has been performed, and the signal is sent to a transmission antenna (antenna port).

The above describes an example of transmission signal processing in the case where FTN is employed.

(4) FTN Transmission Scheme in which Changing Compression Coefficient for Each Cell (Cell-Specific)

Next, an example of a transmission scheme in the case where the compression coefficient $\tau_{i,p}$ in FTN is changed for each cell (cell-specific) will be described.

In FTN, as the compression coefficient $\tau_{i,p}$ decreases, the influence of inter-symbol interference contained in FTN itself increases (in other words, the symbol intervals are narrower). Meanwhile, in the so-called radio communication system, multiplex transmission, the nonlinear frequency characteristic of a propagation path, and the like can cause inter-symbol interference even in a radio propagation path. Therefore, in the radio communication system in which FTN is employed, it can be necessary to take the inter-symbol interference in the radio propagation path into consideration in addition to the influence of inter-symbol interference contained in FTN itself. In view of such circumstances, the communication system according to the present embodiment takes into consideration the load of the processing of addressing inter-symbol interference in a reception apparatus, and is configured to be capable of adaptively adjusting a compression coefficient. Such a configuration makes it possible to balance between the load in a reception apparatus and frequency use efficiency.

(a) Adjustment of Compression Coefficient According to Frequency of Channel

First, with reference to FIGS. 11 and 12, an example of the case where a compression coefficient is adjusted in accordance with the frequency of a channel will be described.

Figure 11:
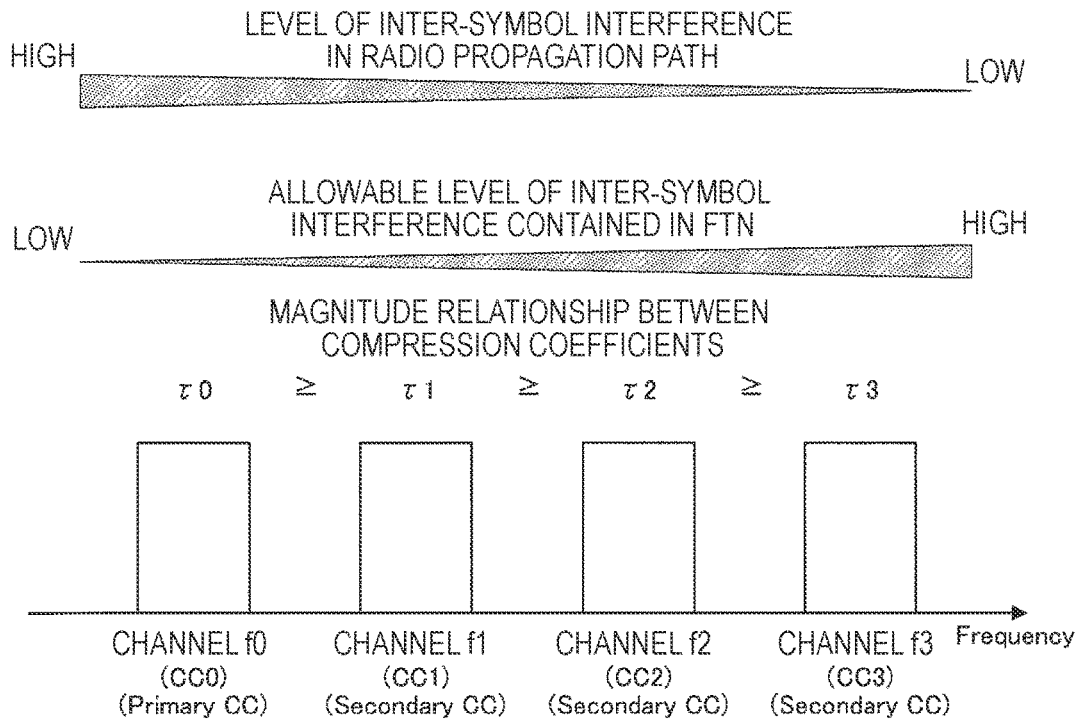
FIG. 11 is a diagram illustrating an example of a relationship between frequency of a channel, a level of inter-symbol interference, and a compression coefficient.

For example, FIG. 11 illustrates an example of the relationship between the frequency of a channel, the level of inter-symbol interference, and a compression coefficient. In general, the delay spread caused by a radio propagation path increases as frequency is lower because of the influence of a reflected wave, a diffracted wave, and the like, while the delay spread decreases as frequency is higher because of its tendency to propagate more straightly. That is, the influence of the inter-symbol interference in the radio propagation path tends to increase as frequency is lower, and decrease as frequency is higher.

It is estimated from such a characteristic that even the processing of addressing the inter-symbol interference in the radio propagation path imposes a relatively lighter load in a channel of high frequency. Therefore, the load that is no longer spent in addressing the inter-symbol interference in the radio propagation path is spent in the processing of addressing inter-symbol interference contained in FTN. This makes it possible to suppress increase in the load in a reception apparatus and efficiently improve frequency use efficiency.

Specifically, as illustrated in FIG. 11, it is desirable to employ the configuration in which a smaller compression coefficient is applied to a channel of higher frequency (in other words, the configuration in which a larger compression coefficient is applied to a channel of lower frequency).

As a more specific example, FIG. 11 illustrates an example of the case where a component carrier (CC) 0 to a CC 3 are used as CCs for a transmission apparatus to transmit data. Note that, in the case where the respective frequency channels corresponding to the CC 0 to the CC 3 are represented as channels f0 to f3, it is assumed that the magnitude relationship between the channels f0 to f3 with respect to frequency is f0<f1<f2<f3. Note that, in the example illustrated in FIG. 11, it is assumed that the CC 0 is set as a primary CC (PCC), and the CC 1 to the CC 3 are each set as a secondary CC (SCC).

Here, in the case where the respective compression coefficients applied in the CC 0 to the CC 3 are represented as τ0 to τ3, the magnitude relationship between the compression coefficients τ0 to τ3 in the example illustrated in FIG. 11 is τ0≥τ1≥τ2≥τ3.

Next, with reference to FIG. 12, an example of processing of setting a compression coefficient in accordance with the frequency of a channel will be described. FIG. 12 is a flowchart illustrating an example of processing of setting a compression coefficient in accordance with the frequency of a channel. Note that, in the present description, description will be made using the case where a transmission apparatus plays a main role to set a compression coefficient as an example. Meanwhile, the main role of the processing is not necessarily limited to a transmission apparatus. As a specific example, in the case where FTN is applied to an uplink, a base station corresponding to a reception apparatus may set a compression coefficient.

Specifically, a transmission apparatus first checks the frequency band of a target CC (S101). The transmission apparatus then just has to set the compression coefficient corresponding to the target CC in accordance with the frequency band of the CC (S103).

Figure 12:
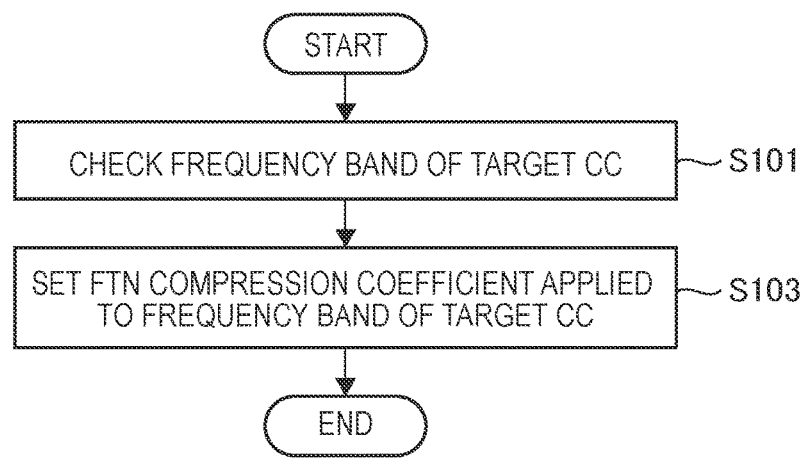
FIG. 12 is a flowchart illustrating an example of processing of setting a compression coefficient in accordance with frequency of a channel.

With reference to FIGS. 11 and 12, the above describes an example of the case where a compression coefficient is adjusted in accordance with the frequency of a channel.

(b) Adjustment of Compression Coefficient According to Component Carrier

Next, with reference to FIGS. 13 and 14, an example of the case where a compression coefficient is adjusted in accordance with whether a target CC is a PCC or an SCC will be described.

Figure 13:
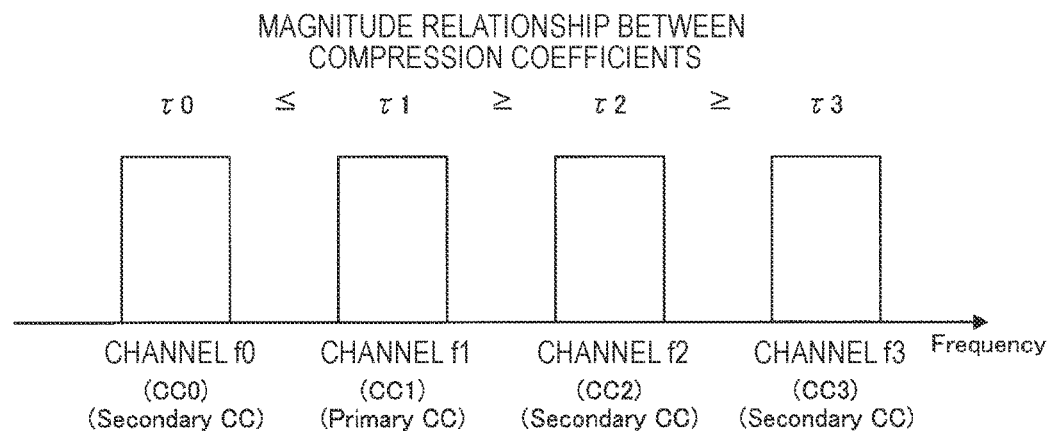
FIG. 13 is a diagram illustrating another example of the relationship between frequency of a channel, a level of inter-symbol interference, and a compression coefficient.

For example, FIG. 13 illustrates another example of the relationship between the frequency of a channel, the level of inter-symbol interference, and a compression coefficient. It is desirable that PCCs be placed in the state in which it is basically possible for all the terminals in a cell to transmit and receive the PCCs. In addition, from the perspective of coverage, it is desirable that a PCC be as low a frequency channel as possible. For example, in the example illustrated in FIG. 11, the PCC is the lowest frequency channel among the targets. Note that the PCC corresponds to an example of a CC of higher priority.

Because of the above-described characteristic of a PCC, it is more desirable to apply a larger value than that of another CC (SCC) to the compression coefficient corresponding to the PCC in order to lessen the inter-symbol interference caused by FTN. Moreover, setting a compression coefficient of 1 ($\tau=1$) for the PCC also makes it possible to further improve the reliability of the transmission and reception of data via the PCC. Note that setting 1 as the compression coefficient is substantially the same as applying no FTN. In principle, the inter-symbol interference accompanying FTN processing does not occur.

For example, FIG. 13 illustrates an example of the case where the CC 0 to the CC 3 are used as CCs. Note that, in the case where the respective frequency channels corresponding to the CC 0 to the CC 3 are represented as channels f0 to f3, it is assumed that the magnitude relationship between the channels f0 to f3 with respect to frequency is f0<f1<f2<f3. Note that, in the example illustrated in FIG. 11, it is assumed that the CC 1 is set as a primary CC (PCC), and the CC 0, CC 2, and the CC 3 are each set as a secondary CC (SCC). That is, FIG. 13 illustrates an example of the case where the PCC is not the lowest frequency channel among the targets. Note that the respective compression coefficients applied in the CC 0 to the CC 3 are represented as $\tau 0$ to $\tau 3$.

Specifically, in the case of the example illustrated in FIG. 13, the compression coefficient $\tau 1$ applied in the PCC (i.e., channel f1) is set to be the highest (e.g., 1 is set therefor), and the compression coefficients $\tau 0$, $\tau 2$, and $\tau 3$ applied in the other CCs (SCCs) are set to be less than or equal to the compression coefficient $\tau 1$. Such a configuration makes it possible to secure the reliability of the transmission and reception of data via the PCC. Note that, as the magnitude relationship between the compression coefficients T0, $\tau 2$, and $\tau 3$, smaller compression coefficients may be set with increase in frequency similarly to the example illustrated in FIG. 11.

Next, with reference to FIG. 14, an example of processing of setting a compression coefficient in accordance with whether a target CC is a PCC or an SCC will be described. FIG. 14 is a flowchart illustrating an example of processing of setting a compression coefficient in accordance with whether a target CC is a PCC or an SCC. Note that, in the present description, description will be made using the case where a transmission apparatus plays a main role to set a compression coefficient as an example.

Specifically, a transmission apparatus first determines whether or not a target CC is a PCC (i.e., any of PCC and SCC) (S151). In the case where the target CC is a PCC (S151, YES), the transmission apparatus sets a compression coefficient (e.g., $\tau=1$) for a PCC as the compression coefficient corresponding to the CC (S153). In addition, in the case where the target CC is not a PCC (S151, NO), the transmission apparatus checks the frequency band of the CC (S155). The transmission apparatus then sets the compression coefficient corresponding to the target CC in accordance with the frequency band of the CC (S157).

Figure 14:
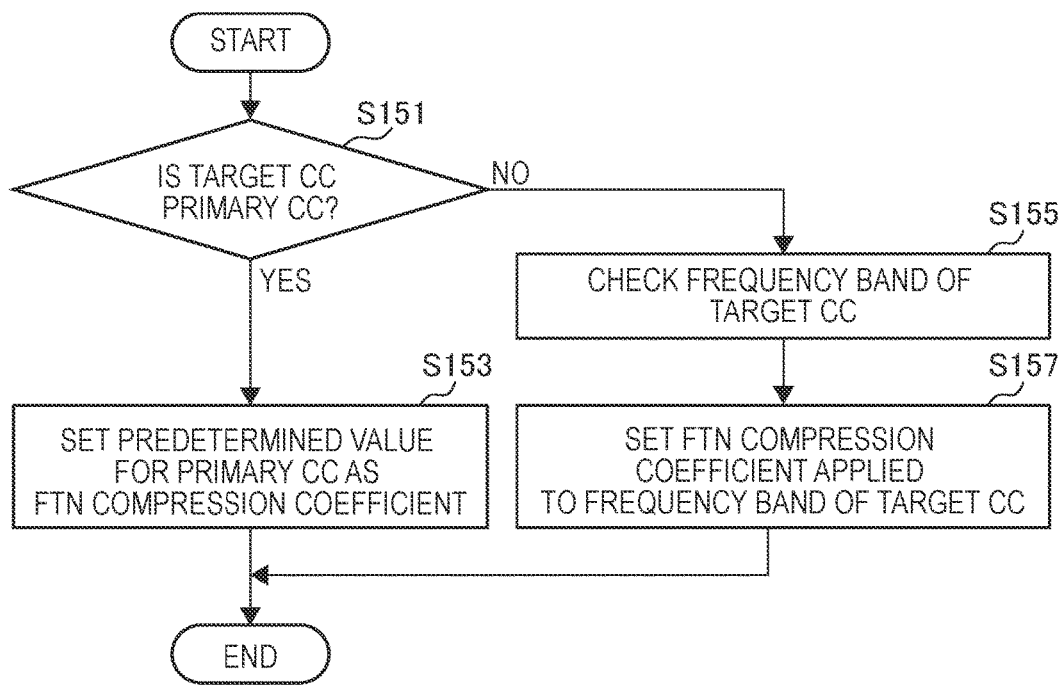
FIG. 14 is a flowchart illustrating an example of processing of setting a compression coefficient in accordance with whether a target CC is a PCC or an SCC.

With reference to FIGS. 13 and 14, the above describes an example of the case where a compression coefficient is adjusted in accordance with whether a target CC is a PCC or an SCC.

(c) Example of Control Table for Setting Compression Coefficient

Next, an example of a control table for the subject (e.g., transmission apparatus) that sets a compression coefficient to set a compression coefficient for a target CC as described above in accordance with whether or not the CC is a PCC, or a condition of the CC such as frequency will be described.

Specifically, as shown below as Table 1, the range of a frequency band and the value of a compression coefficient may be associated fixedly with each other in advance, and managed as a control table. In addition, in the control table, the values of compression coefficients may be individually set for a PCC and an SCC.

TABLE 1

Example of Association of Range of Frequency Band and Value of Compression Coefficient

| Range of Frequency f of CC | Primary CC | Secondary CC |
|---|---|---|
| F0 ≤ f < F1 | $\tau$pcell0 | $\tau$scell0 |
| F1 ≤ f < F2 | $\tau$pcell1 | $\tau$scell1 |
| F2 ≤ f < F3 | $\tau$pcell2 | $\tau$scell2 |
| F3 ≤ f < F4 | $\tau$pcell3 | $\tau$scell3 |
| . . . | . . . | . . . |

A frequency f in Table 1 is, for example, at least one of a central frequency, a lower limit frequency, and an upper limit frequency of a component carrier. For example, in the example shown above as Table 1, in the case where a target CC is a PCC, compression coefficients $\tau$pcell0, $\tau$pcell1, $\tau$pcell2, $\tau$pcell4, . . . are set in accordance with the range of a frequency f corresponding to the CC. Note that it is desirable at this time that the magnitude relationship between the respective compression coefficients be $\tau$pcell0≥$\tau$pcell1≥$\tau$pcell2≥$\tau$pcell4≥ . . . . Note that 1 may be set as the compression coefficient corresponding to a PCC.

In addition, in the example shown above as Table 1, in the case where a target CC is a SCC, compression coefficients $\tau$scell0, $\tau$scell1, $\tau$scell2, $\tau$scell4, . . . are set in accordance with the range of the frequency f corresponding to the CC. Note that it is desirable at this time that the magnitude relationship between the respective compression coefficients be $\tau$scell0≥$\tau$scell1≥$\tau$scell2≥$\tau$scell4≥ . . . . In addition, it is desirable that a smaller value than that of the compression coefficient corresponding to a PCC be set as the compression coefficient corresponding to an SCC. In addition, Table 1 shows a table in which ranges of the frequency bandwidth and values of the compression coefficients are fixedly associated with each other in advance, but the present disclosure is not limited thereto. For example, a control table in which, instead of the value of the frequency f, a component carrier or a channel number (frequency band index) of a frequency channel and the compression coefficient are associated with each other may be used.

(5) Example of Sequence for Changing Compression Coefficient for Each Cell (Cell-Specific)

Next, an example of a communication sequence between the base station 100 and the terminal apparatus 200 in the case where the compression coefficient $\tau_{i,p}$ in FTN is changed for each cell (cell-specific) will be described.

(a) Regarding Application to Downlink

First, with reference to FIGS. 15 and 16, an example of a communication sequence between the base station 100 and the terminal apparatus 200 in the case where FTN is employed for a downlink will be described.

On a downlink, the base station 100 adjusts the symbol intervals between symbols in data transmitted via a shared channel (data channel) on the basis of the compression coefficient $\tau_{i,p}$ decided for each cell. In this case, the base station 100 notifies the terminal apparatus 200 of the compression coefficient $\tau_{i,p}$ decided for each cell as a parameter related to FTN. This allows the terminal apparatus 200 to decode the data (i.e., data on which FTN processing has been performed) transmitted from the base station 100 on the basis of the compression coefficient $\tau_{i,p}$ of which the terminal apparatus 200 is notified by the base station 100.

Note that, as long as the terminal apparatus 200 is capable of recognizing the compression coefficient $\tau_{i,p}$ by the timing at which the data on which the base station 100 has performed FTN mapping processing on the basis of the compression coefficient $\tau_{i,p}$ is decoded, the timing at which the base station 100 notifies the terminal apparatus 200 of an FTN parameter is not limited in particular. For example, an example of the timing at which the base station 100 notifies the terminal apparatus 200 of an FTN parameter includes RRC connection reconfiguration, system information, downlink control information (DCI), and the like. Especially in the case where the compression coefficient $\tau_{i,p}$ is set for each cell (cell-specific), it is more desirable that the base station 100 notify the terminal apparatus 200 of the compression coefficient $\tau_{i,p}$ in RRC connection reconfiguration or system information.

(a-1) Notification Through RRC Connection Reconfiguration

First, with reference to FIG. 15, as an example of a communication sequence in the case where FTN is employed for a downlink, description will be made, focusing especially on an example of the case where the base station 100 uses RRC connection reconfiguration to notify the terminal apparatus 200 of an FTN parameter. FIG. 15 is an explanatory diagram for describing an example of a communication sequence in the case where FTN is employed for a downlink, and illustrates an example of the case where the base station 100 uses RRC connection reconfiguration to notify the terminal apparatus 200 of an FTN parameter.

More specifically, when transmitting an RRC connection reconfiguration message to the terminal apparatus 200, the base station 100 notifies the terminal apparatus 200 of an FTN parameter (e.g., compression coefficient $\tau_{i,p}$) set for each cell (S201). When receiving the RRC connection reconfiguration message from the base station 100, the terminal apparatus 200 transmits an RRC connection reconfiguration complete message indicating that the terminal apparatus 200 has succeeded in correctly receiving the message to the base station 100 (S203). In this procedure, the terminal apparatus 200 becomes capable of recognizing the compression coefficient $\tau_{i,p}$ (i.e., compression coefficient $\tau_{i,p}$ for decoding (FTN de-mapping) the data transmitted from the base station 100) used by the base station 100 to perform FTN mapping processing on transmission data.

Next, the base station 100 uses a physical downlink control channel (PDCCH) to transmit allocation information of a physical downlink shared channel (PDSCH) that is the frequency (e.g., resource block (RB) and time resource (e.g., subframe (SF)) of data transmission and reception to the terminal apparatus 200 (S205). The terminal apparatus 200 that has received the PDCCH decodes the PDCCH, thereby becoming capable of recognizing the frequency and time resource (PDSCH) allocated to terminal apparatus 200 itself (S207).

Next, the base station 100 performs various kinds of modulation processing including FTN mapping processing on transmission target data on the basis of the FTN parameter set for each cell to generate a transmission signal, and transmits the transmission signal onto a designated PDSCH resource (S209). The terminal apparatus 200 receives the PDSCH designated by the allocation information from the base station 100, and performs various kinds of demodulation and decoding processing including FTN de-mapping processing based on the FTN parameter of which the terminal apparatus 200 has been notified by the base station 100 on a reception signal to extract the data transmitted from the base station 100 (S211). Note that, in the case where the terminal apparatus 200 has succeeded in decoding the data with no error on the basis of error detection such as CRC, the terminal apparatus 200 may return an ACK to the base station 100. In addition, in the case where the terminal apparatus 200 has detected an error on the basis of error detection such as CRC, the terminal apparatus 200 may return a NACK to the base station 100 (S213).

Figure 15:
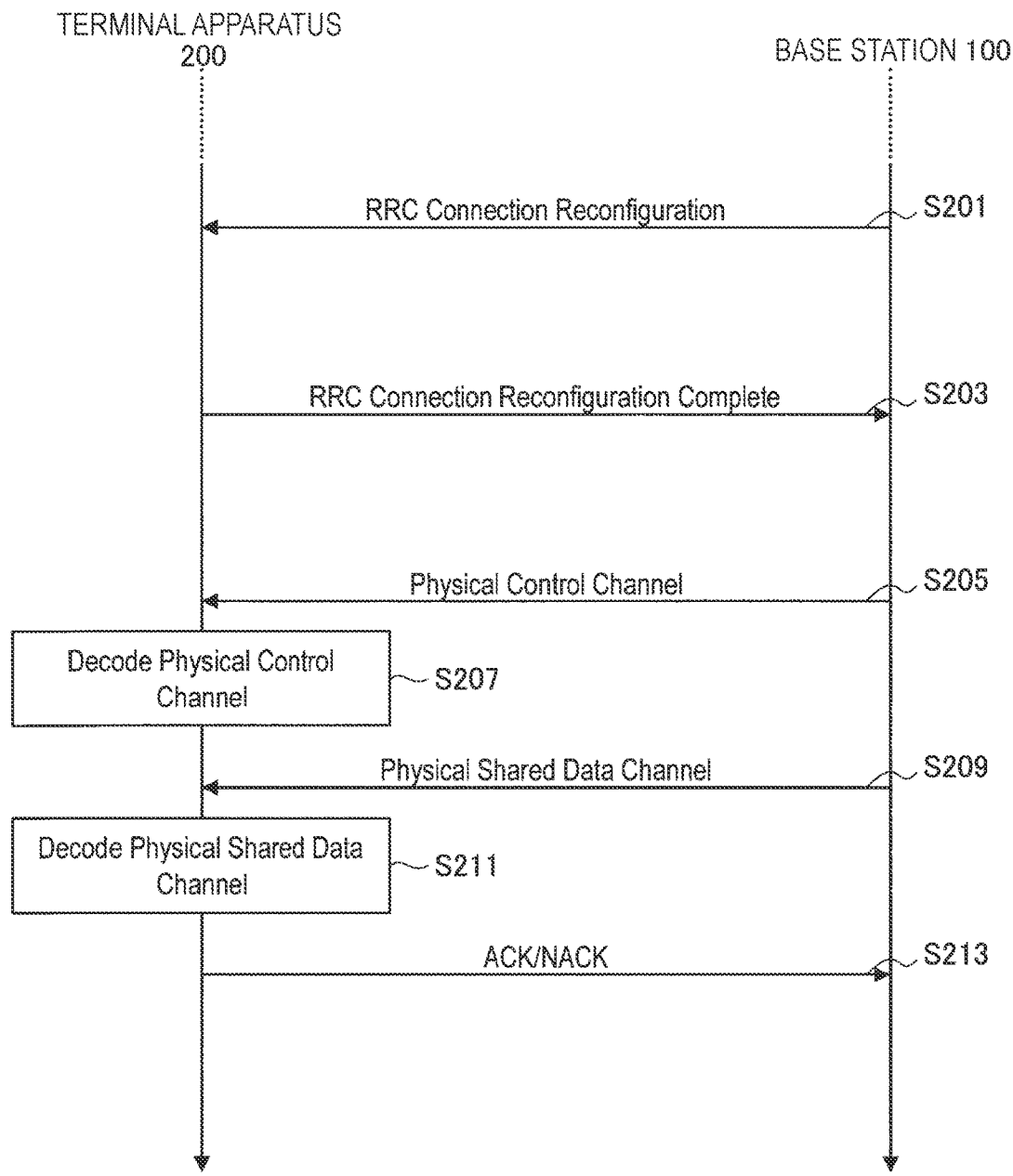
FIG. 15 is an explanatory diagram for describing an example of a communication sequence in a case where FTN is employed for a downlink.

With reference to FIG. 15, the above makes, as an example of a communication sequence in the case where FTN is employed for a downlink, description, focusing especially on an example of the case where the base station 100 uses RRC connection reconfiguration to notify the terminal apparatus 200 of an FTN parameter.

(a-2) Notification Through System Information

Next, with reference to FIG. 16, as an example of a communication sequence in the case where FTN is employed for a downlink, description will be made, focusing especially on an example of the case where the base station 100 uses system information (SIB: system information block) to notify the terminal apparatus 200 of an FTN parameter. FIG. 16 is an explanatory diagram for describing an example of a communication sequence in the case where FTN is employed for a downlink, and illustrates an example of the case where the base station 100 uses system information to notify the terminal apparatus 200 of an FTN parameter.

More specifically, the base station 100 broadcasts an SIB message to each terminal apparatus 200 positioned in the cell 10. At this time, the base station 100 includes an FTN parameter in the SIB message to notify each terminal apparatus 200 positioned in the cell 10 of the FTN parameter (S251). This allows the terminal apparatus 200 to recognize the compression coefficient $\tau_{i,p}$ used by the base station 100 to perform FTN mapping processing on transmission data. Note that, as described above, an SIB message is broadcast to each terminal apparatus 200 positioned in the cell 10, so that the terminal apparatus 200 makes no response to the SIB message for the base station 100. In other words, in the example illustrated in FIG. 16, the base station 100 unidirectionally notifies the terminal apparatus 200 positioned in the cell 10 of various kinds of parameter information (e.g., FTN parameter).

Figure 16:
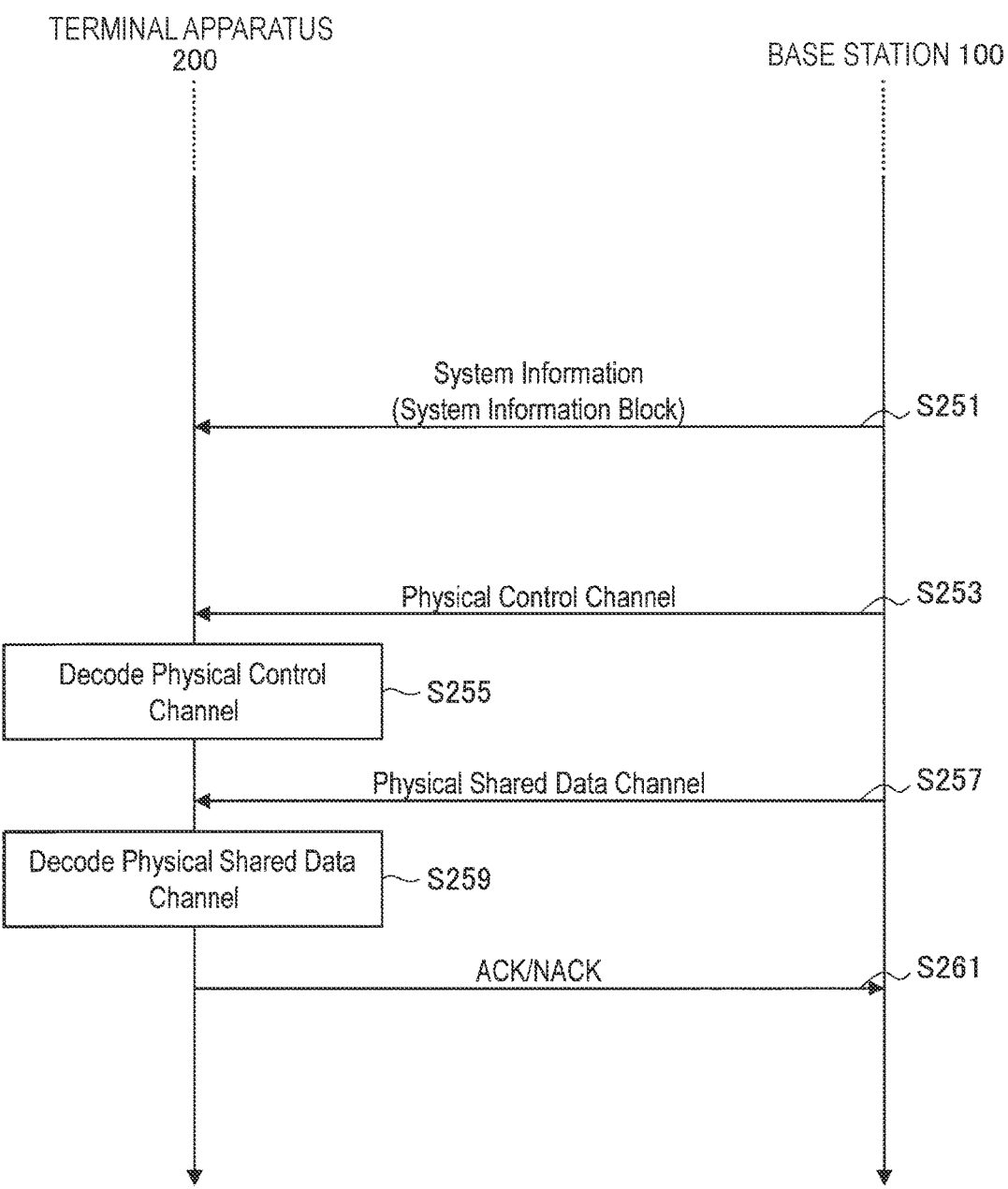
FIG. 16 is an explanatory diagram for describing an example of a communication sequence in the case where FTN is employed for the downlink.

Note that the communication sequences represented by reference numerals S253 to S261 in FIG. 16 are similar to the communication sequences represented by reference numerals S205 to S213 in FIG. 15, so that detailed description will be omitted.

With reference to FIG. 16, the above makes, as an example of a communication sequence in the case where FTN is employed for a downlink, description, focusing especially on an example of the case where the base station 100 uses system information to notify the terminal apparatus 200 of an FTN parameter.

(b) Regarding Application to Uplink

Next, with reference to FIGS. 17 and 18, an example of a communication sequence between the base station 100 and the terminal apparatus 200 in the case where FTN is employed for an uplink will be described.

On an uplink, the terminal apparatus 200 serves as a transmission apparatus, and the base station 100 serves as a reception apparatus. Meanwhile, on an uplink, the base station 100 takes charge in the notification of an FTN parameter and the allocation of a physical uplink shared channel (PUSCH) resource similarly to a downlink. That is, in the situation in which parameter setting set for each cell is performed (e.g., setting of an FTN parameter), it is more desirable in terms of an apparatus group in one area referred to as cell that the base station 100 play the role of the notification of various kinds of information and various kinds of control.

Note that, as long as the terminal apparatus 200 is capable of recognizing the compression coefficient $\tau_{i,p}$ applied to FTN mapping processing by the timing at which the FTN mapping processing is performed on transmission target data, the timing at which the base station 100 notifies the terminal apparatus 200 of an FTN parameter is not limited in particular. For example, an example of the timing at which the base station 100 notifies the terminal apparatus 200 of an FTN parameter includes RRC connection reconfiguration, system information, downlink control information (DCI), and the like. Especially in the case where the compression coefficient $\tau_{i,p}$ is set for each cell (cell-specific), it is more desirable that the base station 100 notify the terminal apparatus 200 of the compression coefficient $\tau_{i,p}$ in RRC connection reconfiguration or system information.

(b-1) Notification Through RRC Connection Reconfiguration

First, with reference to FIG. 17, as an example of a communication sequence in the case where FTN is employed for an uplink, description will be made, focusing especially on an example of the case where the base station 100 uses RRC connection reconfiguration to notify the terminal apparatus 200 of an FTN parameter. FIG. 17 is an explanatory diagram for describing an example of a communication sequence in the case where FTN is employed for an uplink, and illustrates an example of the case where the base station 100 uses RRC connection reconfiguration to notify the terminal apparatus 200 of an FTN parameter.

More specifically, when transmitting an RRC connection reconfiguration message to the terminal apparatus 200, the base station 100 notifies the terminal apparatus 200 of an FTN parameter (e.g., compression coefficient $\tau_{i,p}$) set for each cell (S301). When receiving the RRC connection reconfiguration message from the base station 100, the terminal apparatus 200 transmits an RRC connection reconfiguration complete message indicating that the terminal apparatus 200 has succeeded in correctly receiving the message to the base station 100 (S303). In this procedure, the terminal apparatus 200 becomes capable of recognizing the compression coefficient $\tau_{i,p}$ used to perform FTN mapping processing on data to be transmitted to the base station 100.

Next, the terminal apparatus 200 uses a physical uplink control channel (PUCCH) to request the base station 100 in to allocate a physical uplink shared channel (PUSCH) that is a frequency and time resource for transmitting and receiving data. The base station 100 that has received the PUCCH decodes the PUCCH to recognize the contents of the request from the terminal apparatus 200 to allocate a frequency and time resource (S305).

Next, the base station 100 uses a physical downlink control channel (PDCCH) to transmit allocation information of a PUSCH to the terminal apparatus 200 (S307). The terminal apparatus 200 that has received the PDCCH decodes the PDCCH, thereby becoming capable of recognizing the frequency and time resource (PUSCH) allocated to terminal apparatus 200 itself (S309).

Next, the terminal apparatus 200 performs various kinds of modulation processing including FTN mapping processing on transmission target data on the basis of the FTN parameter of which the terminal apparatus 200 has been notified by the base station 100 to generate a transmission signal. The terminal apparatus 200 then transmits the generated transmission signal onto the PUSCH resource designated by the allocation information from the base station 100 (S311). The base station 100 receives the designated PUSCH, and performs various kinds of demodulation and decoding processing including the FTN de-mapping processing based on the FTN parameter set for each cell on a reception signal to extract the data transmitted from the terminal apparatus 200 (S313). Note that, in the case where the base station 100 has succeeded in decoding the data with no error on the basis of error detection such as CRC, the base station 100 may return an ACK to the terminal apparatus 200. In addition, in the case where the base station 100 has detected an error on the basis of error detection such as CRC, the base station 100 may return a NACK to the terminal apparatus 200 (S315).

Figure 17:
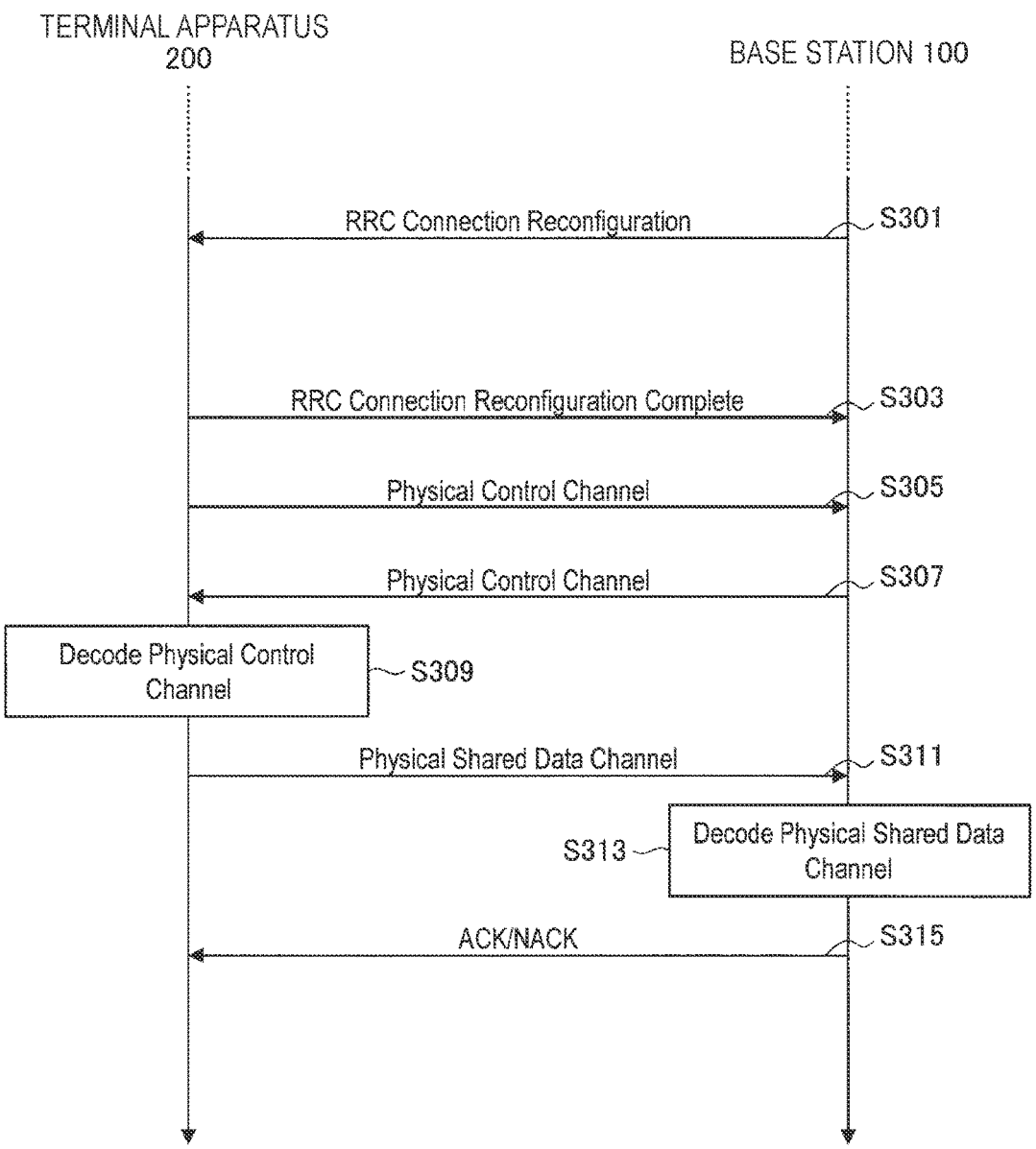
FIG. 17 is an explanatory diagram for describing an example of a communication sequence in a case where FTN is employed for an uplink.

With reference to FIG. 17, the above makes, as an example of a communication sequence in the case where FTN is employed for an uplink, description, focusing especially on an example of the case where the base station 100 uses RRC connection reconfiguration to notify the terminal apparatus 200 of an FTN parameter.

(b-2) Notification Through System Information

Next, with reference to FIG. 18, as an example of a communication sequence in the case where FTN is employed for an uplink, description will be made, focusing especially on an example of the case where the base station 100 uses system information to notify the terminal apparatus 200 of an FTN parameter. FIG. 18 is an explanatory diagram for describing an example of a communication sequence in the case where FTN is employed for an uplink, and illustrates an example of the case where the base station 100 uses system information to notify the terminal apparatus 200 of an FTN parameter.

More specifically, the base station 100 broadcasts an SIB message to each terminal apparatus 200 positioned in the cell 10. At this time, the base station 100 includes an FTN parameter in the SIB message to notify each terminal apparatus 200 positioned in the cell 10 of the FTN parameter (S351). This allows the terminal apparatus 200 to recognize the compression coefficient $\tau_{i,p}$ used to perform FTN mapping processing on data to be transmitted to the base station 100. Note that, similarly to the case of a downlink, an SIB message is broadcast to each terminal apparatus 200 positioned in the cell 10, so that the terminal apparatus 200 makes no response to the SIB message for the base station 100. In other words, in the example illustrated in FIG. 18, the base station 100 unidirectionally notifies the terminal apparatus 200 positioned in the cell 10 of various kinds of parameter information (e.g., FTN parameter).

Figure 18:
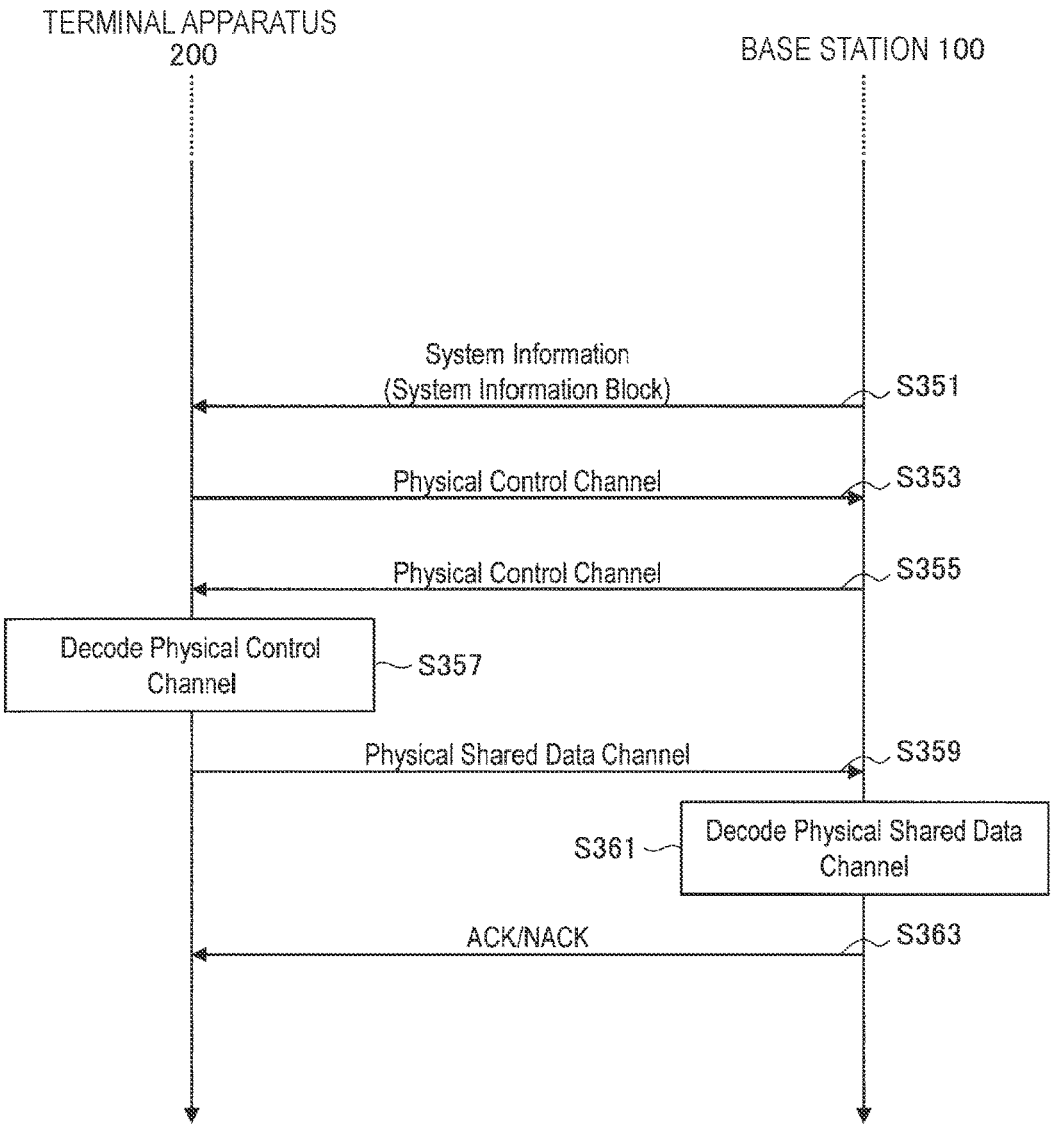
FIG. 18 is an explanatory diagram for describing an example of a communication sequence in the case where FTN is employed for the uplink.

Note that the communication sequences represented by reference numerals S353 to S363 in FIG. 18 are similar to the communication sequences represented by reference numerals S305 to S315 in FIG. 17, so that detailed description will be omitted.

With reference to FIG. 18, the above makes, as an example of a communication sequence in the case where FTN is employed for an uplink, description will be made, focusing especially on an example of the case where the base station 100 uses system information to notify the terminal apparatus 200 of an FTN parameter.

In a case where the compression coefficient is controlled cell-specifically, a semi-static case and a dynamic case are considered as updating units of coefficients in the time direction. As the semi-static case, updating the coefficient in units of a plurality of subframes, units of one radio frame, or units of a plurality of radio frames is considered. By updating the coefficient in this way, the base station 100 (the transmission apparatus) and the terminal apparatus 200 (the reception apparatus) can continue communication by continuing a time of a degree which is setting performed once. In addition, by updating the coefficient in this way, an effect of suppressing an increase in overhead can be expected in the base station 100 and the terminal apparatus 200.

On the other hand, as the dynamic updating case, for example, updating the coefficient in units of one subframe or units of a plurality of subframes is considered. Alternatively, as the dynamic updating case, updating the coefficient aperiodically at each subframe can also be considered. In the dynamic updating case, the transmission apparatus and the reception apparatus can set a value of the compression coefficient in accordance with information transmitted with a physical control channel (PDCCH or ePDCCH). By updating the coefficient in this way, the base station 100 (the transmission apparatus) and the terminal apparatus 200 (the reception apparatus) can associate parameters flexibly in accordance with a change in a radio wave propagation environment.

(c) Regarding Application to Communication System in which Carrier Aggregation is Employed Next, an example of a communication sequence between the base station 100 and the terminal apparatus 200 in the case where FTN is employed for a communication system in which carrier aggregation is employed will be described.

In the above-described example of a communication sequence on an uplink and a downlink, a frequency channel used for the notification of an FTN parameter is not mentioned in particular. Meanwhile, in the case where a plurality of frequency channels are used in a cell like carrier aggregation, it is possible to use a desired channel for the notification of an FTN parameter.

Figure 19:
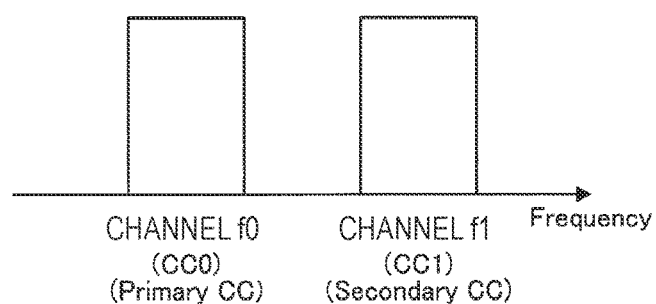
FIG. 19 is a diagram illustrating an example of a frequency channel used for communication between a base station and a terminal apparatus in a communication system in which carrier aggregation is employed.

Accordingly, in the present description, an example of a communication sequence between the base station 100 and the terminal apparatus 200 in the case where a plurality of frequency channels are used in a cell will be described on the basis of the example illustrated in FIG. 19. FIG. 19 is a diagram illustrating an example of a frequency channel used for communication between the base station 100 and the terminal apparatus 200 in a communication system including carrier aggregation. Specifically, FIG. 19 illustrates an example of the case where the CC 0 and the CC 1 are used as CCs for a transmission apparatus to transmit data. Note that, in the case where the respective frequency channels corresponding to the CC 0 and the CC 1 are represented as channels f0 and f1, it is assumed that the magnitude relationship between the channels f0 and f1 with respect to frequency is f0<f1. In addition, in the example illustrated in FIG. 19, it is assumed that the CC 0 is set as a PCC, and the CC 1 is set as an SCC.

(c-1) Notification of FTN Parameter Through Channel to which FTN is Applied

Figure 20:
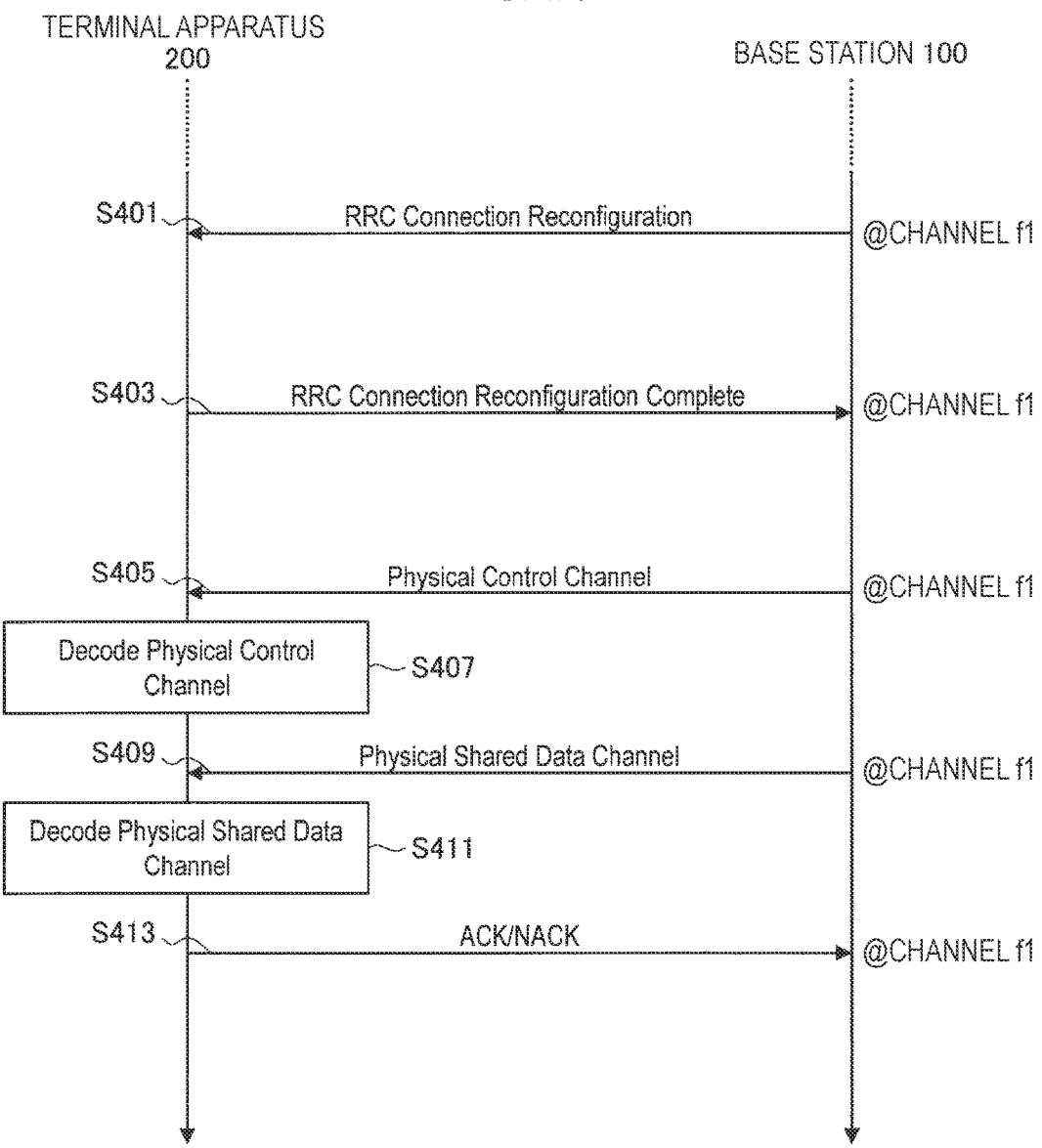
FIG. 20 is an explanatory diagram for describing an example of a communication sequence in a case where FTN is employed for a downlink in a communication system in which carrier aggregation is employed.
Figure 21:
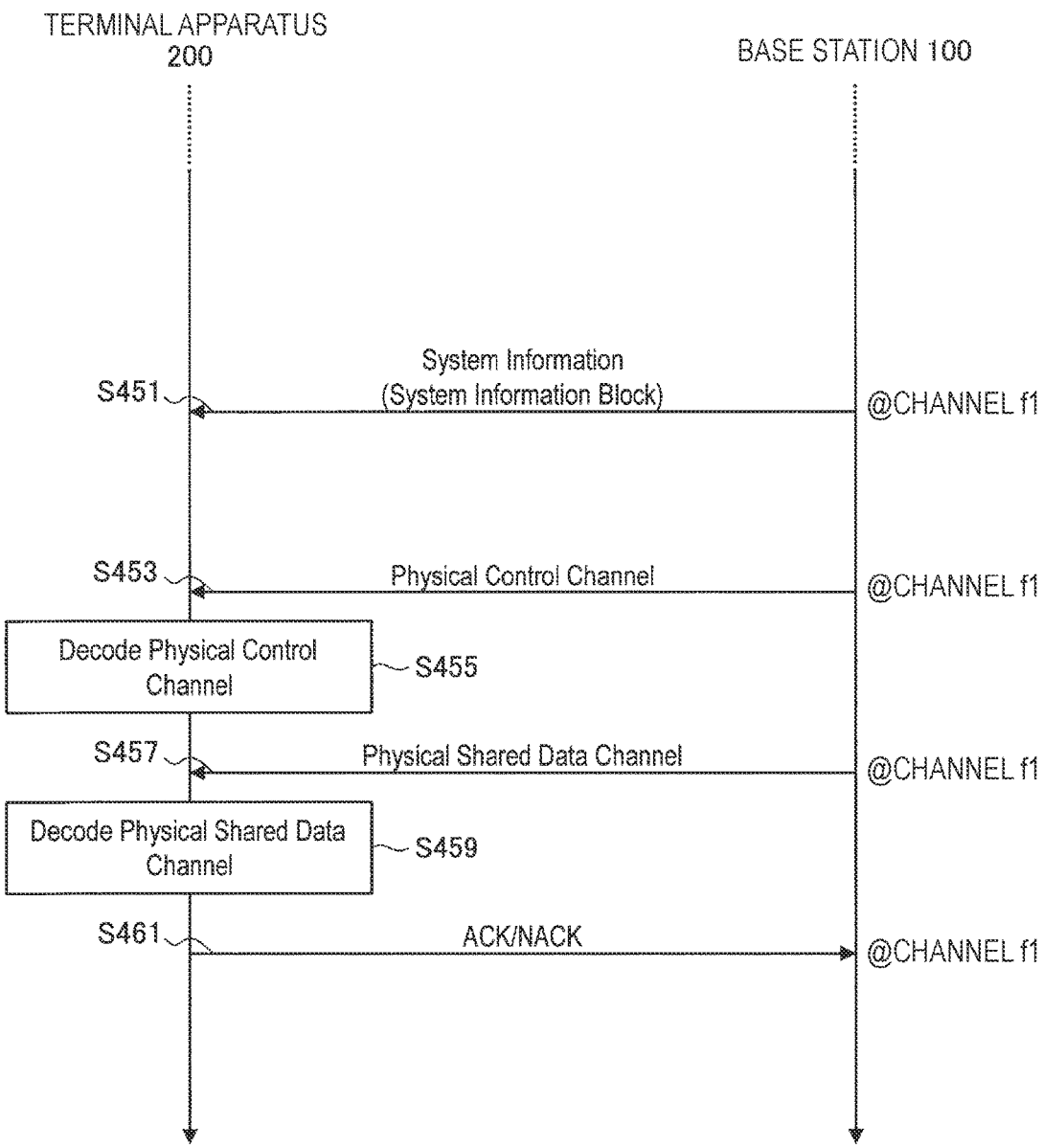
FIG. 21 is an explanatory diagram for describing an example of a communication sequence in the case where FTN is employed for the downlink in the communication system in which carrier aggregation is employed.

First, with reference to FIGS. 20 and 21, an example of the case where the base station 100 uses a frequency channel to which FTN is applied to notify the terminal apparatus 200 of an FTN parameter will be described. FIGS. 20 and 21 are explanatory diagrams each for describing an example of a communication sequence in the case where FTN is employed for the downlink in the communication system in including carrier aggregation. Note that FIGS. 20 and 21 each illustrate an example of a communication sequence between the base station 100 and the terminal apparatus 200 in the case where the base station 100 uses a frequency channel to which FTN is applied to notify the terminal apparatus 200 of an FTN parameter.

For example, similarly to the example described with reference to FIG. 15, FIG. 20 illustrates an example of the case where FTN is employed for a downlink, and the base station 100 uses RRC connection reconfiguration to notify the terminal apparatus 200 of an FTN parameter. Note that the communication sequences represented by reference numerals S401 to S413 in FIG. 20 are similar to the communication sequences represented by reference numerals S201 to S213 in FIG. 15, so that detailed description will be omitted. In addition, FIG. 20 illustrates an example of the case where FTN is applied to the channel f1 (i.e., CC 1 that is an SCC).

Specifically, in the example illustrated in FIG. 20, the base station 100 uses, as represented by a reference numeral S401, the channel f1 to transmit an RRC connection reconfiguration message to the terminal apparatus 200. At this time, the base station 100 notifies the terminal apparatus 200 of an FTN parameter (e.g., compression coefficient $\tau_{i,p}$) set for each cell.

In addition, the base station 100 performs various kinds of modulation processing including FTN mapping processing on transmission target data on the basis of the FTN parameter set for each cell to generate a transmission signal. The base station 100 then uses, as represented by a reference numeral S409, the channel f1 to transmit the transmission signal onto the PDSCH resource designated for the terminal apparatus 200.

In addition, as another example, similarly to the example described with reference to FIG. 16, FIG. 21 illustrates an example of the case where FTN is employed for a downlink, and the base station 100 uses system information to notify the terminal apparatus 200 of an FTN parameter. Note that the communication sequences represented by reference numerals S451 to S461 in FIG. 21 are similar to the communication sequences represented by reference numerals S251 to S261 in FIG. 16, so that detailed description will be omitted. In addition, FIG. 21 illustrates an example of the case where FTN is applied to the channel f1 (i.e., CC 1 that is an SCC).

Specifically, in the example illustrated in FIG. 21, the base station 100 uses, as represented by a reference numeral S451, the channel f1 to broadcast an SIB message to each terminal apparatus 200 positioned in the cell 10. At this time, the base station 100 includes an FTN parameter in the SIB message to notify each terminal apparatus 200 positioned in the cell 10 of the FTN parameter.

In addition, the base station 100 performs various kinds of modulation processing including FTN mapping processing on transmission target data on the basis of the FTN parameter set for each cell to generate a transmission signal. The base station 100 then uses, as represented by a reference numeral S457, the channel f1 to transmit the transmission signal onto the PDSCH resource designated for the terminal apparatus 200.

With reference to FIGS. 20 and 21, the above describes an example of the case where the base station 100 uses a frequency channel to which FTN is applied to notify the terminal apparatus 200 of an FTN parameter. Note that, although the above focuses on an example of the case where FTN is applied to a downlink for description, it goes without saying that the same applies to the case where FTN is applied to an uplink.

(c-2) Notification of FTN Parameter Through Predetermined Channel

Figure 22:
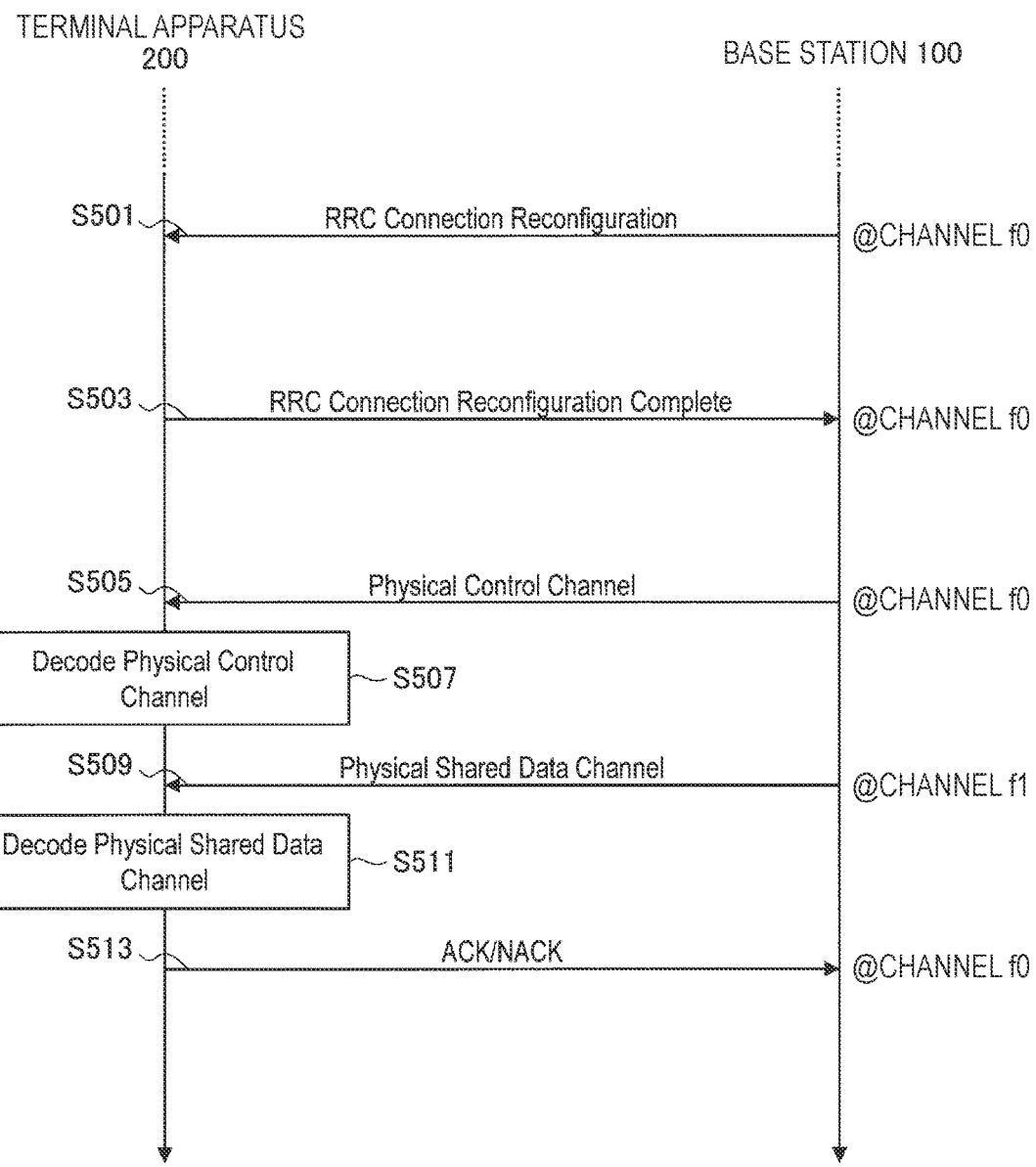
FIG. 22 is an explanatory diagram for describing an example of a communication sequence in the case where FTN is employed for the downlink in the communication system in which carrier aggregation is employed.
Figure 23:
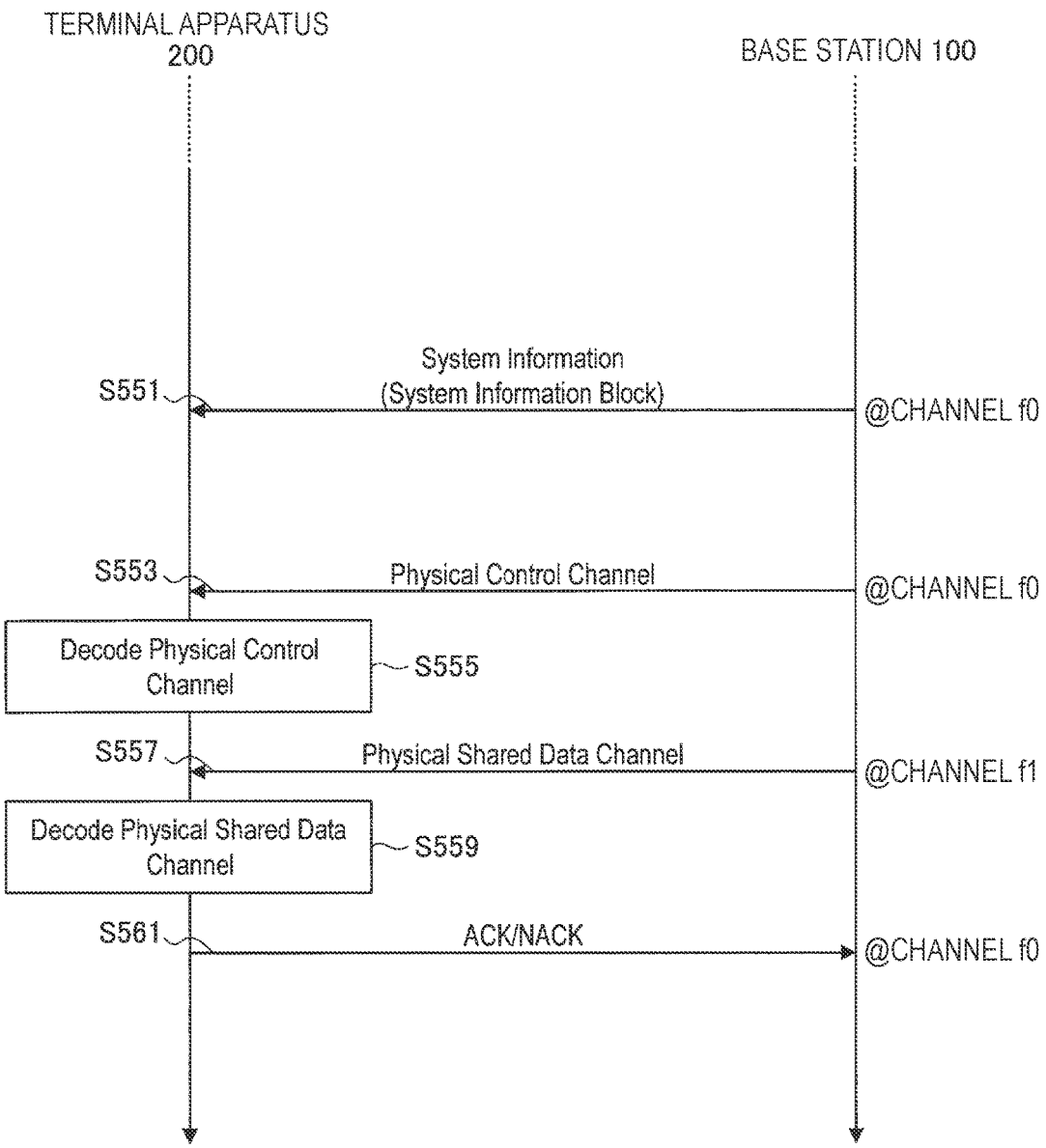
FIG. 23 is an explanatory diagram for describing an example of a communication sequence in the case where FTN is employed for the downlink in the communication system in which carrier aggregation is employed.

Next, with reference to FIGS. 22 and 23, an example of the case where the base station 100 uses a predetermined frequency channel to notify the terminal apparatus 200 of an FTN parameter will be described. FIGS. 22 and 23 are explanatory diagrams each for describing an example of a communication sequence in the case where FTN is employed for a downlink in the communication system in which carrier aggregation is employed. Note that FIGS. 22 and 23 each illustrate an example of a communication sequence between the base station 100 and the terminal apparatus 200 in the case where the base station 100 uses a predetermined frequency channel to notify the terminal apparatus 200 of an FTN parameter. In addition, in the present description, description will be made, focusing especially on the case where the base station 100 uses another frequency channel different from a frequency channel to which FTN is applied to notify the terminal apparatus 200 of an FTN parameter.

For example, similarly to the example described with reference to FIG. 15, FIG. 22 illustrates an example of the case where FTN is employed for a downlink, and the base station 100 uses RRC connection reconfiguration to notify the terminal apparatus 200 of an FTN parameter. Note that the communication sequences represented by reference numerals S501 to S513 in FIG. 22 are similar to the communication sequences represented by reference numerals S201 to S213 in FIG. 15, so that detailed description will be omitted.

FIG. 22 illustrates an example of the case where FTN is applied to the channel f1 (i.e., CC 1 that is an SCC), and the base station 100 uses the channel f0 (i.e., CC 0 that is a PCC) to notify the terminal apparatus 200 of an FTN parameter. In the example illustrated in FIG. 22, in the case where the base station 100 transmits or receives information for controlling communication with the terminal apparatus 200, the base station 100 uses the channel f0 (i.e., PCC), and in the case where the base station 100 transmits live data, the base station 100 uses the channel f1 (i.e., SCC) to which FTN is applied.

More specifically, in the example illustrated in FIG. 22, the base station 100 uses, as represented by a reference numeral S501, the channel f0 (i.e., PCC) to transmit an RRC connection reconfiguration message to the terminal apparatus 200. At this time, the base station 100 notifies the terminal apparatus 200 of an FTN parameter (e.g., compression coefficient $\tau_{i,p}$) set for each cell.

In addition, the base station 100 performs various kinds of modulation processing including FTN mapping processing on transmission target data on the basis of the FTN parameter set for each cell to generate a transmission signal. The base station 100 then uses, as represented by a reference numeral S509, the channel f1 (i.e., SCC) to transmit the transmission signal onto the PDSCH resource designated for the terminal apparatus 200.

In addition, as another example, similarly to the example described with reference to FIG. 16, FIG. 23 illustrates an example of the case where FTN is employed for a downlink, and the base station 100 uses system information to notify the terminal apparatus 200 of an FTN parameter. Note that the communication sequences represented by reference numerals S551 to S561 in FIG. 23 are similar to the communication sequences represented by reference numerals S251 to S261 in FIG. 16, so that detailed description will be omitted.

FIG. 23 illustrates an example of the case where FTN is applied to the channel f1 (i.e., CC 1 that is an SCC), and the base station 100 uses the channel f0 (i.e., CC 0 that is a PCC) to notify the terminal apparatus 200 of an FTN parameter. In the example illustrated in FIG. 23, in the case where the base station 100 transmits or receives information for controlling communication with the terminal apparatus 200, the base station 100 uses the channel f0 (i.e., PCC), and in the case where the base station 100 transmits live data, the base station 100 uses the channel f1 (i.e., SCC) to which FTN is applied.

More specifically, in the example illustrated in FIG. 23, the base station 100 uses, as represented by a reference numeral S551, the channel f0 (i.e., PCC) to broadcast an SIB message to each terminal apparatus 200 positioned in the cell 10. At this time, the base station 100 includes an FTN parameter in the SIB message to notify each terminal apparatus 200 positioned in the cell 10 of the FTN parameter.

In addition, the base station 100 performs various kinds of modulation processing including FTN mapping processing on transmission target data on the basis of the FTN parameter set for each cell to generate a transmission signal. The base station 100 then uses, as represented by a reference numeral S557, the channel f1 (i.e., SCC) to transmit the transmission signal onto the PDSCH resource designated for the terminal apparatus 200.

As described above, the notification of an FTN parameter is issued concentratedly through a predetermined frequency channel, thereby making it possible to decrease the overhead in a communication sequence that uses another frequency channel. Note that choices of the frequency channel used for the notification of an FTN parameter include a PCC and an SCC, but it is more desirable to employ the configuration in which a PCC is used to perform the procedure for the notification of an FTN parameter from the perspective that all the terminal apparatuses 200 in a cell are capable of the reception. In addition, as described above, applying a larger value than another CC (SCC) or 1 ($\tau$=1) as the compression coefficient corresponding to a PCC makes it possible to make the procedure for the notification of an FTN parameter, or the like more stable.

With reference to FIGS. 22 and 23, the above describes an example of the case where the base station 100 uses a frequency channel to which FTN is applied to notify the terminal apparatus 200 of an FTN parameter. Note that, although the above focuses on an example of the case where FTN is applied to a downlink for description, it goes without saying that the same applies to the case where FTN is applied to an uplink.

(c-3) Example of Case where FTN is not Applied to Physical Control Channel

Figure 24:
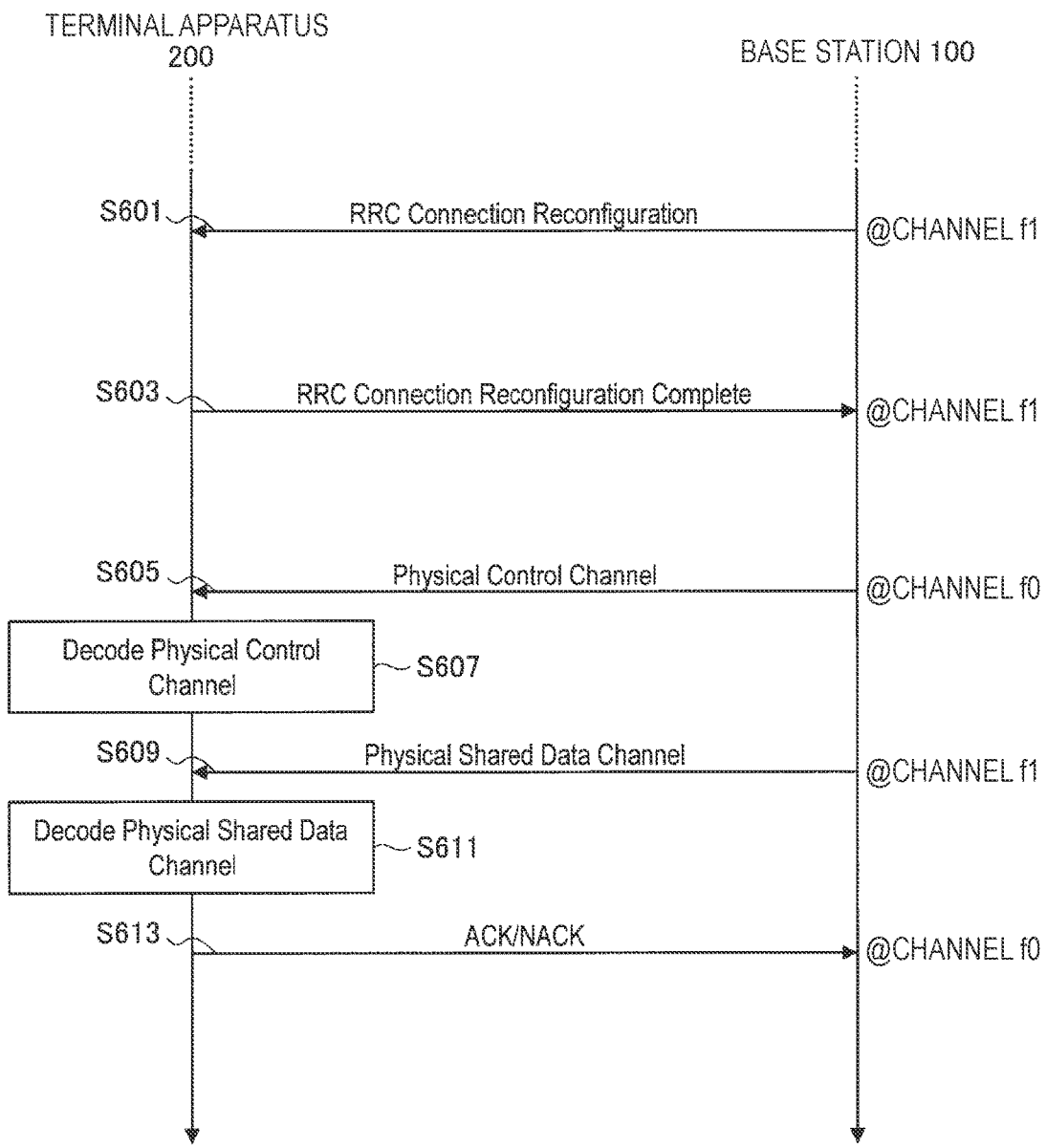
FIG. 24 is an explanatory diagram for describing an example of a communication sequence in the case where FTN is employed for the downlink in the communication system in which carrier aggregation is employed.
Figure 25:
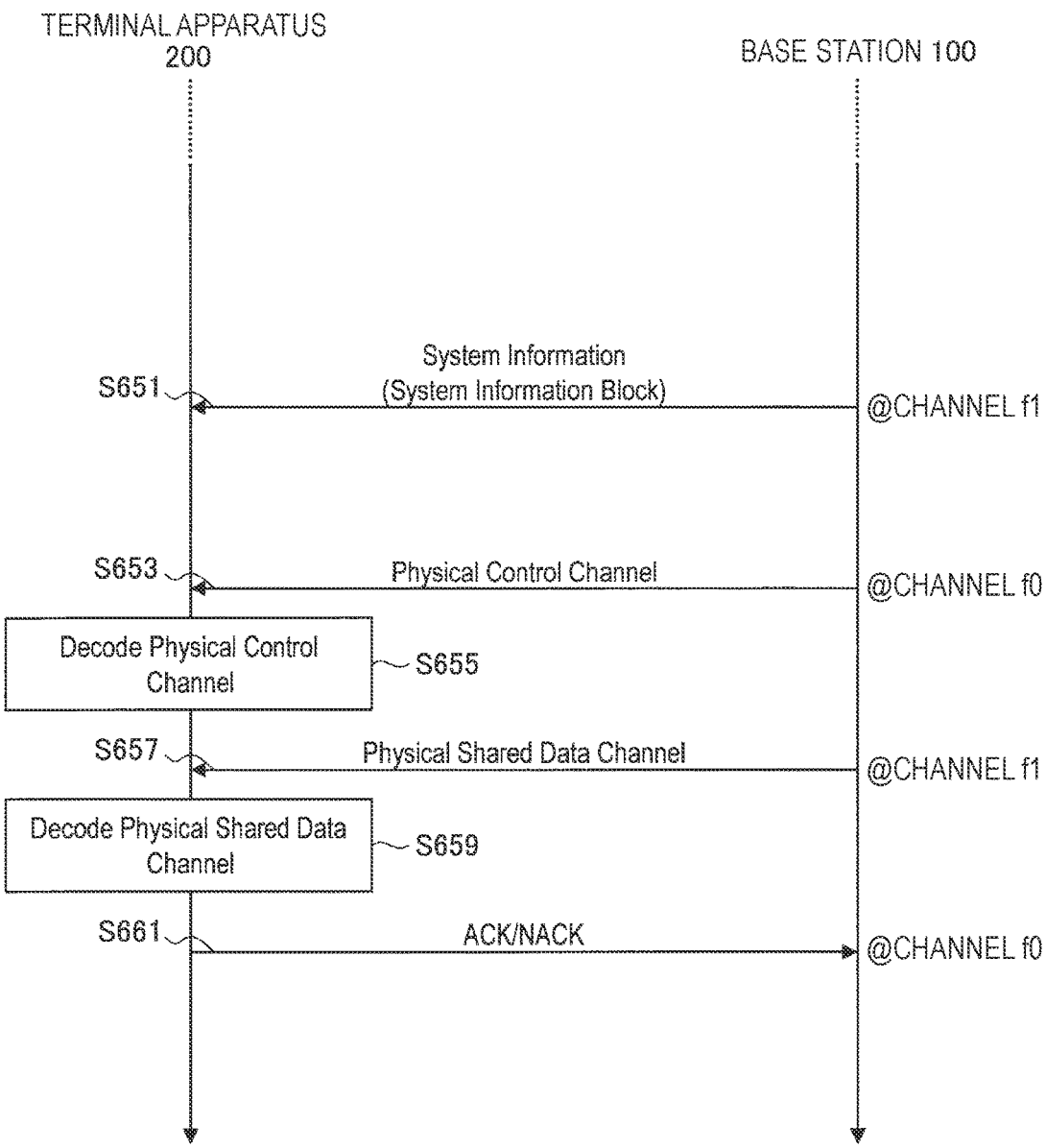
FIG. 25 is an explanatory diagram for describing an example of a communication sequence in the case where FTN is employed for the downlink in the communication system in which carrier aggregation is employed.

Next, with reference to FIGS. 24 and 25, an example of the case where FTN is not applied to a physical control channel, but FTN is applied when the notification of an FTN parameter is issued and data is transmitted will be described. FIGS. 24 and 25 are explanatory diagrams each for describing an example of a communication sequence in the case where FTN is employed for the downlink in the communication system in which carrier aggregation is employed. Note that FIGS. 24 and 25 each illustrate an example of a communication sequence between the base station 100 and the terminal apparatus 200 in the case where FTN is not applied to a physical control channel, but FTN is applied when the notification of an FTN parameter is issued and data is transmitted.

For example, similarly to the example described with reference to FIG. 15, FIG. 24 illustrates an example of the case where FTN is employed for a downlink, and the base station 100 uses RRC connection reconfiguration to notify the terminal apparatus 200 of an FTN parameter. Note that the communication sequences represented by reference numerals S601 to S613 in FIG. 24 are similar to the communication sequences represented by reference numerals S201 to S213 in FIG. 15, so that detailed description will be omitted.

FIG. 24 illustrates an example of the case where FTN is applied to the channel f1 (i.e., CC 1 that is an SCC). In the example illustrated in FIG. 24, the base station 100 uses the channel f0 (i.e., PCC) to transmit and receive RRC connection reconfiguration such as a PDCCH and a PUCCH, and uses the channel f1 (i.e., SCC) to transmit and receive the other control channels (e.g., RRC connection, physical shared data channel, and the like).

More specifically, in the example illustrated in FIG. 24, the base station 100 uses, as represented by a reference numeral S601, the channel f1 (i.e., SCC) to transmit an RRC connection reconfiguration message to the terminal apparatus 200. At this time, the base station 100 notifies the terminal apparatus 200 of an FTN parameter (e.g., compression coefficient $\tau_{i,p}$) set for each cell (S601). In addition, the channel f1 (i.e., SCC) is also used to transmit an RRC connection reconfiguration complete message from the terminal apparatus 200 as a response to the RRC connection reconfiguration message (S603).

In addition, when using a PDCCH to transmit allocation information of a PDSCH to the terminal apparatus 200, the base station 100 uses the channel f0 (i.e., PCC) (S605).

Next, the base station 100 performs various kinds of modulation processing including FTN mapping processing on transmission target data to generate a transmission signal, and uses the channel f1 (i.e., SCC) to transmit the transmission signal onto a designated PDSCH resource (S609).

In addition, the terminal apparatus 200 returns an ACK or a NACK to the base station 100 in accordance with a decoding result of the data transmitted from the base station 100. At this time, the terminal apparatus 200 uses the channel f0 (i.e., PCC) to return an ACK or a NACK to the base station 100 (S613).

In addition, as another example, similarly to the example described with reference to FIG. 16, FIG. 25 illustrates an example of the case where FTN is employed for a downlink, and the base station 100 uses system information to notify the terminal apparatus 200 of an FTN parameter. Note that the communication sequences represented by reference numerals S651 to S661 in FIG. 25 are similar to the communication sequences represented by reference numerals S251 to S261 in FIG. 16, so that detailed description will be omitted.

FIG. 25 illustrates an example of the case where FTN is applied to the channel f1 (i.e., CC 1 that is an SCC). In the example illustrated in FIG. 25, the base station 100 uses the channel f0 (i.e., PCC) to transmit and receive RRC connection reconfiguration such as a PDCCH and a PUCCH, and uses the channel f1 (i.e., SCC) to transmit and receive the other control channels (e.g., RRC connection, physical shared data channel, and the like).

More specifically, in the example illustrated in FIG. 25, the base station 100 uses, as represented by a reference numeral S651, the channel f1 (i.e., SCC) to broadcast an SIB message to each terminal apparatus 200 positioned in the cell 10. At this time, the base station 100 includes an FTN parameter in the SIB message to notify each terminal apparatus 200 positioned in the cell 10 of the FTN parameter.

In addition, when using a PDCCH to transmit allocation information of a PDSCH to the terminal apparatus 200, the base station 100 uses the channel f0 (i.e., PCC) (S653).

Next, the base station 100 performs various kinds of modulation processing including FTN mapping processing on transmission target data to generate a transmission signal, and uses the channel f1 (i.e., SCC) to transmit the transmission signal onto a designated PDSCH resource (S657).

In addition, the terminal apparatus 200 returns an ACK or a NACK to the base station 100 in accordance with a decoding result of the data transmitted from the base station 100. At this time, the terminal apparatus 200 uses the channel f0 (i.e., PCC) to return an ACK or a NACK to the base station 100 (S661).

With reference to FIGS. 24 and 25, the above describes an example of the case where FTN is not applied to a physical control channel, but FTN is applied when the notification of an FTN parameter is issued and data is transmitted. Note that, although the above focuses on an example of the case where FTN is applied to a downlink for description, it goes without saying that the same applies to the case where FTN is applied to an uplink.

In a case where the compression coefficient is controlled cell-specifically, a semi-static case and a dynamic case are considered as updating units of coefficients in the time direction. As an updating unit of the semi-static case, updating the coefficient in units of a plurality of subframes, units of one radio frame, or units of a plurality of radio frames is considered. By updating the coefficient in units of a plurality of subframes, units of one radio frame, or units of a plurality of radio frames in this way, the transmission apparatus and the reception apparatus can continue communication by continuing a time of a degree which is setting performed once. In addition, by updating the coefficient in units of a plurality of subframes, units of one radio frame, or units of a plurality of radio frames in this way, an effect of suppressing an increase in overhead can be expected.

On the other hand, as an updating unit of the dynamic case, updating the coefficient in units of one subframe or units of a plurality of subframes is considered. Alternatively, as the updating unit of the dynamic case, updating the coefficient aperiodically at each subframe can also be considered. By updating the coefficient in units of one subframe or units of a plurality of subframes or updating the coefficient aperiodically at each subframe, the transmission apparatus can associate parameters flexibly in accordance with a change in a radio wave propagation environment.

(6) Example of Sequence in which Compression Coefficient is Changed for Each User (User-Specific)

As described above, in addition to controlling the compression coefficient cell-specifically to change the compression coefficient, the compression coefficient may be controlled for each user (user-specific) to be changed. By controlling the compression coefficient for each user to change the compression coefficient, a transmission parameter can be controlled to be changed while adapting or tracking a change in a radio wave propagation environment even in a case where the radio wave propagation environment is different for each user or in a case where the radio wave propagation environment is temporally frequently changed.

In a case where the compression coefficient is changed user-specifically, a physical control channel (PDCCH or PUCCH) may also be used as a channel for notifying the reception apparatus of parameters from the transmission apparatus or a channel for notifying the terminal apparatus 200 of parameters from the base station 100. The physical control channel can be said to be appropriate for control for each user since the transmission is performed as a set for each related physical shared channel (PDSCH or PUSCH). Further, of the physical control channels, using control information (DCI or UCI) can be said to be appropriate for notification. The control information is used to notify of information related to user-specific scheduling such as resource allocation, modulation encoding information, precoding information, or retransmission control information, it is appropriate to also include all the parameters related to user-specific FTN.

In particular, in a case where a cellular system is considered, the base station 100 preferably notifies the terminal apparatus 200 of the parameters on both uplink and downlink. This is because, in the case of a cellular system, the base station 100 can perform control such as scheduling on the subordinate terminal apparatus 200 and the base station 100 can also perform control related to FTN to unitarily integrate a flow of the control.

Figure 26:
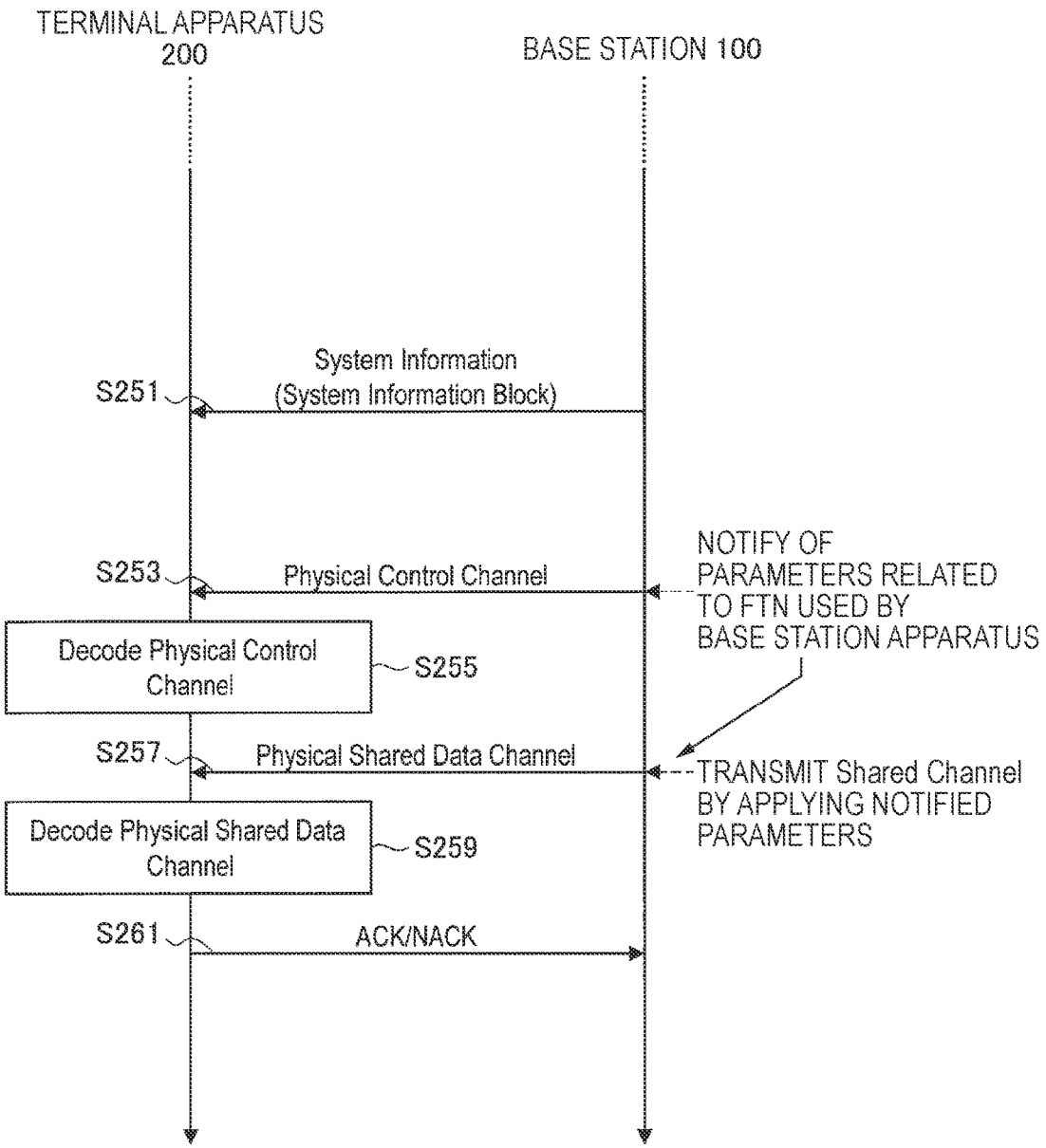
FIG. 26 is an explanatory diagram for describing an example of a communication sequence in a case where FTN is employed for the downlink.

FIG. 26 is an explanatory diagram for describing an example of a communication sequence in a case where FTN is employed for the downlink as in FIG. 16. An example of a case where the base station 100 notifies the terminal apparatus 200 of FTN parameters by the system information is illustrated.

In the example illustrated in FIG. 26, the base station 100 notifies the terminal apparatus 200 of the parameters related to FTN used by the base station 100 at the time of transmission of PDCCH in step S253 and transmits the physical shared data channel to the terminal apparatus 200 by applying the parameters that are notified of in step S257.

Figure 27:
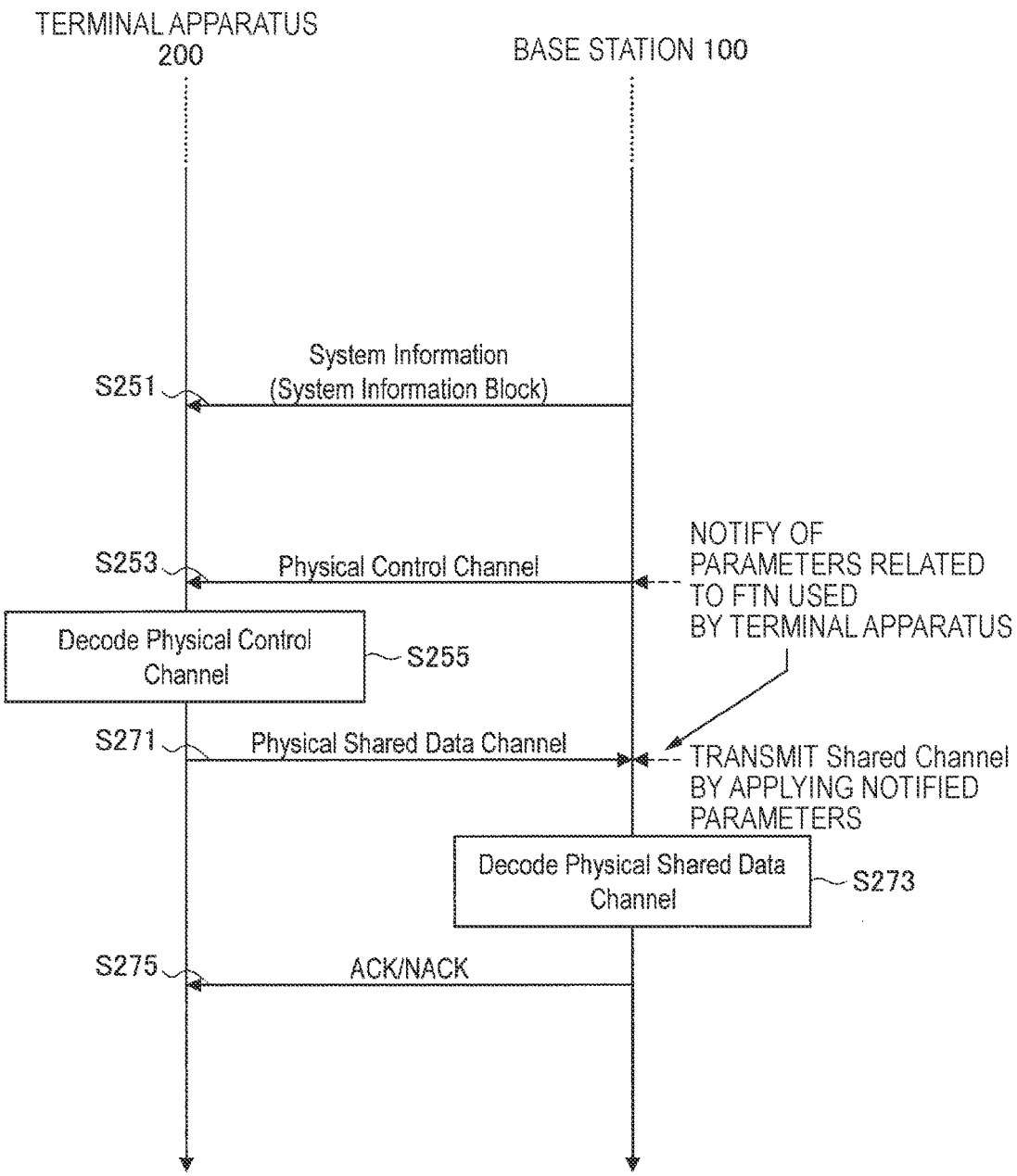
FIG. 27 is an explanatory diagram for describing an example of a communication sequence in a case where FTN is employed for the uplink.

FIG. 27 is an explanatory diagram for describing an example of a communication sequence in a case where FTN is employed for the uplink. An example of a case where the base station 100 notifies the terminal apparatus 200 of the FTN parameters by the system information is illustrated.

In the example illustrated in FIG. 27, the base station 100 notifies the terminal apparatus 200 of the parameters related to FTN used by the base station 100 at the time of transmission of PDCCH in step S253 and the terminal apparatus 200 transmits the physical shared data channel to the base station 100 by applying the parameters that are notified of in step S2717. The base station 100 performs various kinds of demodulation and decoding processing including the FTN de-mapping processing based on the FTN parameter set for each cell on a reception signal to extract the data transmitted from the terminal apparatus 200 (S273). In a case where the base station 100 has succeeded in decoding the data with no errors on the basis of error detection such as CRC, the base station 100 may return an ACK to the terminal apparatus 200. In addition, in the case where the base station 100 has detected an error on the basis of error detection such as CRC, the base station 100 may return a NACK to the terminal apparatus 200 (S275).

In a case where the transmission apparatus notifies the reception apparatus of the parameters related to the compression coefficient as a part of the control information, it is preferable to discretely quantize the values of the parameters from the perspective of reduction of overhead. Therefore, in the notification, it is preferable to notify of the quantized values as indexes rather than including the values of the parameters and associate the indexes with the values in a one-to-one manner in advance. Table 2 shows an example of the association between indexes of the compression coefficient and the values of the compression coefficient.

TABLE 2

Example of Association between Index of Compression Coefficient and Value of Compression Coefficient

| Index of FTN Compression Coefficient | Value of FTN Compression Coefficient |
|---|---|
| 0 | $\tau 0$ |
| 1 | $\tau 1$ |
| 2 | $\tau 2$ |
| ... | ... |

Herein, although not shown in Table 2, a region for reservation may be secured so that an association relation has extendibility. When the region for reservation is secured, a place in which the value of the index is large may be set as the region for reservation. In addition, the compression coefficient is a nonnegative real number. The value of the coefficient preferably decreases as the index increases. This is because a signal processing load for receiving a compressed signal increases as the value decreases, and thus only an apparatus with a high signal processing capability can deal with the signal processing load in a case where the reserved region is used as an actual value due to future extendibility. In addition, when the index is 0 in Table 2, the compression coefficient may be set to 1 (no compression).

(7) Control (Synchronization) at Boundary of Resource Unit in Time Direction in Case where FTN is Introduced into Communication System Including Carrier Aggregation In a case where FTN is introduced into a communication system using carrier aggregation, a case where the length of the subframe differs between a plurality of component carriers (frequency channels) depending on the value of the compression coefficient is considered. In a case where the length of the subframe differs between the plurality of component carriers, the boundaries of the resource units in the time direction are considered to be fitted between the component carriers. This is because there is an influence on information notification and control in which the component carriers are straddled, such as cross-carrier scheduling in accordance with whether the boundaries are fitted.

As a method of fitting the resource units in the time direction, a method of fitting the boundaries of the subframes and a method of fitting the boundaries of the radio frames are considered. In a case where the boundaries of the subframe are fitted, a case where the boundaries of the radio frames are fitted naturally can also be considered.

Figure 28:
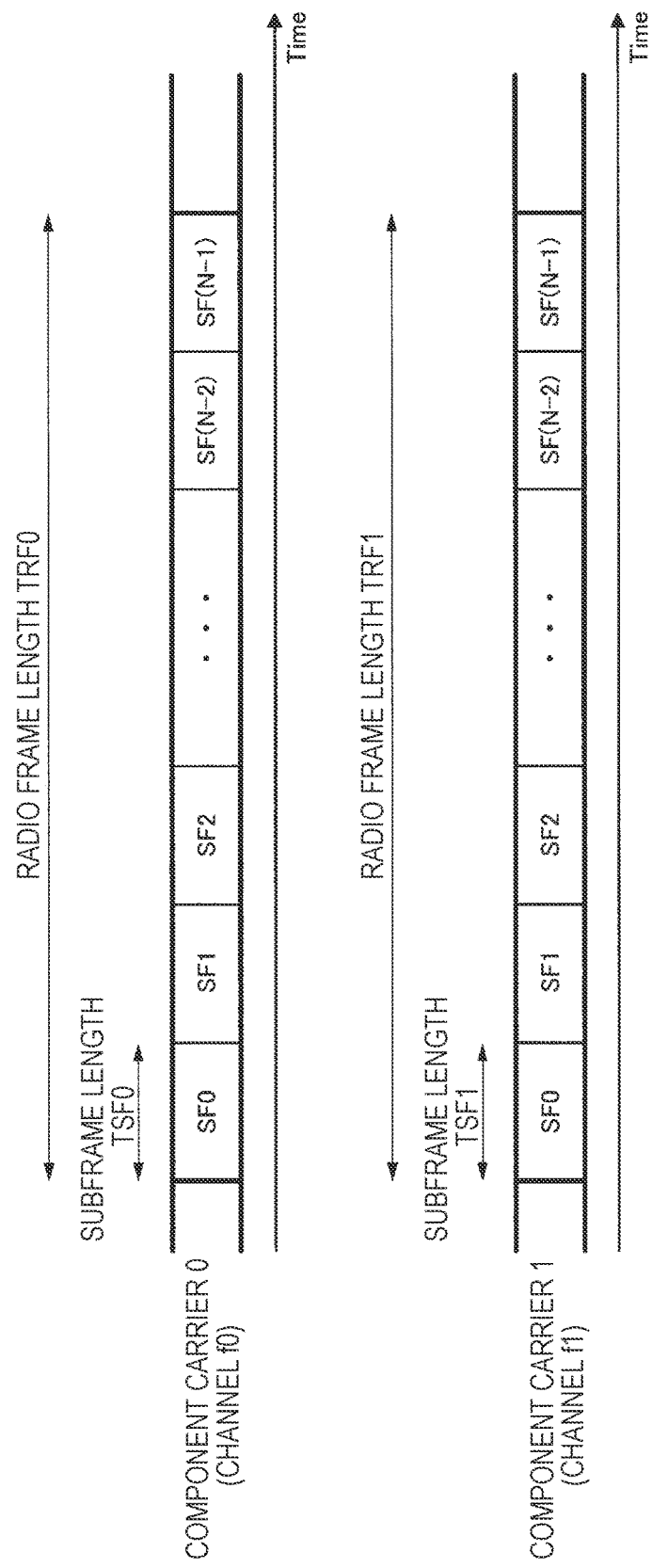
FIG. 28 is an explanatory diagram for describing an example of synchronization of boundaries in a subframe unit at the time of the carrier aggregation.

Two examples in which the boundaries of the subframes are fitted will be described. FIG. 28 is an explanatory diagram for describing an example of synchronization of boundaries in the subframe unit at the time of the carrier aggregation. FIG. 28 illustrates an example of a case where the boundaries in the subframe unit are aligned between the component carriers and the boundaries of the radio frames are also aligned.

In the example illustrated in FIG. 28, two component carriers are assumed, subframe lengths of the two component carriers are set to TSF0 and TSF1, and radio frame lengths of the two component carriers are set to TRF0 and TRF1. The alignment of the boundaries of the subframes between the component carriers is synonymous with an operation of the subframe lengths as TSF0==TSF1. In addition, in FIG. 28, the radio frame lengths TRF0==TRF1 are set. That is, the number N of subframes per radio frame can be said to be the same between the component carriers. The compression coefficient t may be set to differ or to be the same between the component carriers. In this case, in a case where the compression coefficient differs between the component carriers, a transmission time interval (TTI: transmission time) differs.

Figure 29:
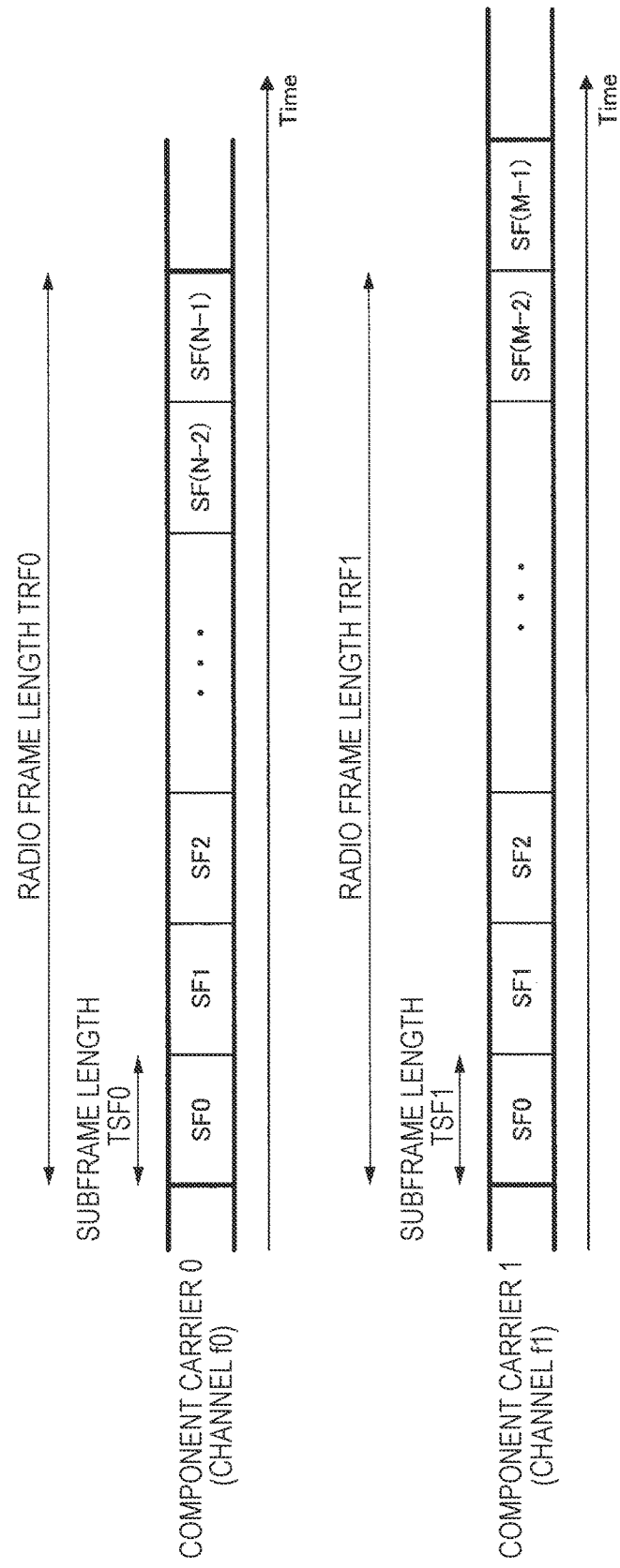
FIG. 29 is an explanatory diagram for describing an example of synchronization of boundaries in a subframe unit at the time of the carrier aggregation.

FIG. 29 is an explanatory diagram for describing an example of synchronization of boundaries in the subframe unit at the time of the carrier aggregation. FIG. 29 illustrates an example of another case where the boundaries in the subframe unit are aligned between the component carriers and the boundaries of the radio frames differ between the component carriers.

In the example illustrated in FIG. 29, two component carriers are assumed, subframe lengths of the two component carriers are set to TSF0 and TSF1, and radio frame lengths of the two component carriers are set to TRF0 and TRF1. In the example illustrated in FIG. 29, the alignment of the boundaries of the subframes between the component carriers is also synonymous with TSF0==TSF1. In the example illustrated in FIG. 29, however, the radio frame lengths TRF0≠TRF1 are set, that is, the boundaries of the radio frame lengths are not fitted. This means that the number of subframes per radio frame has a relation of M≠N. The number of subframes is changed so that a ratio of a synchronization signal (a primary synchronization signal (PSS), a secondary synchronization signal (SSS), or the like) or a physical broadcast channel (PBCH) of the subframe in the radio frame is considered to be lowered, that is, a ratio of a physical shared data channel (PDSCH, PUSCH, or the like) is considered to be raised, to improve frame use efficiency. As a result, the boundaries of the radio frames may not be fitted between the component carriers.

In a case where the boundaries of the subframes are aligned between the component carriers as in the examples illustrated in FIGS. 28 and 29, the transmission apparatus can perform control by the above-described cross-carrier scheduling. That is, the transmission apparatus can notify of scheduling information (DCI or the like) of another component carrier through a physical control channel of any component carrier.

Figure 30:
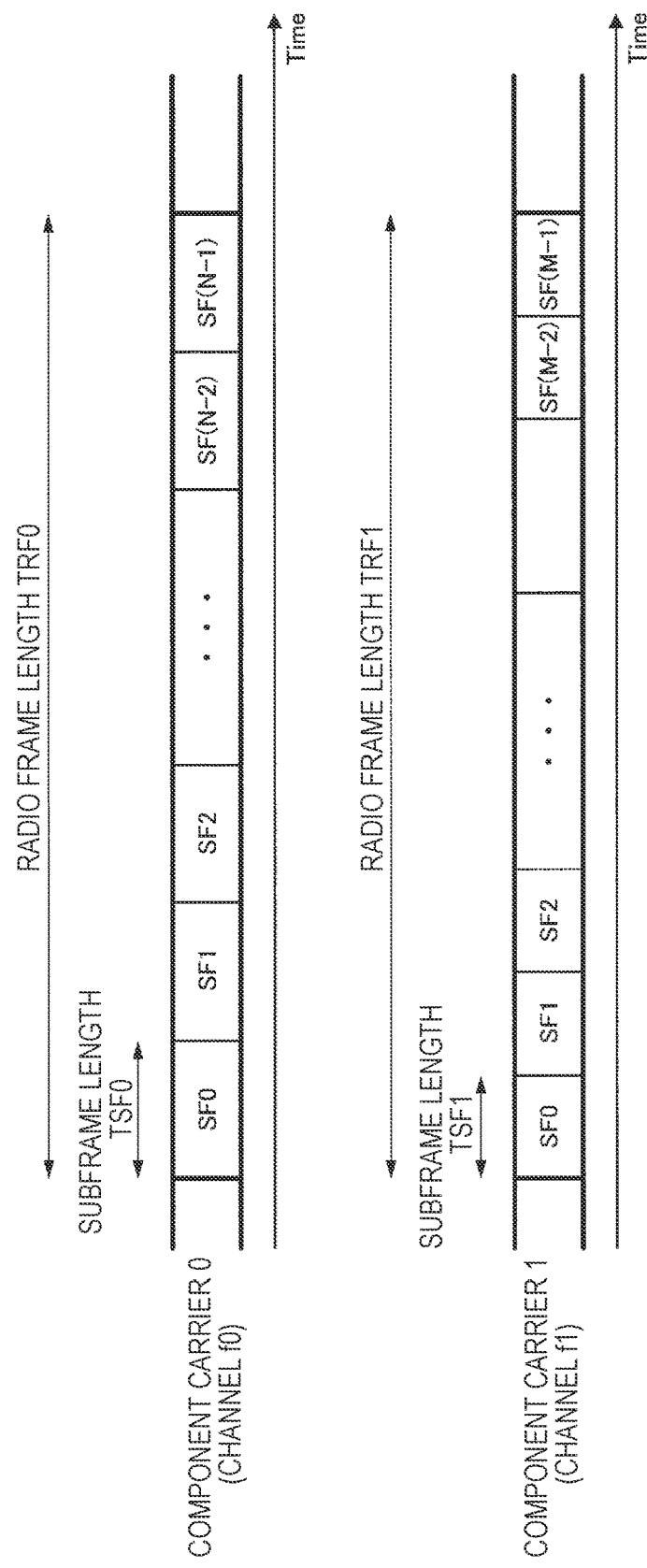
FIG. 30 is a diagram illustrating an example of a case where boundaries of radio frames are synchronized between different component carriers.

Next, an example of a case where the boundaries of the radio frames are aligned between the component carriers will be described. FIG. 30 is a diagram illustrating an example of a case where boundaries of radio frames are aligned to be synchronized between different component carriers.

In the example illustrated in FIG. 30, the radio frame lengths of component carriers 0 and 1 maintain a relation of TRF0==TRF1. In the example illustrated in FIG. 30, however, the subframe lengths TRF0≠TRF1 are considered to be set in the subframe lengths of component carriers 0 and 1. This can be said to be a condition occurring due to a difference in symbol disposition by the compression coefficient of FTN.

In the situation illustrated in FIG. 30, since the boundaries of the subframes can be said not to be aligned between the component carriers, it can be said that it is preferable to avoid performing the cross-carrier scheduling under the case of this condition. That is, in this case, it is necessary to establish a procedure between the base station 100 and the terminal apparatus 200 when each component carrier notifies of scheduling information (DCI or the like) regarding the radio resources of the component carrier.

Figure 31:
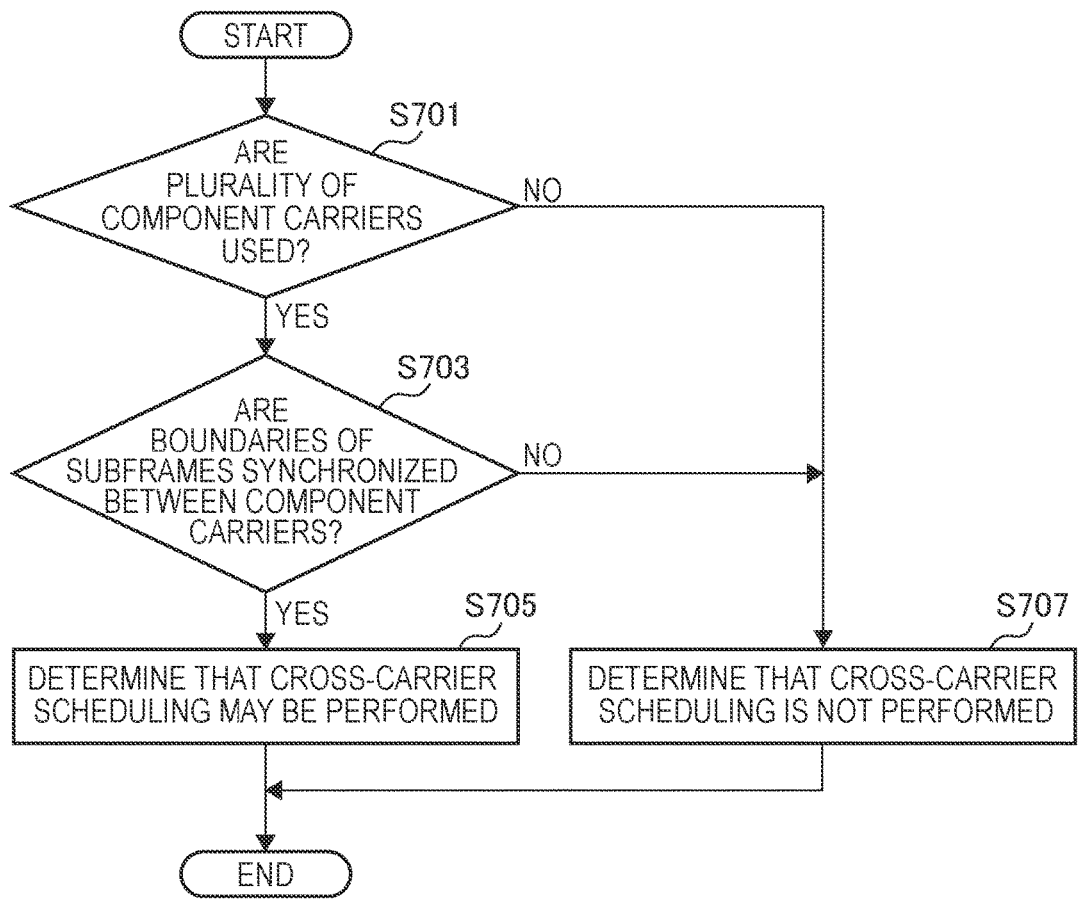
FIG. 31 is a flowchart illustrating an example of a determination flow for performing cross-carrier scheduling.
Figure 32:
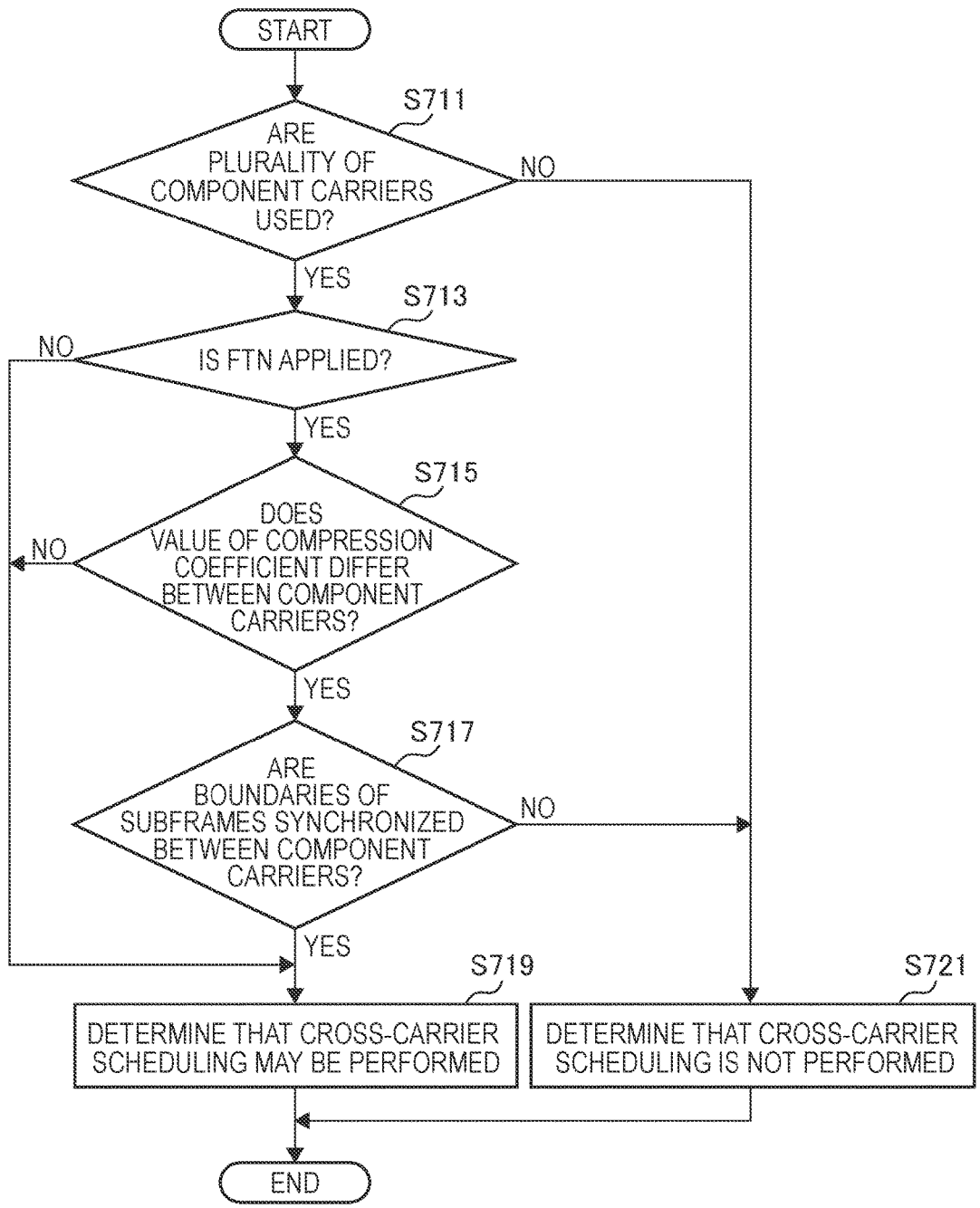
FIG. 32 is a flowchart illustrating an example of a determination flow for performing cross-carrier scheduling.

An example of determination of whether to perform the cross-carrier scheduling while considering synchronization of the boundaries of the subframes and the radio frames in FTN and the carrier aggregation, as described above, will be described. FIGS. 31 and 32 are flowcharts illustrating examples of determination flows for performing cross-carrier scheduling.

First, an example of a determination flow for performing the cross-carrier scheduling will be described with reference to FIG. 31. The transmission apparatus determines whether to use a plurality of component carriers (S701). Subsequently, in a case where the plurality of component carriers are used (Yes in S701), the transmission apparatus determines whether the boundaries of the subframes are synchronized between the component carriers (S703). In a case where the boundaries of the subframes are synchronized between the component carriers (Yes in S703), the transmission apparatus determines that the cross-carrier scheduling may be performed (S705). Conversely, in a case where the plurality of component carriers are not used (No in S701) or in a case where the boundaries of the subframes are not synchronized between the component carriers (No in S703), the transmission apparatus determines that the cross-carrier scheduling is not performed (S707).

That is, when the boundaries of the subframes are synchronized between the component carriers in the case where the plurality of component carriers are used, the transmission apparatus can determine that the cross-carrier scheduling may be performed.

Next, an example of the flow of the determination for performing the cross-carrier scheduling will be described with reference to FIG. 32. FIG. 32 illustrates an example of a case of determination in addition to the values of the parameters of FTN.

The transmission apparatus first determines whether the plurality of component carriers are used (S711). Subsequently, in a case where the plurality of component carriers are used (Yes in S711), the transmission apparatus determines whether FTN is applied (S713). Subsequently, in a case where FTN is applied (Yes in S713), the transmission apparatus determines whether the value of the compression coefficient differs between the component carriers (S715). Subsequently, in a case where the value of the compression coefficient differs between the component carriers (Yes in S715), the transmission apparatus determines whether the boundaries of the subframes are synchronized between the component carriers (S717). In a case where the boundaries of the subframes are synchronized between the component carriers (Yes in S717), a case where FTN is not applied (No in S713), or a case where the value of the compression coefficient is the same between the component carriers (No in S715), the transmission apparatus determines that the cross-carrier scheduling may be performed (S719).

Conversely, in a case where the plurality of component carriers are not used (No in S711) or a case where the boundaries of the subframes are not synchronized between the component carriers (No in S717), the transmission apparatus determines that the cross-carrier scheduling is not performed (S721).

Note that, in FIGS. 31 and 32, even in the case where it is determined that the cross-carrier scheduling may be performed, the transmission apparatus may separately determine whether the cross-carrier scheduling is actually performed. That is, herein, the transmission apparatus determines that the cross-carrier scheduling may be performed, but it is optional for the transmission apparatus to perform the cross-carrier scheduling.

(8) Introduction of Dual-Connectivity to Communication System to which FTN is Applied As described above, in the case where the carrier aggregation is applied, it is better to place the restriction on the scheduling notification method particularly in accordance with whether the boundaries of the subframes are synchronized. On the other hand, even in a case where the boundaries of the subframes are not synchronized between different component carriers, the plurality of component carriers may be able to be used in accordance with different methods.

As an example of the method, dual-connectivity or multi-connectivity is considered to be performed. This is means for simultaneously dealing with the plurality of component carriers which are not synchronized while independently maintaining the component carriers (frequency channels). In a case where the dual-connectivity is applied, each component carrier can be used with the dual-connectivity and thus a broader bandwidth can be used for communication as a whole even in the case where the boundaries of the subframes are not synchronized, for example, as in FIG. 30.

Figure 33:
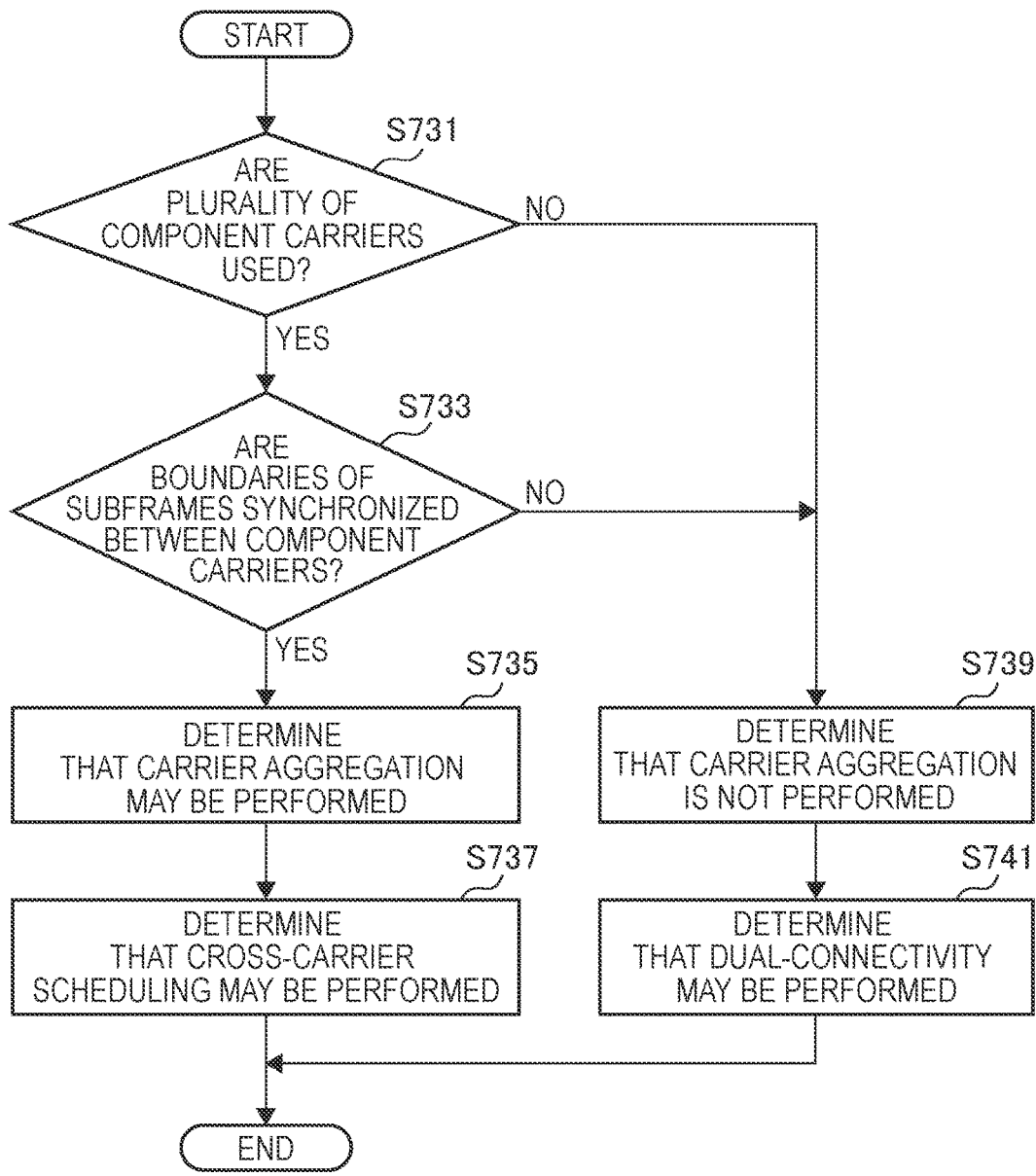
FIG. 33 is a flowchart illustrating an example of determination for performing dual-connectivity in a case where a plurality of component carriers are used.

FIG. 33 is a flowchart illustrating an example of determination for performing the dual-connectivity in a case where a plurality of component carriers are used. The transmission apparatus first determines whether to use the plurality of component carriers (S731). Subsequently, in a case where the plurality of component carriers are used (Yes in S731), the transmission apparatus determines whether the boundaries of the subframes are synchronized between the component carriers (S733). In a case where the boundaries of the subframes are synchronized between the component carriers (Yes in S733), the transmission apparatus determines that the carrier aggregation may be performed (S735) and further determines that the cross-carrier scheduling may be performed (S737). Conversely, in a case where the plurality of component carriers are not used (No in S731) or a case where the boundaries of the subframes are not synchronized between the component carriers (No in S733), the transmission apparatus determines that the carrier aggregation is not performed (S739) and further determines that the cross-carrier scheduling is not performed (S741).

Figure 34:
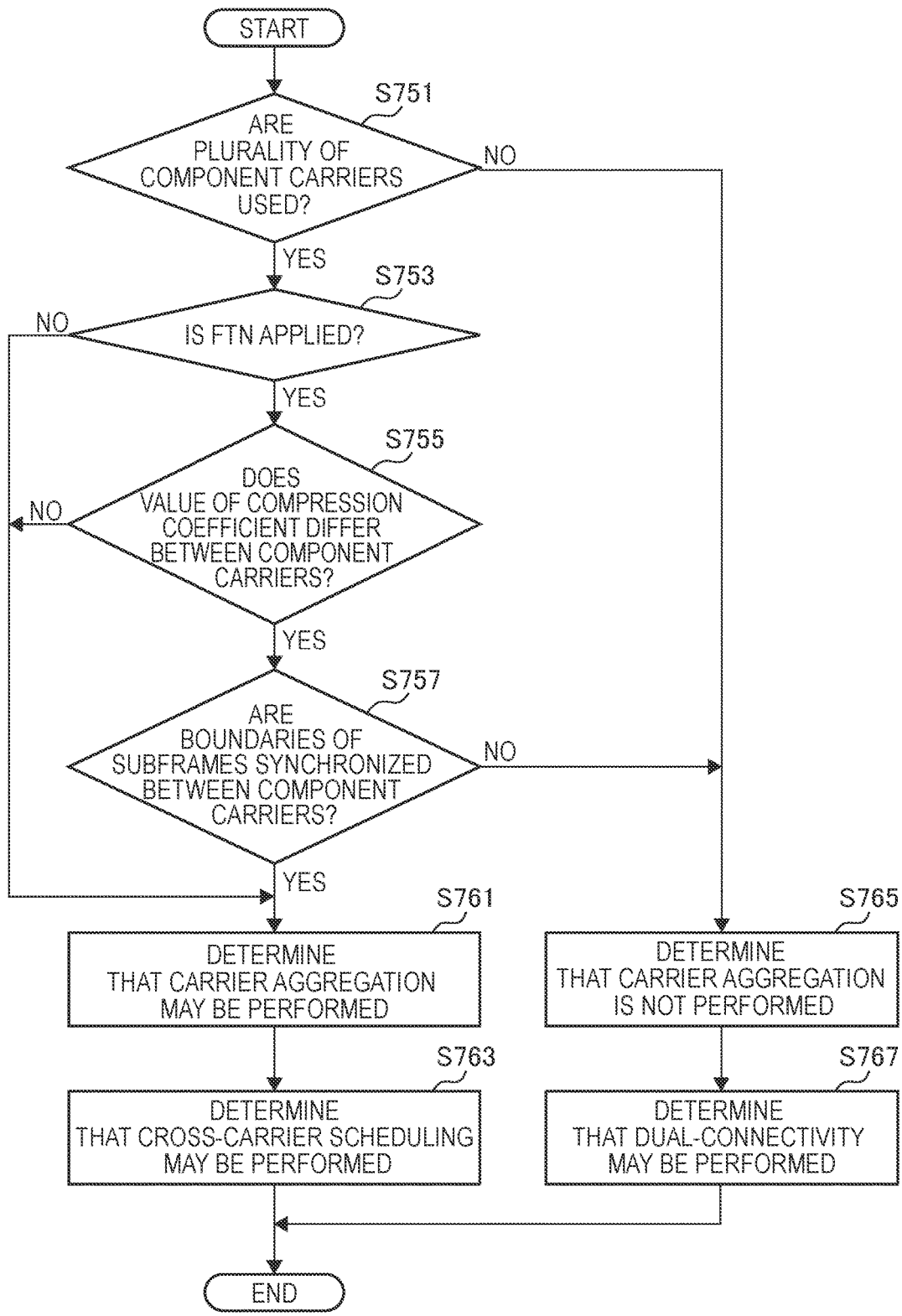
FIG. 34 is a flowchart illustrating an example of determination for performing the dual-connectivity in a case where it is determined that a value of FTN parameter is included.

Next, an example of determination for performing the dual-connectivity in a case where the plurality of component carriers are used will be described with reference to FIG. 34. FIG. 34 is a flowchart illustrating an example of determination for performing the dual-connectivity in a case where it is determined that a value of FTN parameter is included.

The transmission apparatus first determines whether to use the plurality of component carriers (S751). Subsequently, in a case where the plurality of component carriers are used (Yes in S751), the transmission apparatus determines whether FTN is applied (S753). Subsequently, in a case where FTN is applied (Yes in S753), the transmission apparatus determines whether the value of the compression coefficient differs between the component carriers (S755). In a case where the value of the compression coefficient differs between the component carriers (Yes in S755), the transmission apparatus determines whether the boundaries of the subframes are continuously synchronized between the component carriers (S757). In a case where the boundaries of the subframes are synchronized between the component carriers (Yes in S757), a case where FTN is not applied (No in S753), or a case where the value of the compression coefficient is the same between the component carriers (No in S755), the transmission apparatus determines that the carrier aggregation may be performed (S761) and further determines that the cross-carrier scheduling may be performed (S763).

Conversely, in a case where the plurality of component carriers are not used (No in S751) or a case where the boundaries of the subframes are not synchronized between the component carriers (No in S757), the transmission apparatus determines that the carrier aggregation is not performed (S765) and further determines that the cross-carrier scheduling is not performed (S767).

Note that, in FIGS. 33 and 34, even in the case where it is determined that the cross-carrier scheduling may be performed, the transmission apparatus may separately determine whether the cross-carrier scheduling is actually performed. That is, herein, the transmission apparatus determines that the cross-carrier scheduling may be performed, but it is optional that the transmission apparatus performs the cross-carrier scheduling.

In addition, in FIGS. 33 and 34, even in the case where it is determined that the carrier aggregation may be performed, the transmission apparatus may separately determine whether the carrier aggregation is actually performed. For example, when the reception apparatus does not correspond to the carrier aggregation, the transmission apparatus may determine that the carrier aggregation is not performed even in the case where the transmission apparatus determines that the carrier aggregation may be performed. In addition, the compression coefficient of the symbol interval may differ or may be the same between different cells or different component carriers.

(9) FTN Control Example Based on Another Perspective Except for Frequency Channel Next, an example of FTN control based on another perspective except for a frequency channel will be described. As described above, the improvement of frequency use efficiency is one of the effects caused by applying FTN. Because of such a characteristic, the effectiveness brought about by applying FTN sometimes changes in accordance with a control channel of a radio resource used in a communication system.

For example, an example of the application range within which it is possible to obtain an effect of FTN by applying FTN includes a channel (i.e., PDSCH or PUSCH). By applying FTN to a shared channel for transmitting and receiving live data, for example, it is possible to obtain the effect of improving frequency use efficiency and throughput.

Further, in addition to a shared channel, the application of FTN to a multicast channel is included. The multicast channel is a channel and a resource used when a broadcasting data service is provided in a cellular system like a multimedia broadcast multicast service (MBMS) or the like. Applying FTN to a multicast channel makes it possible, for example, to expect the improvement of the quality of the broadcasting data service. Note that the shared channel or the multicast channel corresponds to an example of a "second control channel."

Meanwhile, it is desirable in some cases to refrain from applying FTN to a channel used chiefly for a control system (e.g., notification of information, feedback, or the like). Information of the control system is fundamental in the establishment of communication, so that it is thought to be important to improve the reliability of transmission and reception. Therefore, it is sometimes more preferable that inter-symbol interference be avoided by refraining from applying FTN to a channel for transmitting or receiving information of the control system to achieve stable transmission and reception of information. In addition, even in the case where FTN is applied to a channel for transmitting or receiving information of the control system, it is sometimes desirable to set an FTN parameter to lessen the influence of the inter-symbol interference (e.g., a value closer to 1 is set as the compression coefficient $\tau_{i,p}$). Note that examples of the channel of the control system include a broadcast channel, a control channel, a synchronization channel (or a synchronization signal), and the like. Note that the above-described channel of the control system corresponds to an example of a "first control channel."

In addition, in the communication system, a reference signal for estimating fluctuations in a radio propagation path or the like is sometimes transmitted besides a channel. For the purpose of maintaining the estimation accuracy of a radio propagation path, it is sometimes more preferable that the application of FTN to such a reference signal be avoided or an FTN parameter be set to lessen the influence of the inter-symbol interference.

The above describes an example of FTN control based on another perspective except for a frequency channel.

6. Modifications

Next, a modification of an embodiment of the present disclosure will be described.

<6.1. Modification 1: Example of Control of Prefix>

First, as a modification 1, an example of control of a prefix such as a CP and a pilot symbol that can function as a guard interval in accordance with the application status of FTN such as the applicability of FTN or the contents of an applied FTN parameter will be described.

As described above, in FTN, regarding a signal on which FTN processing has been performed, the signal itself contains inter-symbol interference. Therefore, in a communication system in which FTN is employed, even in the case where there is no delay wave in a radio propagation path (i.e., no inter-symbol interference occurs in a radio propagation path), measures against inter-symbol interference accompanying FTN processing have to be taken in some cases. In the case where these are viewed from another perspective, the above-described CP corresponds to the measures against the inter-symbol interference in a radio propagation path, so that control that adds no CP may be employed for FTN, which contains inter-symbol interference in the first place. In this case, for example, in the case of the compression coefficient $\tau_{i,p}<1$, a transmission apparatus side just has to perform control to satisfy a CP's length $N_{CP,g}=0$. Such a configuration makes it possible to further improve frequency use efficiency.

In addition, as another example, a compression coefficient may be linked to the length of a CP. As a specific example, a transmission apparatus may perform control such that the length $N_{CP,g}$ of a CP decreases with decrease in the compression coefficient $\tau_{i,p}$. Note that, at this time, the compression coefficient $\tau_{i,p}$ does not necessarily have to be proportional to the length $N_{CP,g}$ of the CP. Note that, in FTN, as the compression coefficient $\tau_{i,p}$ decreases, the influence of inter-symbol interference increases. Therefore, as the compression coefficient $\tau_{i,p}$ decreases, a reception apparatus side is required to take relatively stronger measures against inter-symbol interference in accordance with the magnitude of the influence of inter-symbol interference accompanying the compression coefficient $\tau_{i,p}$. Accordingly, it is also possible to address the inter-symbol interference in the radio propagation path together.

Note that the relationship between the compression coefficient $\tau_{i,p}$ and length $N_{CP,g}$ of a CP may be managed as a control table. For example, Table 3 shown below demonstrates an example of a control table in which the range of a compression coefficient and the length of a CP is associated with each other in advance. In the example shown below as Table 3, the correspondence relationship between the range of a compression coefficient and the length of a CP is managed on the basis of a compression coefficient category index. Note that the magnitude relationship between the CPs (e.g., NCP to NCP3) of the respective compression coefficient category indexes with respect to length shown in Table 3 is NCP0≤NCP1≤NCP2≤NCP3≤ . . .

TABLE 3

Example of Association of Range of Compression Coefficient and Length of CP

| Compression Coefficient Category Index | Range of Compression Coefficient | Length of CP |
|---|---|---|
| 0 | τ0 ≤ τ < τ1 | NCP0 |
| 1 | τ1 ≤ τ < τ2 | NCP1 |
| 2 | τ2 ≤ τ < τ3 | NCP2 |
| 3 | τ3 ≤ τ < τ4 | NCP3 |
| . . . | . . . | . . . |

In addition, as another example, a specific compression coefficient and the length of a CP may be associated with each other, and managed as a control table. For example, Table 4 shown below demonstrates an example of a control table in which the value of a compression coefficient and the length of a CP is associated with each other in advance. Note that, in the example shown below as Table 4, it is assumed that the correspondence relationship between the value of a compression coefficient and the length of a CP is managed on the basis of a compression coefficient category index.

TABLE 4

Example of Association of Value of Compression Coefficient and Length of CP

| Compression Coefficient Category Index | Value of Compression Coefficient | Length of CP |
|---|---|---|
| 0 | τ0 | NCP0 |
| 1 | τ1 | NCP1 |
| 2 | τ2 | NCP2 |
| 3 | τ3 | NCP3 |
| . . . | . . . | . . . |

Note that, in the above description, the description is made, chiefly focusing on control of the length of a CP. However, the same applies to a pilot symbol.

The above describes, as a modification 1, an example of control of a prefix such as a CP and a pilot symbol in accordance with the application status of FTN such as the applicability of FTN or the contents of an applied FTN parameter.

<6.2. Modification 2: Example of Control According to Moving Speed of Apparatus>

Next, as a modification 2, an example of the case where a compression coefficient is controlled in accordance with the moving speed of a transmission apparatus or a reception apparatus will be described.

In the case where the moving speed of an apparatus (transmission apparatus or reception apparatus) is high, fluctuations in a radio wave path with respect to time also increase. Accordingly, it is anticipated that reception processing becomes complicated. Therefore, a transmission apparatus side may control the value of a compression coefficient in accordance with the moving speed of the transmission apparatus or the reception apparatus to adaptively control the load of processing on the corresponding reception apparatus side. More specifically, the transmission apparatus just has to perform control such that the value of the compression coefficient increases (i.e., the compression coefficient has a value close to 1) with increase in the moving speed of the transmission apparatus or the reception apparatus. Such control makes it possible to perform control such that the influence of the inter-symbol interference contained in FTN itself decreases with increase in the moving speed of the transmission apparatus or the reception apparatus.

Note that the relationship between the moving speed of an apparatus (transmission apparatus or reception apparatus) and the value of a compression coefficient may be managed as a control table. For example, Table 5 shown below demonstrates an example of a control table in which the moving speed of an apparatus and the length of a CP are associated with each other in advance. In the example shown below as Table 5, a category referred to as mobility category is defined, and the correspondence relationship between the range of a compression coefficient and the length of a CP is associated with the mobility category. Note that the magnitude relationship between the compression coefficients (e.g., τmobility0 to τmobility3) of the respective mobility category indexes shown as Table 5 is τmobility0≤τmobility1≤τmobility2≤τmobility3≤ . . . ≤1.

TABLE 5

Example of Association of Moving Speed of Apparatus and Value of Compression Coefficient

| Mobility Category Index | Range of Moving Speed (e.g., km/h) | Compression Coefficient |
|---|---|---|
| 0 | v0 ≤ v < v1 | τmobility0 |
| 1 | v1 ≤ v < v2 | τmobility1 |
| 2 | v2 ≤ v < v3 | τmobility2 |
| 3 | v3 ≤ v < v4 | τmobility3 |
| ... | ... | ... |

The above describes, as a modification 2, an example of the case where a compression coefficient is controlled in accordance with the moving speed of a transmission apparatus or a reception apparatus.

<6.3. Modification 3: Extension to Multi-Carrier Modulation>

The applications of the embodiment to single carrier modulation have been described with reference to FIGS. 7 to 10. On the other hand, the embodiment can also be applied to a multi-carrier modulation scheme typified by OFDM or orthogonal frequency-division multiple access (OFDMA).

Figure 35:
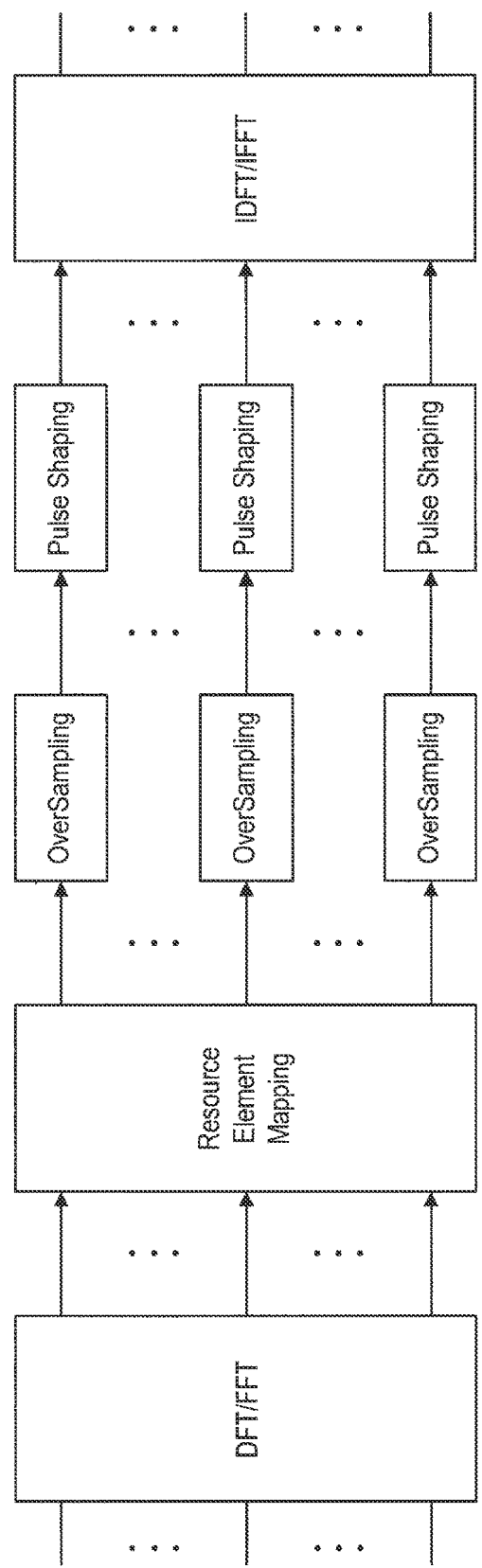
FIG. 35 is an explanatory diagram for describing an example of a configuration of a transmission apparatus according to an embodiment in which multi-carrier modulation is set as a base.
Figure 36:
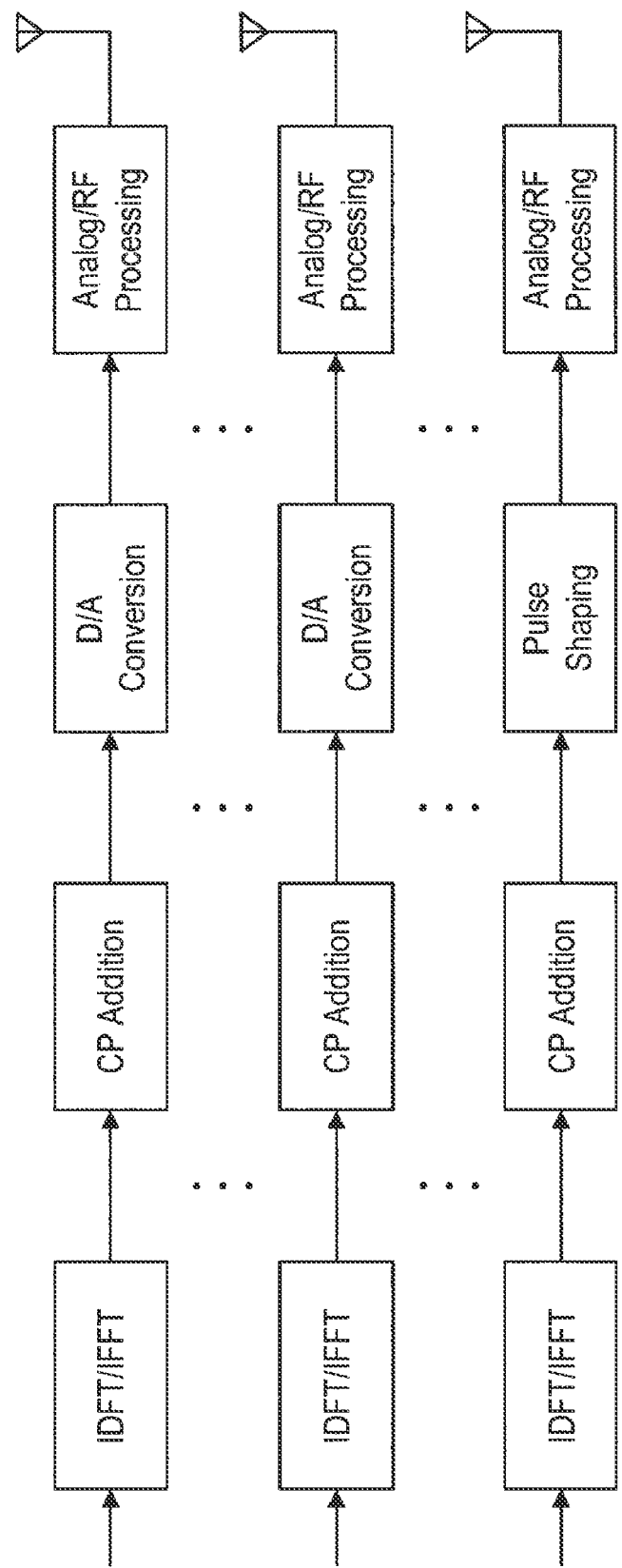
FIG. 36 is an explanatory diagram for describing an example of a configuration of a transmission apparatus according to an embodiment in which multi-carrier modulation is set as a base.

FIGS. 35 and 36 are explanatory diagrams for describing an example of a configuration of a transmission apparatus according to an embodiment in which multi-carrier modulation is set as a base. Note that the same configuration as the configuration of the transmission apparatus illustrated in FIGS. 7 and 8 is installed at the front stage of FIG. 35. In a case where the multi-carrier modulation is set as the base, it is preferable to perform compression of the symbol disposition in the time direction, an over-sample, the pulse shape filter for each subcarrier. In addition, the same value of the compression coefficient is preferably aligned in a unit in a predetermined frequency direction (for example, a mass of subcarriers such as a resource block of LTE). Further, the same value of the compression coefficient is preferably aligned between resource blocks simultaneously allocated to the same user terminal apparatus.

<6.4. Modification 4: Introduction of Compression in Time Direction and Compression in Frequency Direction>

(1) Overview of Compression in Frequency Direction

The technology for compressing the symbol disposition in the time direction has been described above using the single carrier modulation as a base. On the other hand, when the multi-carrier modulation is set as a base, compression of sub-carrier disposition in a frequency direction can also be introduced in a form of addition to the compression of the symbol disposition in the time direction.

Figure 37:
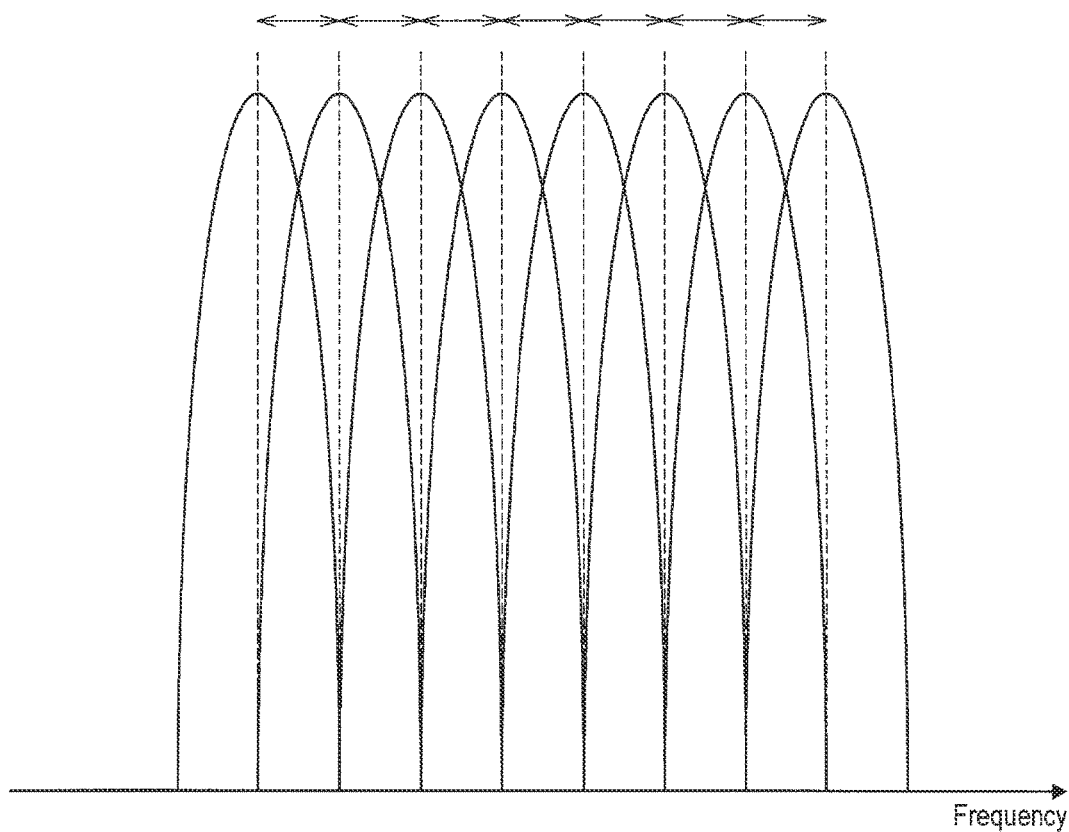
FIG. 37 is an explanatory diagram for describing sub-carrier disposition (conventional sub-carrier disposition) in a case where compression in a frequency direction is not performed.
Figure 38:
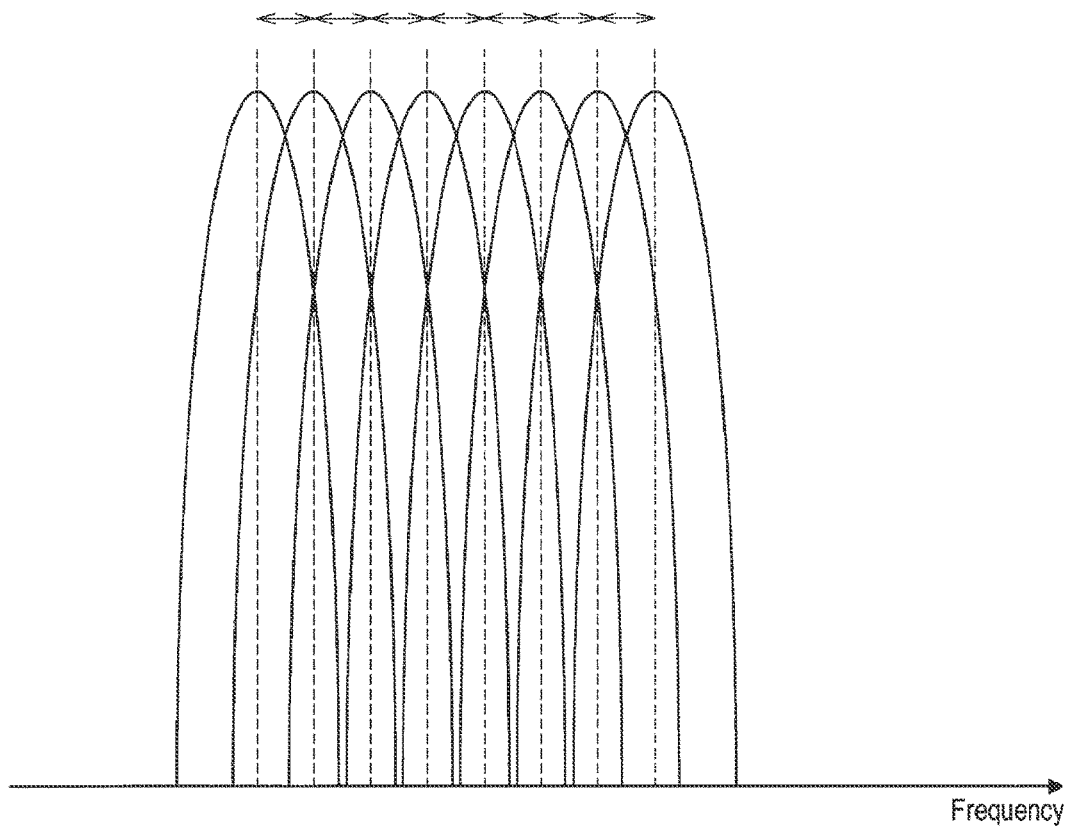
FIG. 38 is an explanatory diagram for describing sub-carrier disposition in a case where compression in the frequency direction is performed according to the embodiment.

FIG. 37 is an explanatory diagram for describing subcarrier disposition (conventional sub-carrier disposition) in a case where compression in a frequency direction is not performed. In addition, FIG. 38 is an explanatory diagram for describing sub-carrier disposition in a case where compression in the frequency direction is performed. In the conventional disposition illustrated in FIG. 37, there are characteristics in which different subcarriers are disposed to be accurately orthogonal to each other (an amplitude of an adjacent subcarrier is 0 at a frequency at which the amplitude of a certain subcarrier is peak). In a case where there is no compression in the frequency direction, an interval (subcarrier spacing) between subcarriers has the same relation as an inverse of a symbol length (symbol period). Herein, the "symbol length" is different from a "symbol disposition interval after the compression in the time direction."

Conversely, as illustrated in FIG. 38, in the case of the compression in the frequency direction, a result of a relation of the subcarrier interval # the inverse of the symbol length is obtained. That is, at the frequency at which the amplitude of a certain subcarrier is peak, a situation in which the amplitude of an adjacent subcarrier is not 0 occurs. In particular, in a case where an improvement in frequency use efficiency is considered, it is preferable to set a relation of the subcarrier interval<the inverse of the symbol length. The example illustrated in FIG. 38 is based on the relation of the subcarrier interval<the inverse of the symbol length. In the case of the compression in the frequency direction, orthogonality of the subcarriers is collapsed and the subcarriers consequently interfere in each other.

When the compression in the frequency direction is introduced in the communication system, the degree of compression is preferably set as a parameter as in the compression in the time direction. In the example illustrated in FIG. 38, a parameter $\phi$ is introduced as a compression coefficient in the frequency direction. The parameter $\phi$ is used to express a subcarrier interval after the compression.

When Δf is the subcarrier interval and T is the symbol length and the compression in the frequency direction is introduced, a relation of $\Delta f = \phi(1/T) <= 1/T$ is satisfied.

In the foregoing description, the embodiments in which the fixed introduction to the component carriers with regard to the introduction of the compression in the time direction, the cell-specific control, the user-specific control, the semi-static control, the dynamic control, the notification with the RRC signaling, the notification with the system information, the notification with the physical control channel, the control in accordance with the frequency of the component carrier, the control by the relation of PCell/SCell, and the combination of the carrier aggregation and the dual-connectivity have been described.

Herein, it is preferable to also fit the newly introduced compression coefficient in the frequency direction to the fixed introduction to the component carriers, the cell-specific control, the user-specific control, the semi-static control, the dynamic control, the notification with the RRC signaling, the notification with the system information, the notification with the physical control channel, the control in accordance with the frequency of the component carrier, the control by the relation of PCell/SCell, and the combination of the carrier aggregation and the dual-connectivity, as in the introduction of the compression in the time direction.

Further, the compression in the time direction and the compression in the frequency direction may be independently controlled, set, or notified of. That is, values of the parameters τ and φ can be said to be introduced with any relation to the communication system. Thus, it is possible to control the disposition or density of the frequency resources and the time flexibly, as described above, in accordance with the radio wave propagation environment, frequency use efficiency desired to be achieved, a data rate, a throughput, or the like. The following Table 6 shows examples of combinations of values taken by the compression coefficient in the time direction and the compression coefficient in the frequency direction.

TABLE 6

Examples of Combinations of Values Taken by Compression Coefficient in Time Direction and Compression Coefficient in Frequency Direction

|  | Value of τ | Value of φ |
| --- | --- | --- |
| Case 1 | ==1 | ==1 |
| Case 2 | <1 | ==1 |
| Case 3 | ==1 | <1 |
| Case 4 | <1 | <1 |

That is, the transmission apparatus has a first mode in which control is performed such that transmission is performed by narrowing a symbol interval, a second mode in which control is performed such that transmission is performed without narrowing a symbol interval, a third mode in which control is performed such that transmission is performed by narrowing a subcarrier interval, and a fourth mode in which control is performed such that transmission is performed without narrowing a subcarrier interval. One of the first mode and the second mode is selected and one of the third mode and the fourth mode is similarly selected.

Then, in a case where compression in the frequency direction is performed, information regarding the compression coefficient φ in the frequency direction is preferably shared between the transmission apparatus and the reception apparatus as in the case of the compression coefficient t in the time direction.

For example, FIGS. 15, 20, 22, and 24 illustrate the examples of the cases in which the base station 100 notifies the terminal apparatus 200 of the compression coefficient t in the time direction as the FTN parameter by the RRC connection reconfiguration as an example of the communication sequence in the case where FTN is employed for the downlink. Here, the base station 100 may notify the terminal apparatus 200 of the FTN parameter in substitution with the compression coefficient t in the time direction or notify of the compression coefficient φ in the frequency direction along with the compression coefficient t in the time direction.

In addition, for example, FIGS. 16, 21, 23, and 25 illustrate the examples of the cases in which the base station 100 notifies the terminal apparatus 200 of the compression coefficient t in the time direction as the FTN parameter by SIB as an example of the communication sequence in the case where FTN is employed for the downlink. Here, the base station 100 may notify the terminal apparatus 200 of the FTN parameter in substitution with the compression coefficient τ in the time direction or notifies of the compression coefficient φ in the frequency direction along with the compression coefficient t in the time direction.

In addition, for example, FIG. 17 illustrates the example of the case where the base station 100 notifies the terminal apparatus 200 of the compression coefficient t in the time direction as the FTN parameter by the RRC connection reconfiguration as an example of the communication sequence in the case where FTN is employed for the uplink. Here, the base station 100 may notify the terminal apparatus 200 of the FTN parameter in substitution with the compression coefficient t in the time direction or notify of the compression coefficient φ in the frequency direction along with the compression coefficient τ in the time direction.

In addition, for example, FIG. 18 illustrates the example of the case where the base station 100 notifies the terminal apparatus 200 of the compression coefficient τ in the time direction as the FTN parameter by SIB as an example of the communication sequence in the case where FTN is employed for the uplink. Here, the base station 100 may notify the terminal apparatus 200 of the FTN parameter in substitution with the compression coefficient τ in the time direction or notify of the compression coefficient φ in the frequency direction along with the compression coefficient τ in the time direction.

(2) Definition of Resources in Case where Compression in Time Direction or Frequency Direction is Performed In the embodiment, in a case where compression of the symbol interval in the time direction or compression of the subcarrier in the frequency direction is performed, it is preferable to give a definition in accordance with compression or non-compression with regard to definition of the format of radio resources. Thus, it is possible to share rules of the resources between the transmission apparatus and the reception apparatus even when granularity of the resources is changed by the compression.

(A) Definition of Resources in Compression in Time Direction

In the compression of the symbol interval in the time direction, it is preferable to consider the length of the subframe, the number of symbols per subframe, the length of TTI, the number of symbols per TTI, and the like when the symbol interval in a certain communication system or a cell is changed. When the length of the subframe, the number of symbols per subframe, the length of TTI, the number of symbols per TTI, and the like are considered, the following two cases are exemplified as embodiments.

Figure 39:
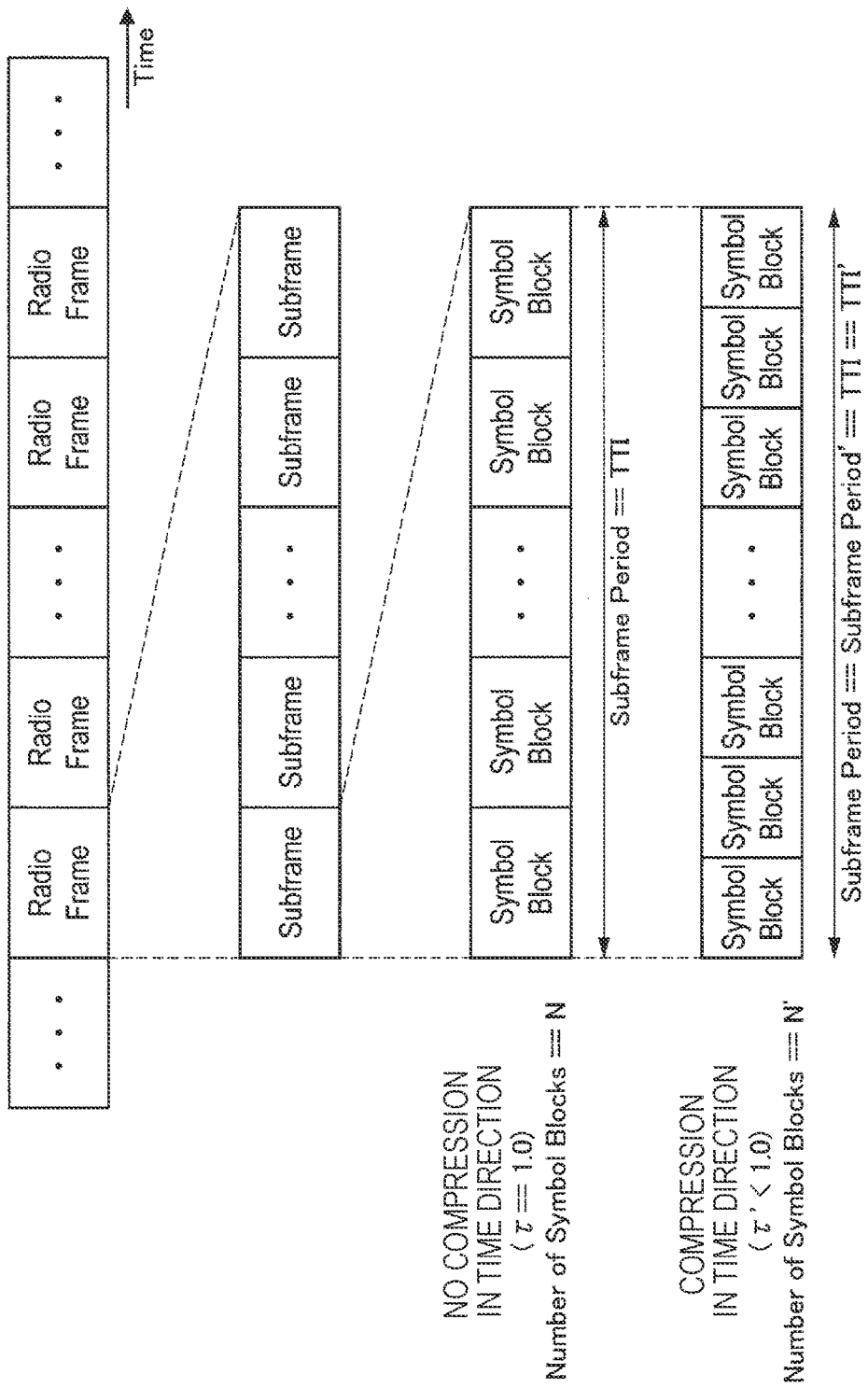
FIG. 39 is an explanatory diagram for describing an example of a case where the length of a subframe or the length of TTI is constant regardless of compression in a time direction.

(A-1) Case where Length of Subframe or Length of TTI is Constant Regardless of Compression in Time Direction FIG. 39 is an explanatory diagram for describing an example of a case where the length of a subframe or the length of TTI is constant regardless of compression in a time direction. FIG. 39 illustrates a case where there is no compression in the time direction ($\tau$==1.0) and a case where there is compression in the time direction ($\tau'$<1.0). In FIG. 39, the length of a symbol block is drawn differently between the case where there is the compression in the time direction and the case where there is no compression in the time direction, which means that the interval of the symbol disposition is different and does not mean that the length of the symbol length is different. In the case of the example illustrated in FIG. 39, the subframe length and TTI are assumed to be the same. In the example illustrated in FIG. 39, the number of symbols per subframe (or the number of symbols per TTI) is different depending on whether there is the compression in the time direction (or different compression coefficients). A relation between the number N of symbols in the case where there is no compression in the time direction and the number N' of symbols in the case where there is the compression in the time direction is N≠N'. In particular, when a magnitude of the compression coefficient is $t'<t$, it is preferable to set the relation between the numbers of symbols to N'>N. Further, it is preferable to also satisfy $N'<=(\tau'<\tau)*N$.

Figure 40:
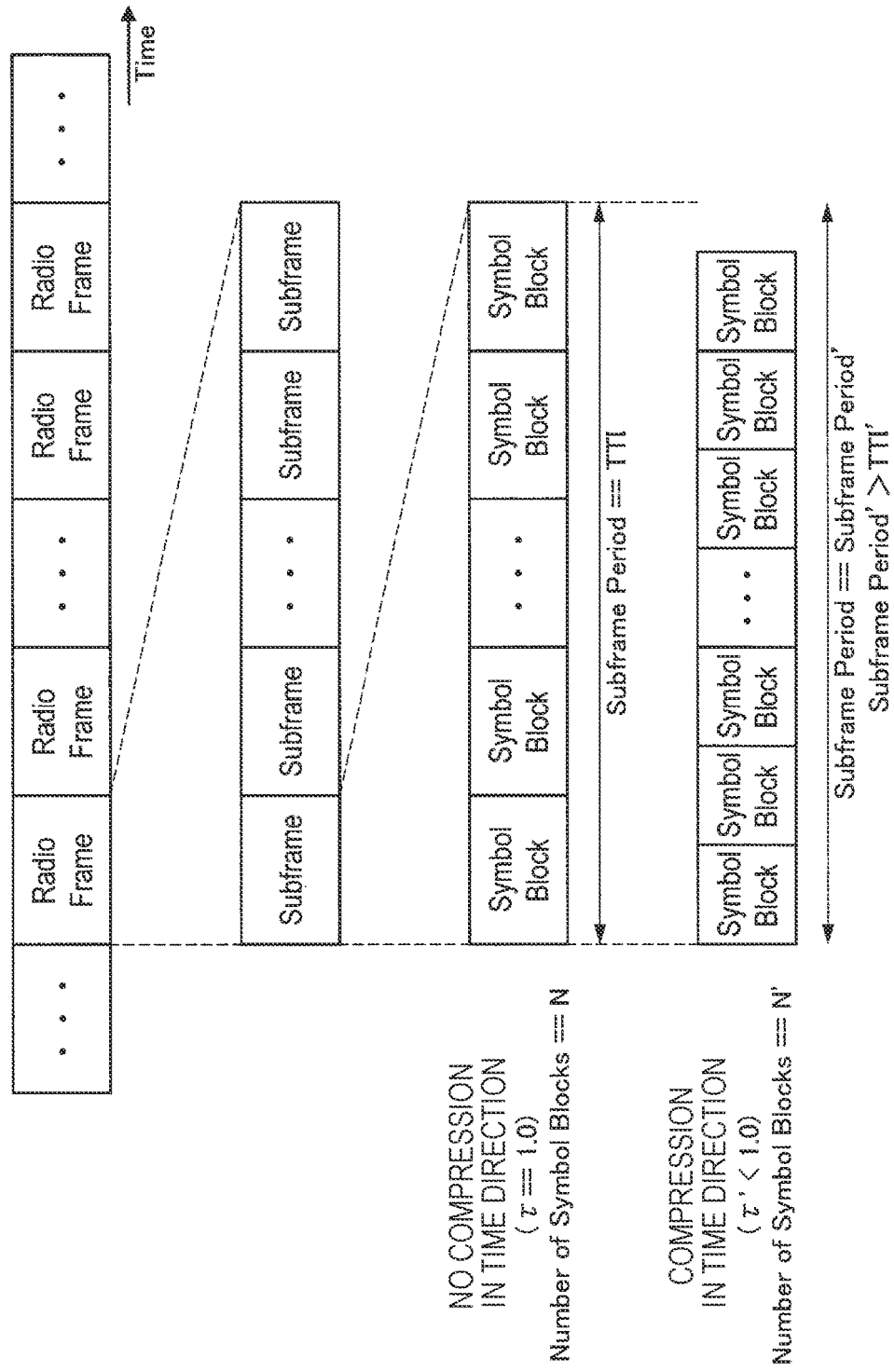
FIG. 40 is an explanatory diagram for describing an example of a case where the length of a subframe or the length of TTI is constant regardless of compression in a time direction.

FIG. 40 is an explanatory diagram for describing an example of the case where the length of a subframe or the length of TTI is constant regardless of compression in the time direction. The example illustrated in FIG. 40 is a case where the subframe length and TTI are allowed to be different. In FIG. 40, in the case where there is no compression in the time direction, the subframe length==TTI is set. In a case where there is the compression in the time direction, the subframe length>TTI is set. Setting of the subframe length<TTI is not allowed for the purpose of avoiding interference between the subframes. In the case of the example illustrated in FIG. 40, a final subframe length is the same in the compression coefficient by providing a non-transmission section except for TTI in the subframe. Note that, in FIG. 40, the length of the symbol block is also drawn differently between the case where there is the compression in the time direction and the case where there is no compression in the time direction, which means that the interval of the symbol disposition is different and does not mean that the length of the symbol length is different.

TTI shortening (shortening TTI or shortening a transmission time) is considered as the technology for shortening delay of a transmission and reception time. FIG. 40 illustrates an example of a case where the TTI shortening is realized by the compression in the time direction.

In a case where the number N' of symbols per subframe is changed in accordance with the compression (the compression coefficient) in the time direction, it is preferable to reconstruct the configuration of a resource element in the subframe. This is because the number of resource elements per unit is also changed by changing the number of symbols.

Figure 41:
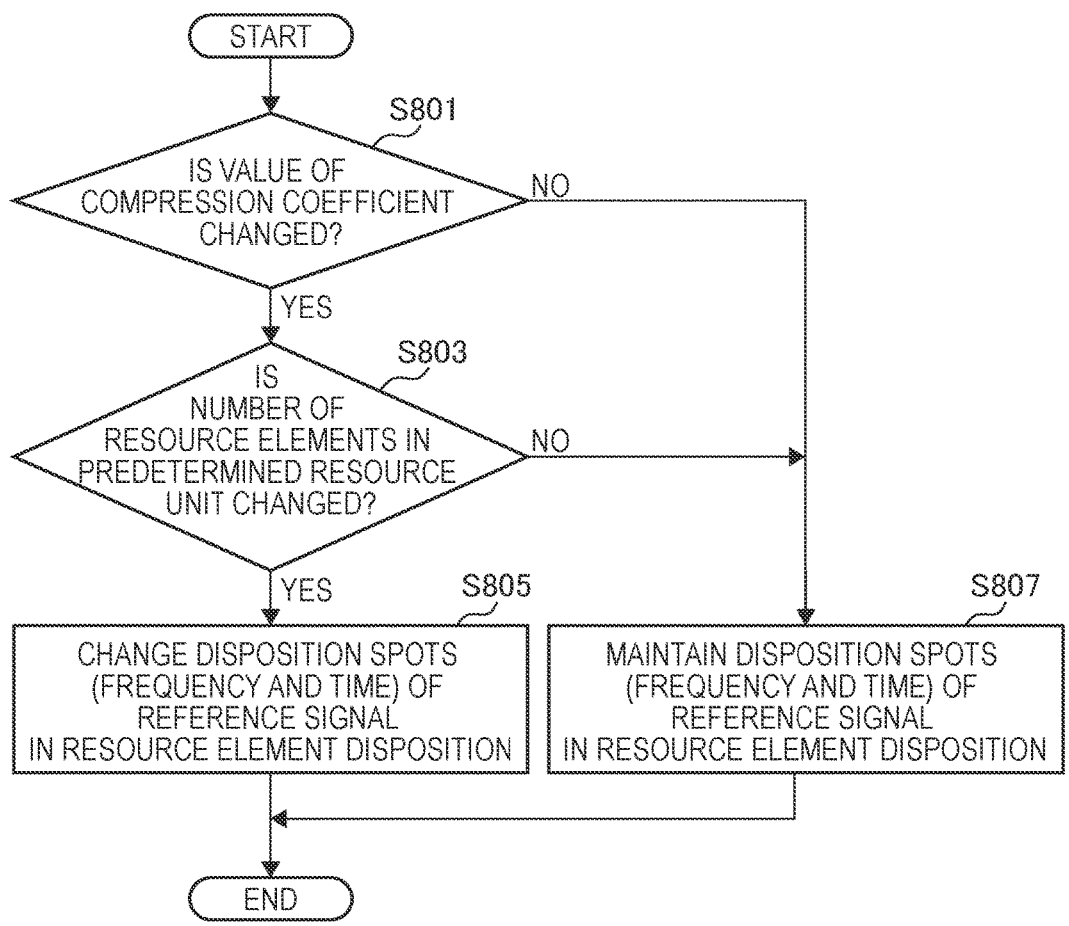
FIG. 41 is a flowchart illustrating an example of a determination flow for changing a configuration of a resource element with respect to a change in a value of a compression coefficient.

FIG. 41 is a flowchart illustrating an example of a determination flow for changing a configuration of a resource element with respect to a change in a value of a compression coefficient. Herein, as the configuration of the resource element, a disposition configuration of a reference signal (which is a resource element or a signal which is mutually known between the transmission apparatus and the reception apparatus, such as reference signals (RS), pilot signals, or known signals, and is used for channel state information (CSI) measurement, channel estimation, cell detection, cell selection, or the like) is considered.

The transmission apparatus first determines whether the value of the compression coefficient is changed (S801). Subsequently, in a case where it is determined that the value of the compression coefficient is changed (Yes in S801), the transmission apparatus determines whether the number of resource elements in a predetermined resource unit is changed (S803). Subsequently, in a case where it is determined that the number of resource elements in the predetermined resource unit is changed (Yes in S803), the transmission apparatus changes disposition spots (the frequency and the time) of the reference signal in the resource element disposition (S805). Conversely, in a case where it is determined that the value of the compression coefficient is not changed (No in S801) or a case where it is determined that the number of resource elements in the predetermined resource unit is not change (No in S803), subsequently, the transmission apparatus maintains the disposition spots (the frequency and the time) of the reference signal in the resource element disposition (S807).

As an index of the disposition, the density of RS resource elements in the subframe (or a ratio of the RS resource elements occupied in the subframe) is considered. The density (or the ratio) is considered to be reconfigured so that the density is constant regardless of the compression in the time direction or to be reconfigured so that the density is changed by the compression in the time direction. In the case where the density of RS is reconfigured so that the density is constant, an effect of maintaining precision of CSI measurement or channel estimation as accurately as possible before and after the compression in the different time direction can be expected. On the other hand, in the case where the resource elements are reconfigured so that the density of RS is changed, an effect of increasing or decreasing effective frequency use efficiency, a data rate, a throughput, or the like by the compression in the time direction can be expected.

Figure 42:
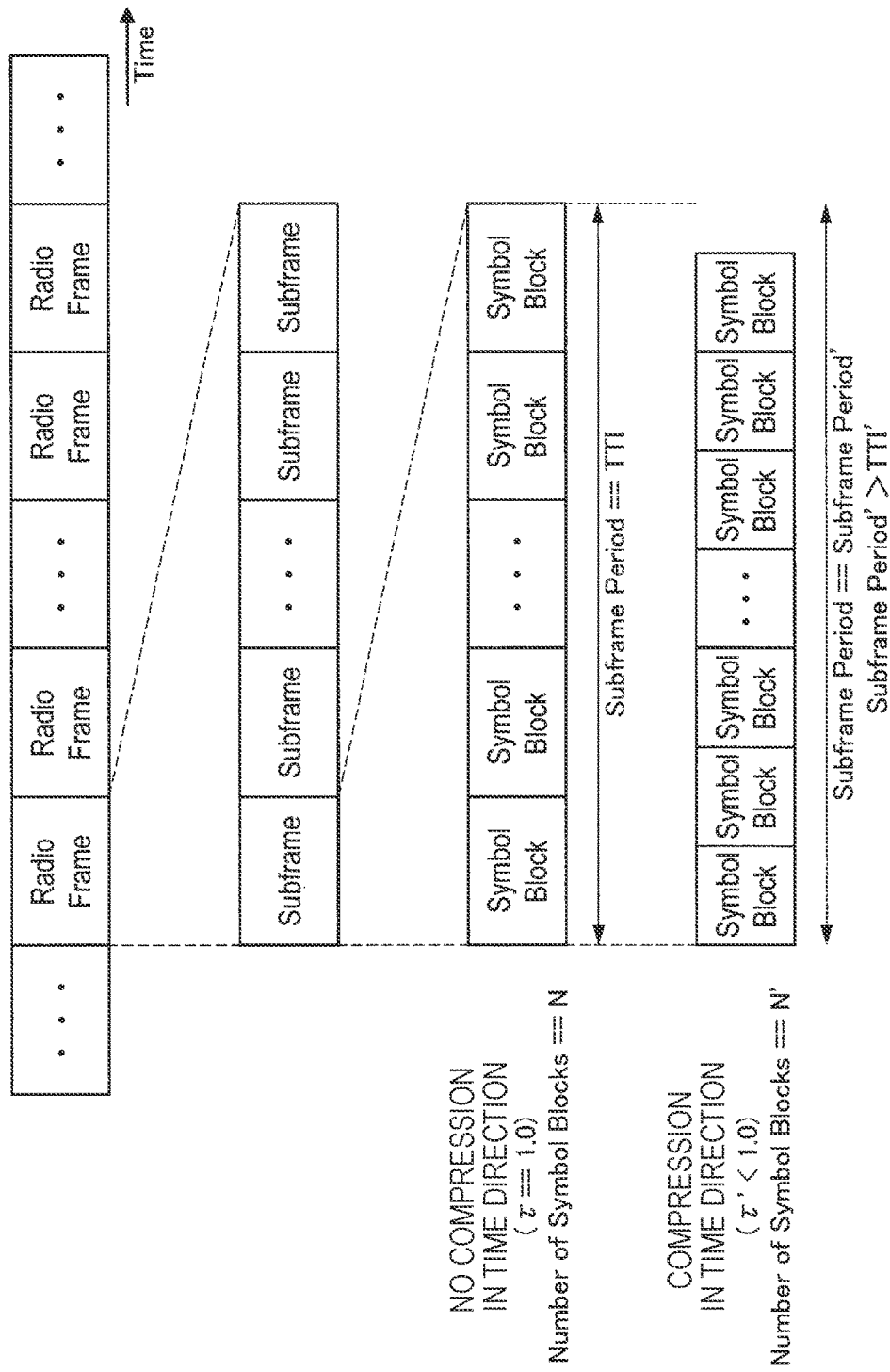
FIG. 42 is an explanatory diagram for describing an example in which the number of symbols per subframe or the number of symbols per TTI is constant regardless of compression in the time direction.

(A-2) Case where Number of Symbols Per Subframe or Number of Symbols Per TTI is Constant Regardless of Compression in Time Direction Next, an example in which the number of symbols per subframe or the number of symbols per TTI is constant regardless of the compression in the time direction will be described. FIG. 42 is an explanatory diagram for describing an example in which the number of symbols per subframe or the number of symbols per TTI is constant regardless of the compression in the time direction. FIG. 42 illustrates an example in which the number of subframes per radio frame is constant (that is, the subframe length is constant) and TTI is changed in accordance with the compression in the time direction. In this case, by providing a radio transmission section in the subframe, it is possible to set the subframe length to be constant. Even in FIG. 42, the length of the symbol block is drawn differently between the case where there is the compression in the time direction and the case where there is no compression in the time direction, which means that the interval of the symbol disposition is different and does not mean that the length of the symbol length is different. In this case, in a case where a magnitude relation of the compression coefficient is $t'<=t$, a magnitude relation of TTI is $TTI'<=TTI$. Even in this case, this example can be said to be an example of the TTI shortening by the compression in the time direction.

Figure 43:
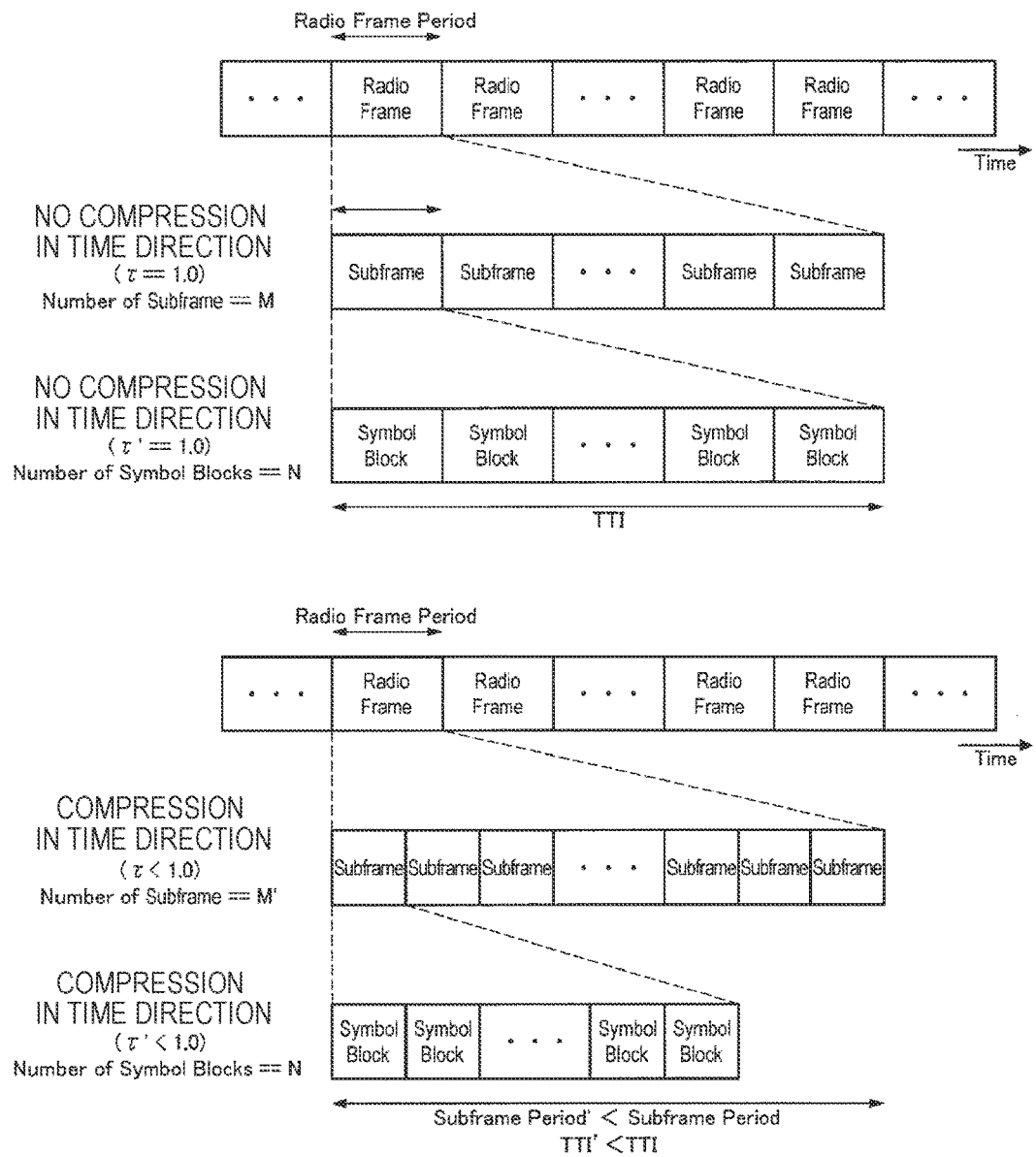
FIG. 43 is an explanatory diagram for describing an example in which the number of symbols per subframe or the number of symbols per TTI is constant regardless of compression in the time direction and the length of the subframe.

FIG. 43 is an explanatory diagram for describing an example in which the number of symbols per subframe or the number of symbols per TTI is constant regardless of the length of the subframe and the compression in the time direction. The example illustrated in FIG. 43 is an example in which the number of subframes per radio frame is also changed in accordance with the compression in the time direction. Even in FIG. 43, the length of the symbol block is drawn differently between the case where there is the compression in the time direction and the case where there is no compression in the time direction, which means that the interval of the symbol disposition is different and does not mean that the length of the symbol length is different. In the case where a magnitude relation of the compression coefficient is t'<=t, a magnitude relation of the number of subframes per radio frame is M'>=M and a magnitude of TTI is TTI'<=TTI. Even in this case, this example can be said to be an example of the TTI shortening by the compression in the time direction.

In the case where the number of symbols per subframe is constant regardless of the compression in the time direction, it is preferable to maintain the disposition configuration of the resource elements to be the same. This is because by maintaining the disposition configuration of the resource elements to be the same, it is not necessary to increase the number of disposition patterns of the RS resource elements between the transmission apparatus and the reception apparatus and it is possible to simplify mounting or the like of a memory.

(B) Definition of Resources in Compression in Frequency Direction

The relation of the radio frames, the number of symbols in accordance with the compression in the time direction, the number of subframes, the subframe length, and TTI have been described above, but the same point of view of the setting is considered in the frequency direction. For compression of the subcarrier interval in the frequency direction in a certain communication system or a cell, setting of, for example, a bandwidth of a resource block, the number of subcarriers per resource block, a bandwidth of the component carrier, the number of resource blocks per component carrier, the number of subcarriers per component carrier, a processing size of time-frequency conversion such as IFFT, IDFT, FFT, DFT, or the like is considered.

Figure 44:
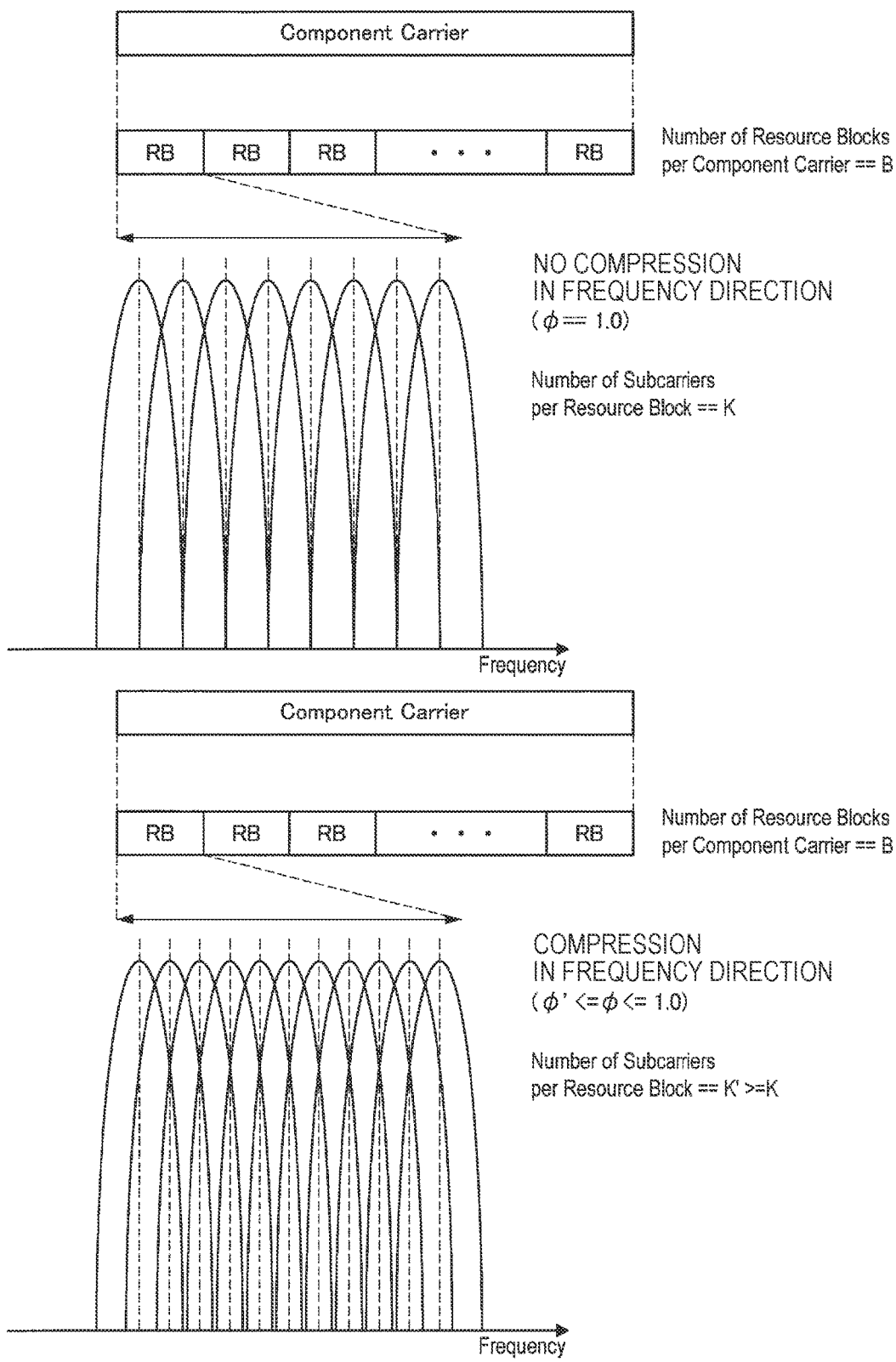
FIG. 44 is an explanatory diagram for describing an example of a case where a bandwidth of a resource block is maintained constantly regardless of presence or absence (magnitude) of compression in the frequency direction.

(B-1) Case where Bandwidth of Resource Block (RB) is Constant Regardless of Compression in Frequency Direction FIG. 44 is an explanatory diagram for describing an example of a case where a bandwidth of a resource block is maintained constantly regardless of presence or absence (magnitude) of compression in the frequency direction. The upper part of FIG. 44 is example of a case where there is no compression in the frequency direction ($\phi=1.0$) and the lower part is an example of a case where there is compression in the frequency direction ($\phi'<=\phi<=1.0$). Note that, in the example illustrated in FIG. 44, the bandwidth of the component carrier is assumed to be constant. That is, the fact that the bandwidth of the resource block is constant means that the number B of resource blocks per component carrier is also constant. However, the number of subcarriers per resource block is changed in accordance with the compression in the frequency direction. Herein, in a case where the compression coefficient in the frequency direction decreases ($\phi'<=\phi$ in FIG. 44), the number of subcarriers per resource block increases (K'>=K in FIG. 44).

In a case where the bandwidth of the resource block is constant regardless of the compression in the frequency direction, the transmission apparatus changes the disposition configuration of the resource elements in accordance with presence or absence (magnitude) of the compression in the frequency direction. The determination for changing the disposition configuration is the same as the determination flow for changing the compression coefficient in the time direction, as illustrated in FIG. 41.

Figure 45:
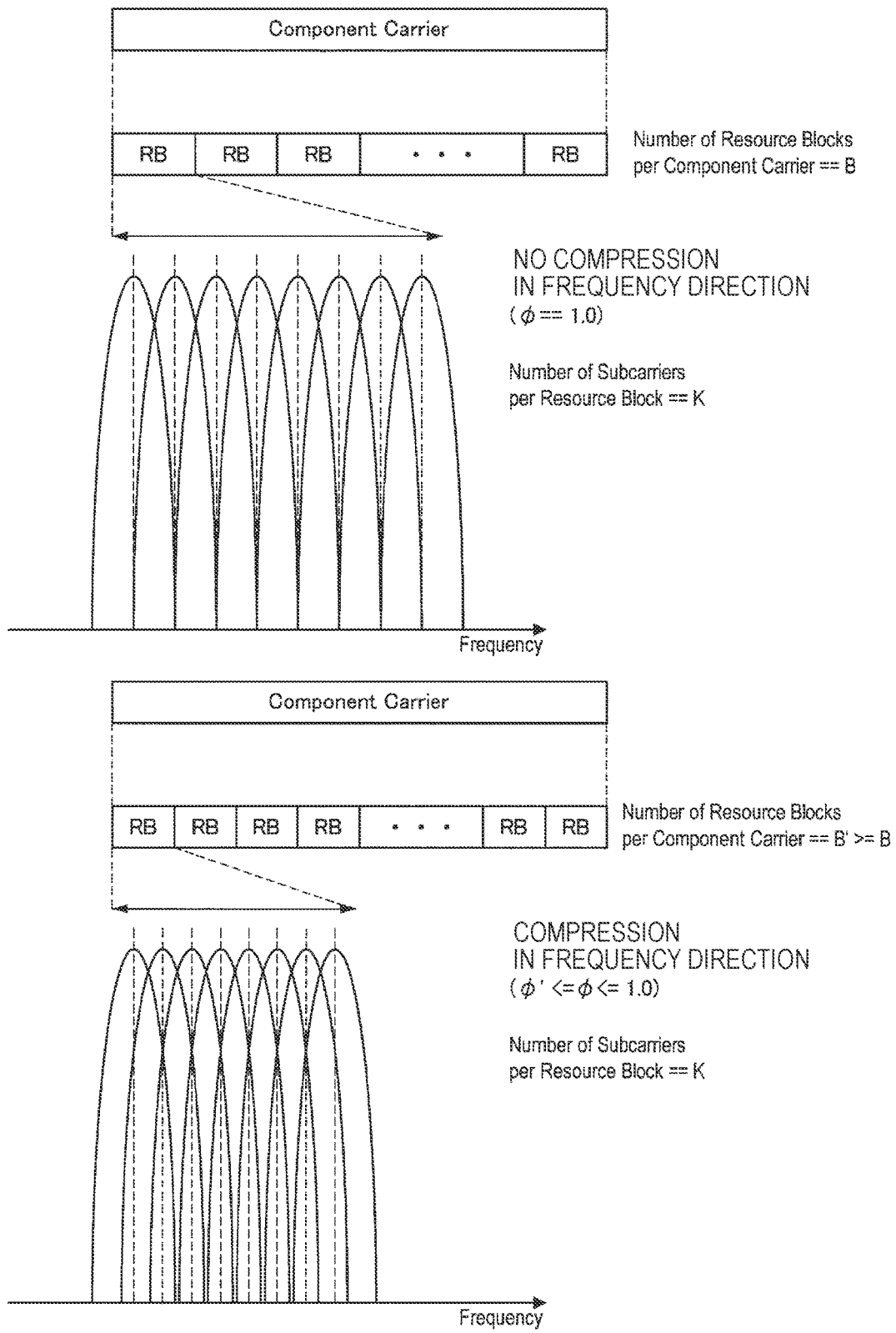
FIG. 45 is an explanatory diagram for describing an example of a case where a bandwidth of a resource block is constant regardless of compression in the frequency direction.

(B-2) Case where Number of Subcarriers Per Resource Block is Constant Regardless of Compression in Frequency Direction Unlike the foregoing (B-1), maintaining the number of subcarriers per resource block to be constant can also be considered. FIG. 45 is an explanatory diagram for describing an example of a case where the number of subcarriers per resource block is constant regardless of the compression in the frequency direction. The upper part of FIG. 45 is an example of a case where there is no compression in the frequency direction ($\phi=1.0$) and the lower part is an example of a case where there is compression in the frequency direction ($\phi'<=\phi=1.0$). In the case where the number of subcarriers per resource block is constant regardless of the compression in the frequency direction, the bandwidth of the resource block is changed in accordance with the compression in the frequency direction. In addition, the number of resource blocks per component carrier is also changed with the change in the bandwidth of the resource block in accordance with the compression in the frequency direction. In the embodiment, in a case where the compression coefficient in the frequency direction decreases ($\phi'<=\phi$ in FIG. 45, the number of resource blocks per component carrier increases (B'>=B in the drawing). However, the number K of subcarriers per resource block is constant regardless of the compression coefficient in the frequency direction.

In this case, with regard to the presence or absence (magnitude) of the compression in the frequency direction, the same disposition configuration of the resource elements can be shared. Herein, as the configuration of the resource elements, a disposition configuration of a reference signal which is a resource element or a signal which is mutually known between the transmission apparatus and the reception apparatus, such as reference signals (RS), pilot signals, or known signals, and is used for channel state information (CSI) measurement, channel estimation, cell detection, cell selection, or the like) is considered. By using the same disposition configuration of the resource elements and the same disposition configuration of the reference signals, it is possible to simplify the determination of the signal generation.

In a case where the number of subcarriers per component carrier is changed in accordance with the compression in the frequency direction, it is preferable to switch the size of IFFT or FFT for transmission or reception. To enable the size of IFFT or FFT to be switched, it is preferable to share table information indicating relevance of a component carrier bandwidth, the compression coefficient in the frequency direction, and an FFT size (an IFFT size or a DFT size (IDFT size)) in advance between the transmission apparatus and the reception apparatus (for example, the base station 100 and the terminal apparatus 200). The following Table 7 shows an example of the relevant table of the component carrier bandwidth, the compression coefficient in the frequency direction, and the FFT size (IFFT size).

TABLE 7

Example of Relevant Table of Component Carrier Bandwidth, Compression Coefficient in Frequency Direction, and FFT Size (IFFT Size)

| Component Carrier Bandwidth | Compression Coefficient in Frequency Direction | FFT Size |
|---|---|---|
| 5 MHz | 1.0 | $N_{F5}$ |
| | 0.8 | $N_{F5}'$ ($>N_{F5}$) |
| | 0.6 | $N_{F5}''$ ($>N_{F5}'$) |

TABLE 7-continued

Example of Relevant Table of Component Carrier
Bandwidth, Compression Coefficient in Frequency
Direction, and FFT Size (IFFT Size)

| Component Carrier Bandwidth | Compression Coefficient in Frequency Direction | FFT Size |
|---|---|---|
| 10 MHz | 1.0 | $N_{F10}$ |
|  | 0.8 | $N_{F10}'$ ($>N_{F10}$) |
|  | 0.6 | $N_{F10}''$ ($>N_{F10}'$) |
| ... | ... | ... |

In a case where the compression coefficient in the frequency direction at the same component carrier bandwidth decreases, the number of subcarriers is changed to increase. Accordingly, it is preferable to set the table so that the FFT size (the IFFT size, the DFT size, or the IDFT size) increases with an increase in the number of subcarriers. For example, when $N_F$ is assumed to be the FFT size in a case where the compression coefficient in the frequency direction is 1 (in the example shown in Table 7, $N_{F5}$ in a case where the component carrier bandwidth is 5 MHz, and $N_{F10}$ in a case where the component carrier bandwidth is 10 MHz), the FFT size takes an integer value near $(1/0.8)*N_F=1.25\ N_F$ in a case where the compression coefficient in the frequency direction is changed from 1.0 to 0.8. For example, the FFT size preferably takes a value such as an integer obtained by rounding up the decimal point (ceil ($1.25\ N_F$)) or rounding down (floor ($1.25\ N_F$)) or an integer of power of 2 near an integer obtained by rounding up or rounding down the decimal point.

(3) Presence or Absence of Compression in Time Direction (Symbol Interval) at Subframe Boundary or Presence or Absence of Compression in Frequency Direction (Subcarrier Interval) at Resource Block Boundary In a case where radio resources are shared by a plurality of transmission and reception apparatuses (multi-users), it is considered to allocate one or both of time resources or frequency resources to each user. At this time, in the system described above, a subframe (or TTI) which is a time resource or a resource block which is a frequency resource can be considered as an allocation unit.

As such a case, in a case where the compression in the time direction or the frequency direction is considered, preferably, the compression is not performed in a portion corresponding to a boundary of an allocation unit to the user or overlapping between the allocation units is alleviated, for example, by causing the compression coefficient of the portion corresponding to the boundary to be greater than the compression coefficient in another region. That is, in terms of the time direction, the symbol interval in the subframe is compressed, but the compression is not performed at a subframe boundary. In addition, in the frequency direction, the subcarrier interval in the resource block is compressed and the compression is not performed at a resource block boundary.

By taking such measures, the reception apparatus can demodulate or decode a signal of the reception apparatus without demodulating or decoding a signal of another user when the reception apparatus demodulates or decodes the signal, namely, which consequently leads to simplification of reception signal processing.

Figure 46:
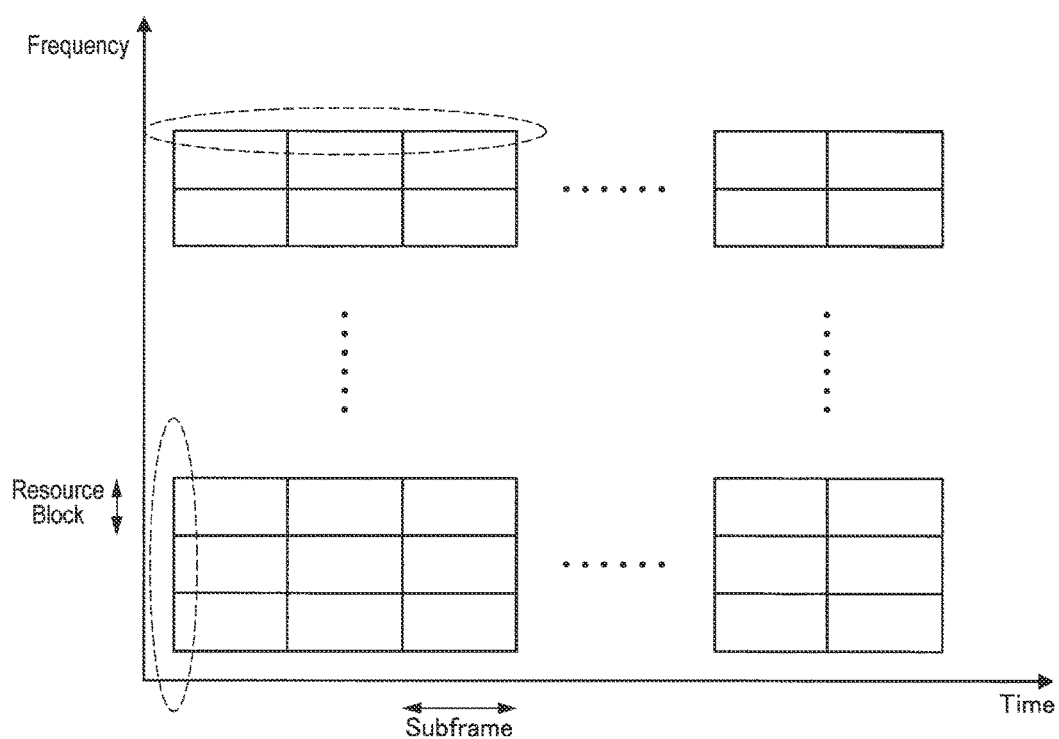
FIG. 46 is an explanatory diagram for describing an example of resource compression at a boundary of a time resource allocation unit and a boundary of a frequency resource allocation unit.
Figure 47:
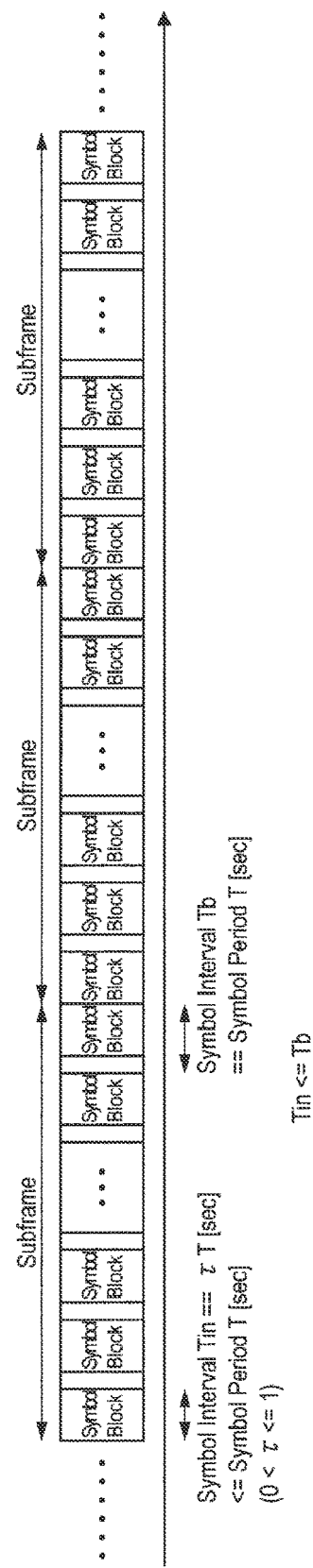
FIG. 47 is an explanatory diagram for describing an example of resource compression at a boundary of a time resource allocation unit and a boundary of a frequency resource allocation unit.
Figure 48:
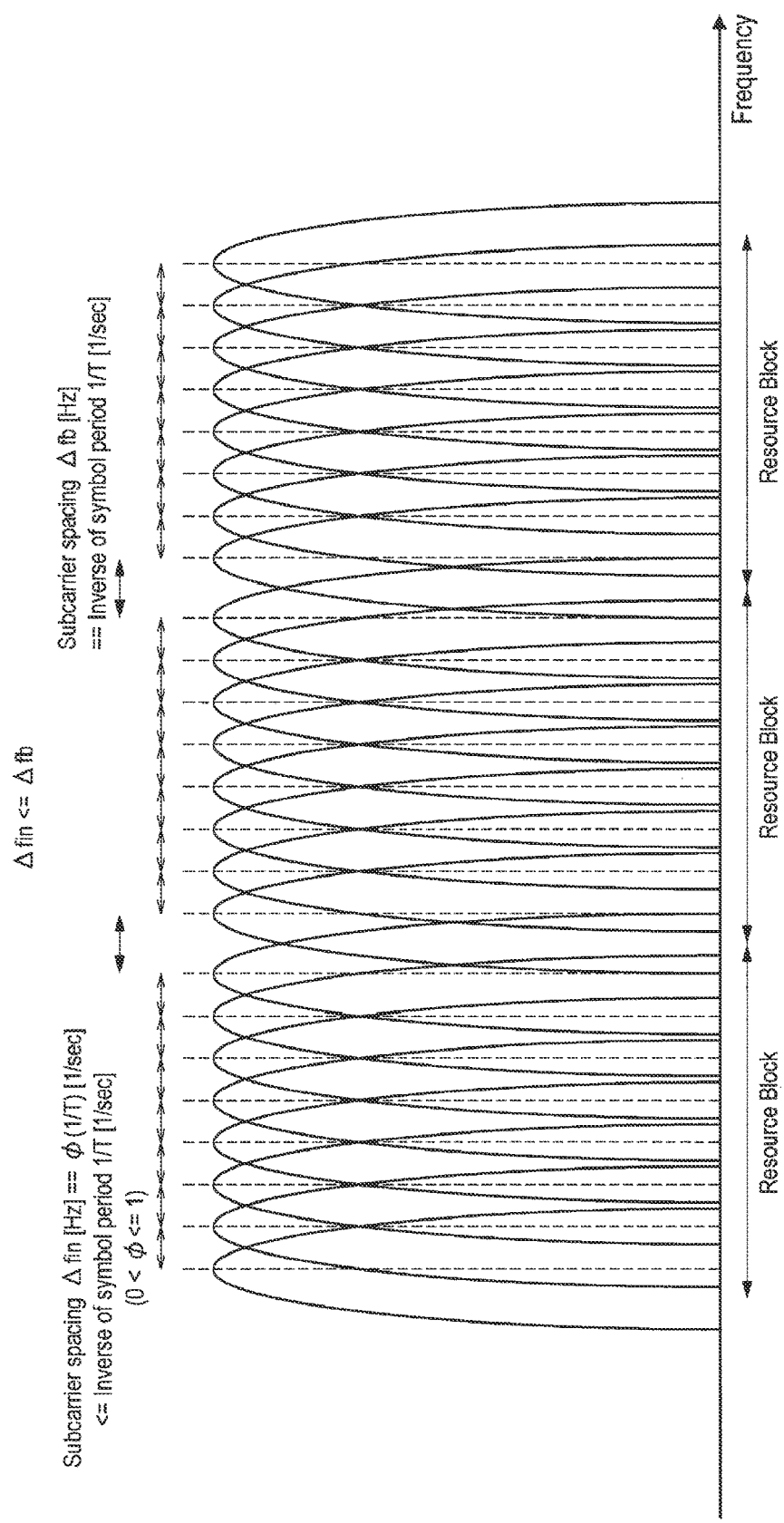
FIG. 48 is an explanatory diagram for describing an example of resource compression at a boundary of a time resource allocation unit and a boundary of a frequency resource allocation unit.

FIGS. 46 to 48 are explanatory diagrams for describing examples of resource compression at a boundary of a time resource allocation unit and a boundary of a frequency resource allocation unit. FIG. 46 is an explanatory diagram illustrating frequency-time resource disposition. FIG. 47 is an explanatory diagram illustrating a difference in compression of the symbol interval between the subframes and in the subframe on the time axis. FIG. 48 is an explanatory diagram illustrating a difference in compression of the subcarrier interval between the resource blocks and in the resource block on the frequency axis.

The time resources and the frequency resources of the cellular system are continuously disposed over time and over frequency normally as illustrated in FIG. 46. That is, the subframes and the resource blocks serving as the allocation unit are continuous. In a case where the embodiment is applied to the resources continuous over time and over frequency, the degree of the compression of the symbol interval and the degree of the compression of the subcarrier interval are preferably different at the allocation unit boundary and in the allocation unit.

For example, in a case where the resources of the time region illustrated in FIG. 47 are considered, a symbol interval in the subframe is $Tin=\tau T<=T$ when T is assumed to be a symbol length. On the other hand, a symbol interval of the subframe boundary is considered to be $Tb=T$. By deciding the symbol interval in the subframe and the symbol interval at the subframe boundary, in a case where the transmission apparatus allocates the subframes continuous over time to different users, it is not necessary for each user to receive the subframe other than the subframe allocated to the user for interference removal, and thus it is possible to simplify reception signal processing. Note that the symbol interval Tb of the subframe boundary is not necessarily $Tb=T$. Here, to simplify a processing load of the reception signal, the reception apparatus preferably take a value in which $Tin<=Tb$ is satisfied.

The resources of the frequency region illustrated in FIG. 48 are considered to be the same as the resources of the time region described above. Whereas the subcarrier interval in the resource block is $\Delta fin=\phi(1/T)<=(1/T)$, the subcarrier interval at the resource block boundary is $\Delta fb=1/T$ (or a relation between values of $\Delta fin<=\Delta fb$). By deciding the subcarrier interval in the resource block and the subcarrier interval at the resource block boundary in this way, the reception apparatus can simplify the processing load of the reception signal as in the case of the resources of the time region.

7. Application Examples

The technology according to the present disclosure is applicable to a variety of products. For example, the base station 100 may be implemented as any type of evolved node B (eNB) such as a macro eNB or a small eNB. A small eNB may be an eNB that covers a smaller cell than a macro cell, such as a pico eNB, a micro eNB, or a home (femto) eNB. Alternatively, the base station 100 may be implemented as another type of base station such as a node B or a base transceiver station (BTS). The base station 100 may include a main body (which is also referred to as base station apparatus) that controls radio communication, and one or more remote radio heads (RRHs) disposed in a different place from that of the main body. In addition, various types of terminals described below may operate as the base station 100 by temporarily or semi-permanently executing the base station function. Moreover, at least some of components of the base station 100 may be implemented in a base station apparatus or a module for the base station apparatus.

In addition, the terminal apparatus 200 may be implemented as, for example, a mobile terminal such as a smartphone, a tablet personal computer (PC), a notebook PC, a portable game terminal, a portable/dongle type mobile router or a digital camera, or an onboard terminal such as a car navigation apparatus. In addition, the terminal apparatus 200 may be implemented as a terminal (which is also referred to as machine type communication (MTC) terminal) that performs machine-to-machine (M2M) communication. Further, at least some components of the terminal apparatus 200 may be implemented in modules (e.g., integrated circuit modules each including one die) mounted on these terminals.

<7.1. Application Example Regarding Base Station>
(First Application Example)

Figure 49:
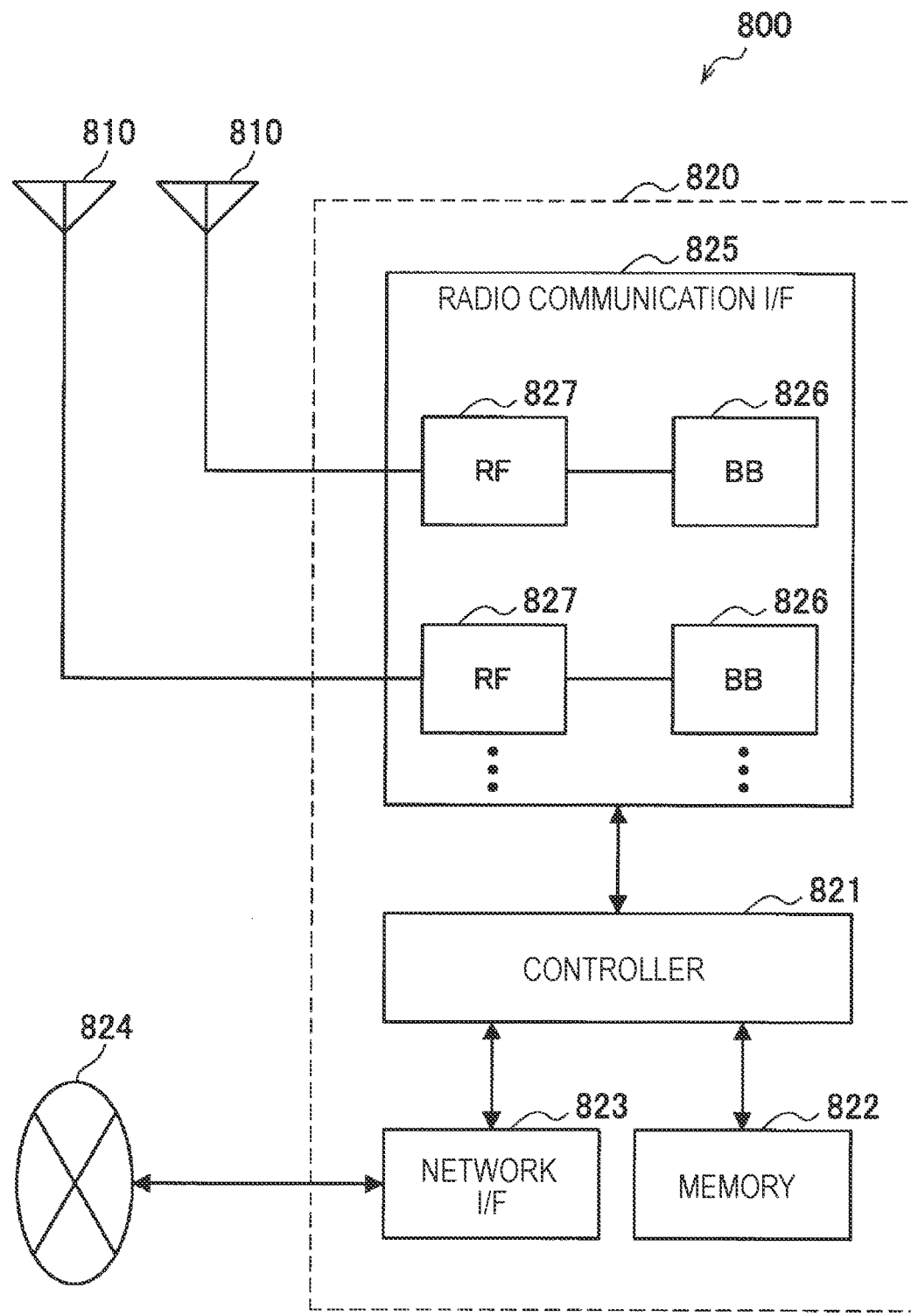
FIG. 49 is a block diagram illustrating a first example of a schematic configuration of an eNB.

FIG. 49 is a block diagram illustrating a first example of the schematic configuration of an eNB to which the technology according to the present disclosure can be applied. An eNB 800 includes one or more antennas 810 and a base station apparatus 820. Each antenna 810 can be connected to the base station apparatus 820 via an RF cable.

Each of the antennas 810 includes one or more antenna elements (e.g., a plurality of antenna elements included in an MIMO antenna), and is used for the base station apparatus 820 to transmit and receive radio signals. The eNB 800 includes the plurality of antennas 810 as illustrated in FIG. 49. For example, the plurality of antennas 810 may be compatible with a plurality of respective frequency bands used by the eNB 800. Note that FIG. 49 illustrates the example in which the eNB 800 includes the plurality of antennas 810, but the eNB 800 may also include the one antenna 810.

The base station apparatus 820 includes a controller 821, a memory 822, a network interface 823, and a radio communication interface 825.

The controller 821 may be, for example, a CPU or a DSP, and operates the various functions of a higher layer of the base station apparatus 820. For example, the controller 821 generates a data packet from data in signals processed by the radio communication interface 825, and transfers the generated packet via the network interface 823. The controller 821 may bundle data from a plurality of base band processors to generate the bundled packet, and transfer the generated bundled packet. In addition, the controller 821 may have logical functions of performing control such as radio resource control, radio bearer control, mobility management, admission control, or scheduling. In addition, the control may be executed in corporation with an eNB or a core network node in the vicinity. The memory 822 includes a RAM and a ROM, and stores a program that is executed by the controller 821, and various kinds of control data (e.g., terminal list, transmission power data, scheduling data, and the like).

The network interface 823 is a communication interface for connecting the base station apparatus 820 to a core network 824. The controller 821 may communicate with a core network node or another eNB via the network interface 823. In that case, the eNB 800 may be connected to a core network node or another eNB through a logical interface (e.g., S1 interface or X2 interface). The network interface 823 may also be a wired communication interface or a radio communication interface for radio backhaul. In the case where the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) or LTE-Advanced, and provides radio connection to a terminal positioned in a cell of the eNB 800 via the antenna 810. The radio communication interface 825 can typically include a baseband (BB) processor 826, an RF circuit 827, and the like. The BB processor 826 may perform, for example, encoding/decoding, modulating/demodulating, multiplexing/demultiplexing and the like, and executes various kinds of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. In addition, the above-described module may be a card or a blade that is inserted into a slot of the base station apparatus 820. Alternatively, the above-described module may also be a chip that is mounted on the above-described card or the above-described blade. Meanwhile, the RF circuit 827 may include a mixer, a filter, an amplifier and the like, and transmits and receives radio signals via the antenna 810.

The radio communication interface 825 includes the plurality of BB processors 826, as illustrated in FIG. 49. For example, the plurality of BB processors 826 may be compatible with plurality of frequency bands used by the eNB 800. In addition, the radio communication interface 825 includes the plurality of RF circuits 827, as illustrated in FIG. 49. For example, the plurality of RF circuits 827 may be compatible with respective antenna elements. Note that FIG. 49 illustrates the example in which the radio communication interface 825 includes the plurality of BB processors 826 and the plurality of RF circuits 827, but the radio communication interface 825 may also include the one BB processor 826 or the one RF circuit 827.

In the eNB 800 shown in FIG. 49, one or more components (the communication processing unit 151 and/or the notification unit 153) included in the processing unit 150 described with reference to FIG. 4 may be implemented in the radio communication interface 825. Alternatively, at least some of these components may be implemented in the controller 821. As an example, a module that includes a part (e.g., BB processor 826) or the whole of the radio communication interface 825 and/or the controller 821 may be mounted in the eNB 800, and the above-described one or more components may be implemented in the module. In this case, the above-described module may store a program for causing the processor to function as the above-described one or more components (i.e., program for causing the processor to execute the operations of the above-described one or more components) and may execute the program. As another example, the program for causing the processor to function as the above-described one or more components may be installed in the eNB 800, and the radio communication interface 825 (e.g., BB processor 826) and/or the controller 821 may execute the program. As described above, the eNB 800, the base station apparatus 820, or the above-described module may be provided as an apparatus that includes the above-described one or more components, and the program for causing the processor to function as the above-described one or more components may be provided. In addition, a readable recording medium having the above-described program recorded thereon may be provided.

In addition, in an eNB 800 illustrated in FIG. 49, the radio communication unit 120 described with reference to FIG. 4 may be implemented in the radio communication interface 825 (e.g., RF circuit 827). In addition, the antenna unit 110 may be implemented in the antenna 810. In addition, the network communication unit 130 may be implemented in the controller 821 and/or the network interface 823. In addition, the storage unit 140 may be implemented in the memory 822.

(Second Application Example)

Figure 50:
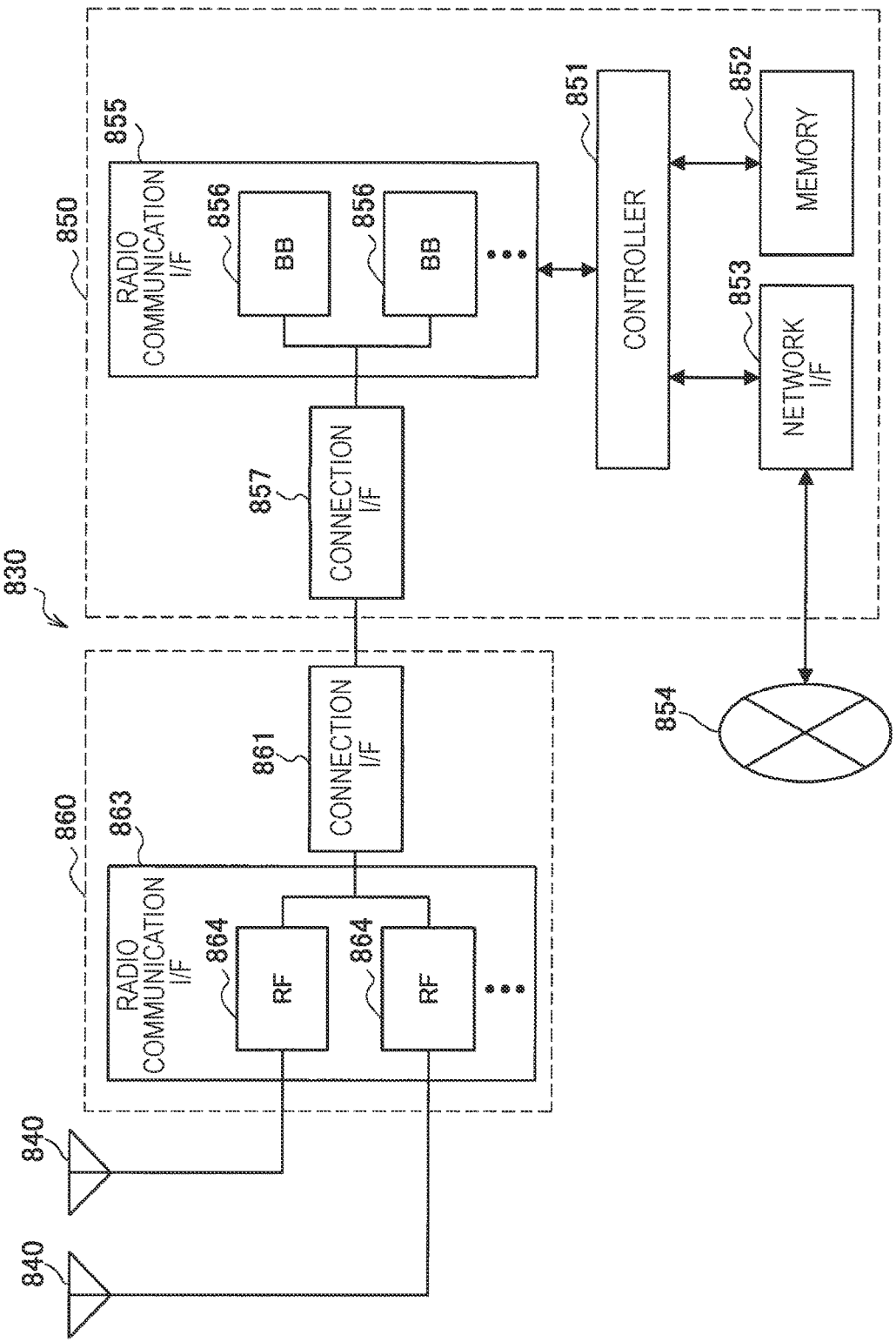
FIG. 50 is a block diagram illustrating a second example of the schematic configuration of the eNB.

FIG. 50 is a block diagram illustrating a second example of a schematic configuration of an eNB to which the technology according to the present disclosure can be applied. The eNB 830 includes one or more antennas 840, a base station apparatus 850, and an RRH 860. Each antenna 840 may be connected to the RRH 860 via an RF cable. In addition, the base station apparatus 850 can be connected to the RRH 860 via a high speed line such as an optical fiber cable.

Each of the antennas 840 includes one or more antenna elements (e.g., a plurality of antenna elements included in an MIMO antenna), and is used for the RRH 860 to transmit and receive radio signals. The eNB 830 includes the plurality of antennas 840 as illustrated in FIG. 50. For example, the plurality of antennas 840 may be compatible with a plurality of respective frequency bands used by the eNB 830. Note that FIG. 50 illustrates the example in which the eNB 830 includes the plurality of antennas 840, but the eNB 830 may include the one antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 49.

The radio communication interface 855 supports any cellular communication scheme such as LTE or LTE-Advanced, and provides radio communication to a terminal positioned in the sector corresponding to the RRH 860 via the RRH 860 and the antenna 840. The radio communication interface 855 can typically include a BB processor 856 and the like. The BB processor 856 is similar to the BB processor 826 described with reference to FIG. 49, except that the BB processor 856 is connected to the RF circuit 864 of the RRH 860 via the connection interface 857. The radio communication interface 855 includes the plurality of BB processors 856 as illustrated in FIG. 50. For example, the plurality of BB processors 856 may be compatible with a plurality of respective frequency bands used by the eNB 830. Note that FIG. 50 illustrates the example in which the radio communication interface 855 includes the plurality of BB processors 856, but the radio communication interface 855 may include the one BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include the RF circuit 864 and the like. The RF circuit 864 may include a mixer, a filter, an amplifier and the like, and transmits and receives radio signals via the antenna 840. The radio communication interface 863 includes the plurality of RF circuits 864 as illustrated in FIG. 50. For example, the plurality of RF circuits 864 may be compatible with a plurality of respective antenna elements. Note that FIG. 50 illustrates the example in which the radio communication interface 863 includes the plurality of RF circuits 864, but the radio communication interface 863 may include the one RF circuit 864.

In the eNB 830 illustrated in FIG. 50, one or more components (the communication processing unit 151 and/or the notification unit 153) included in the processing unit 150 described with reference to FIG. 4 may be implemented in the radio communication interface 855 and/or the radio communication interface 863. Alternatively, at least some of these components may be implemented in the controller 851. As an example, a module that includes a part (e.g., BB processor 856) or the whole of the radio communication interface 855 and/or the controller 821 may be mounted in eNB 830, and the above-described one or more components may be implemented in the module. In this case, the above-described module may store a program for causing the processor to function as the above-described one or more components (i.e., a program for causing the processor to execute the operations of the above-described one or more components) and may execute the program. As another example, the program for causing the processor to function as the above-described one or more components may be installed in the eNB 830, and the radio communication interface 855 (e.g., BB processor 856) and/or the controller 851 may execute the program. As described above, the eNB 830, the base station apparatus 850, or the above-described module may be provided as an apparatus that includes the above-described one or more components, and the program for causing the processor to function as the above-described one or more components may be provided. In addition, a readable recording medium having the above-described program recorded thereon may be provided.

Figure 4:
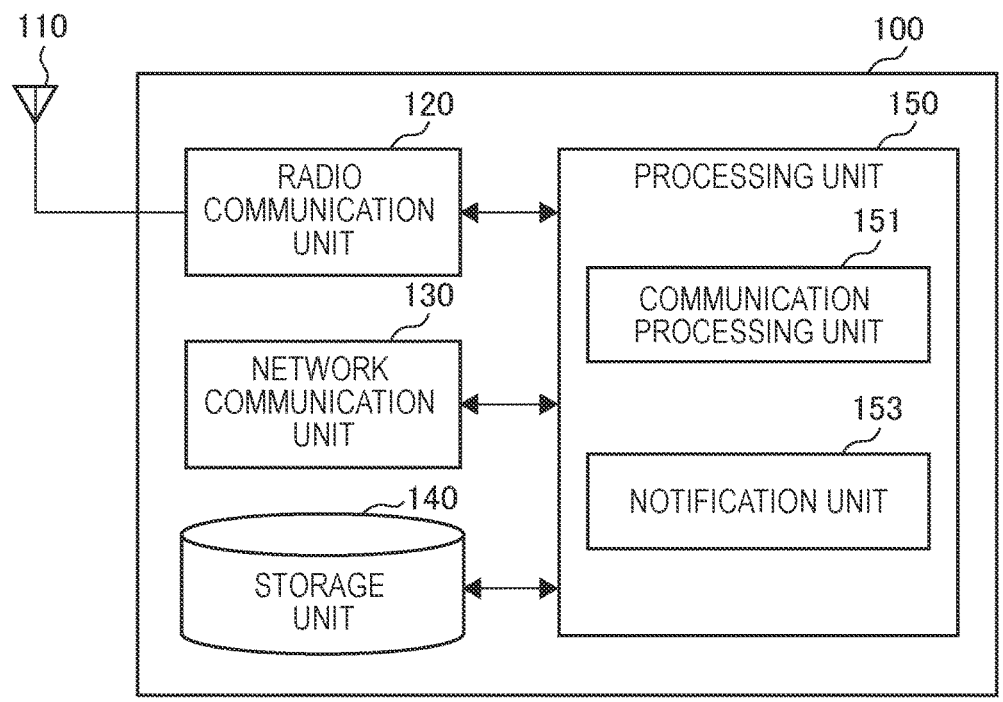
FIG. 4 is a block diagram illustrating an example of a configuration of a base station according to the embodiment.

In addition, in the eNB 830 illustrated in FIG. 50, the radio communication unit 120 described, for example, with reference to FIG. 4 may be implemented in the radio communication interface 863 (e.g., RF circuit 864). In addition, the antenna unit 110 may be implemented in the antenna 840. In addition, the network communication unit 130 may be implemented in the controller 851 and/or the network interface 853. In addition, the storage unit 140 may be implemented in the memory 852.

<7.2. Application Example Regarding Terminal Apparatus>

(First Application Example)

Figure 51:
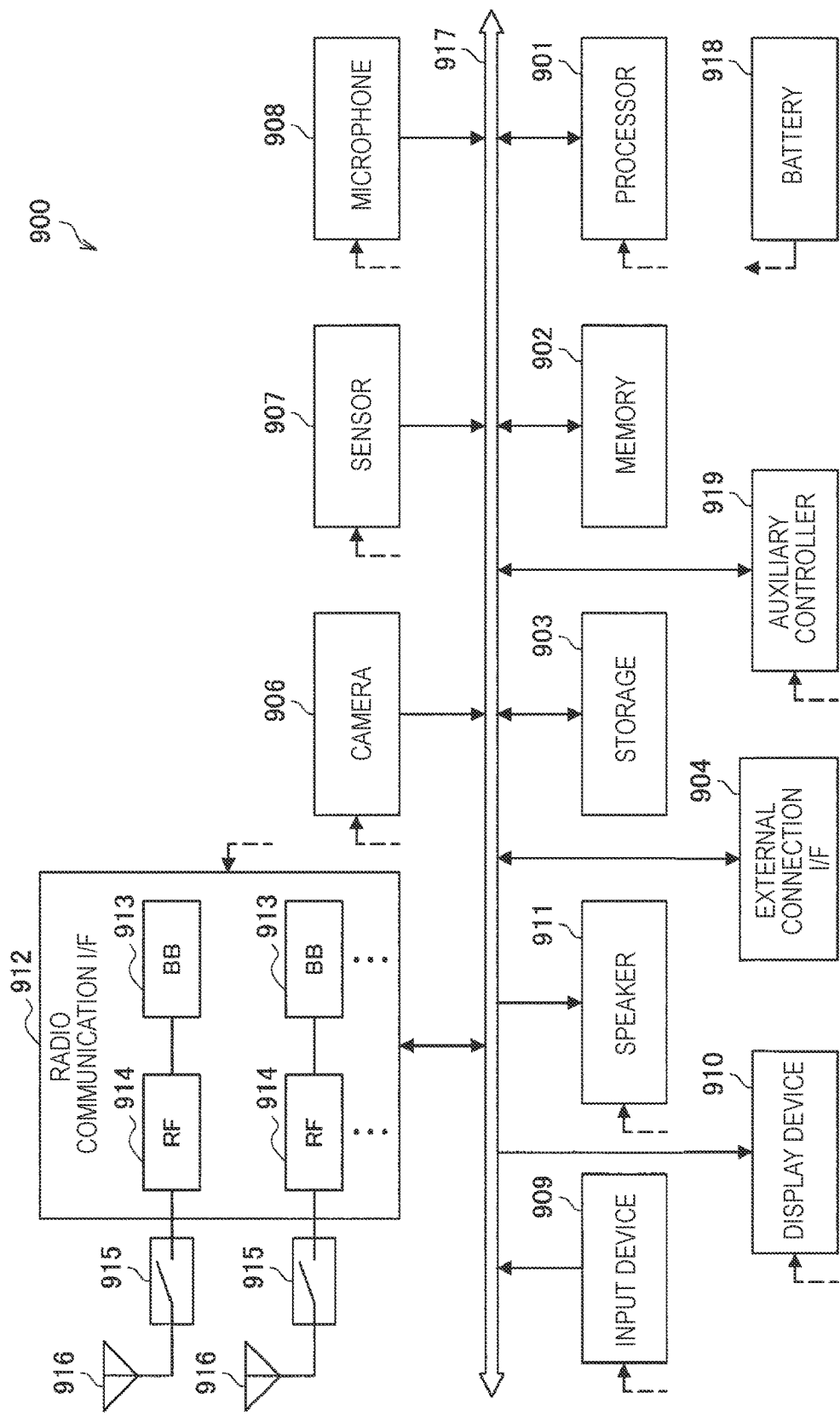
FIG. 51 is a block diagram illustrating an example of a schematic configuration of a smartphone.

FIG. 51 is a block diagram illustrating an example of the schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of the application layer and another layer of the smartphone 900. The memory 902 includes a RAM and a ROM, and stores a program that is executed by the processor 901, and data. The storage 903 can include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) or a complementary metal oxide semiconductor (CMOS), and generates a captured image. The sensor 907 can include, for example, a group of sensors such as a measurement sensor, a gyro sensor, a geomagnetic sensor, and an acceleration sensor. The microphone 908 converts sound input to the smartphone 900 to sound signals. The input device 909 includes, for example, a touch sensor configured to detect touch onto a screen of the display device 910, a keypad, a keyboard, a button, a switch or the like, and receives an operation or an information input from a user. The display device 910 includes a screen such as a liquid crystal display (LCD) or an organic light-emitting diode (OLED) display, and displays an output image of the smartphone 900. The speaker 911 converts sound signals output from the smartphone 900 to sound.

The radio communication interface 912 supports any cellular communication scheme such as LTE and LTE-Advanced, and executes radio communication. The radio communication interface 912 may typically include a BB processor 913, an RF circuit 914, and the like. The BB processor 913 may perform, for example, encoding/decoding, modulating/demodulating, multiplexing/demultiplexing and the like, and executes various kinds of signal processing for radio communication. Meanwhile, the RF circuit 914 may include a mixer, a filter, an amplifier and the like, and transmits and receives radio signals via the antenna 916. The radio communication interface 912 may also be a one chip module that has the BB processor 913 and the RF circuit 914 integrated thereon. The radio communication interface 912 may include the plurality of BB processors 913 and the plurality of RF circuits 914 as illustrated in FIG. 51. Note that FIG. 51 illustrates the example in which the radio communication interface 912 includes the plurality of BB processors 913 and the plurality of RF circuits 914, but the radio communication interface 912 may also include the one BB processor 913 or the one RF circuit 914.

Further, in addition to a cellular communication scheme, the radio communication interface 912 may support another type of radio communication scheme such as a short-distance radio communication scheme, a near field communication scheme, or a radio local area network (LAN) scheme. In that case, the radio communication interface 912 may include the BB processor 913 and the RF circuit 914 for each radio communication scheme.

Each of the antenna switches 915 switches a connection destination of the antenna 916 between a plurality of circuits (e.g., circuits for different radio communication schemes) included in the radio communication interface 912.

Each of the antennas 916 includes one or more antenna elements (e.g., a plurality of antenna elements included in an MIMO antenna), and is used for the radio communication interface 912 to transmit and receive radio signals. The smartphone 900 may include the plurality of antennas 916 as illustrated in FIG. 51. Note that FIG. 51 illustrates the example in which the smartphone 900 includes the plurality of antennas 916, but the smartphone 900 may include the one antenna 916.

Further, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to the respective blocks of the smartphone 900 illustrated in FIG. 51 via feeder lines that are partially illustrated as dashed lines in the figure. The auxiliary controller 919 operates a minimum necessary function of the smartphone 900, for example, in a sleep mode.

In the smartphone 900 illustrated in FIG. 51, one or more components (the information acquisition unit 241 and/or the communication processing unit 243) included in the processing unit 240 described with reference to FIG. 5 may be implemented in the radio communication interface 912. Alternatively, at least some of these components may be implemented in the processor 901 or the auxiliary controller 919. As an example, a module that includes a part (e.g., BB processor 913) or the whole of the radio communication interface 912, the processor 901 and/or the auxiliary controller 919 may be mounted in the smartphone 900, and the above-described one or more components may be implemented in the module. In this case, the above-described module may store a program for causing the processor to function as the above-described one or more components (i.e., a program for causing the processor to execute the operations of the above-described one or more components) and may execute the program. As another example, the program for causing the processor to function as the above-described one or more components may be installed in the smartphone 900, and the radio communication interface 912 (e.g., BB processor 913), the processor 901 and/or the auxiliary controller 919 may execute the program. As described above, the smartphone 900 or the above-described module may be provided as an apparatus that includes the above-described one or more components, and the program for causing the processor to function as the above-described one or more components may be provided. In addition, a readable recording medium having the above-described program recorded thereon may be provided.

Figure 5:
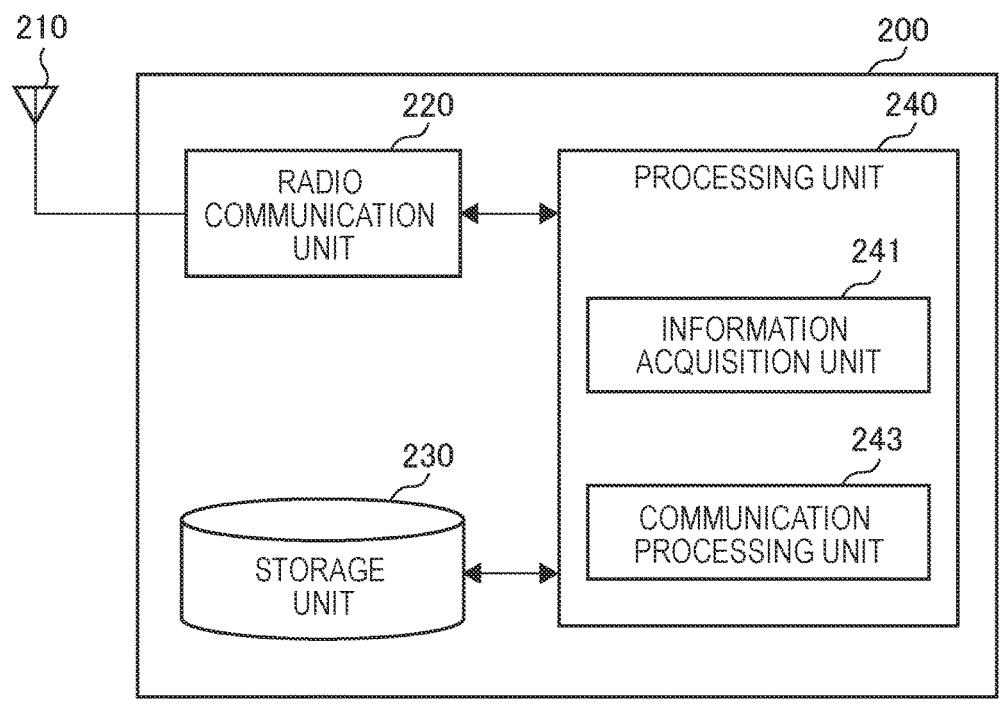
FIG. 5 is a block diagram illustrating an example of a configuration of a terminal apparatus according to the embodiment.

In addition, in the smartphone 900 illustrated in FIG. 51, the radio communication unit 220 described, for example, with reference to FIG. 5 may be implemented in the radio communication interface 912 (e.g., RF circuit 914). In addition, the antenna unit 210 may be implemented in the antenna 916. In addition, the storage unit 230 may be implemented in the memory 902.

(Second Application Example)

Figure 52:
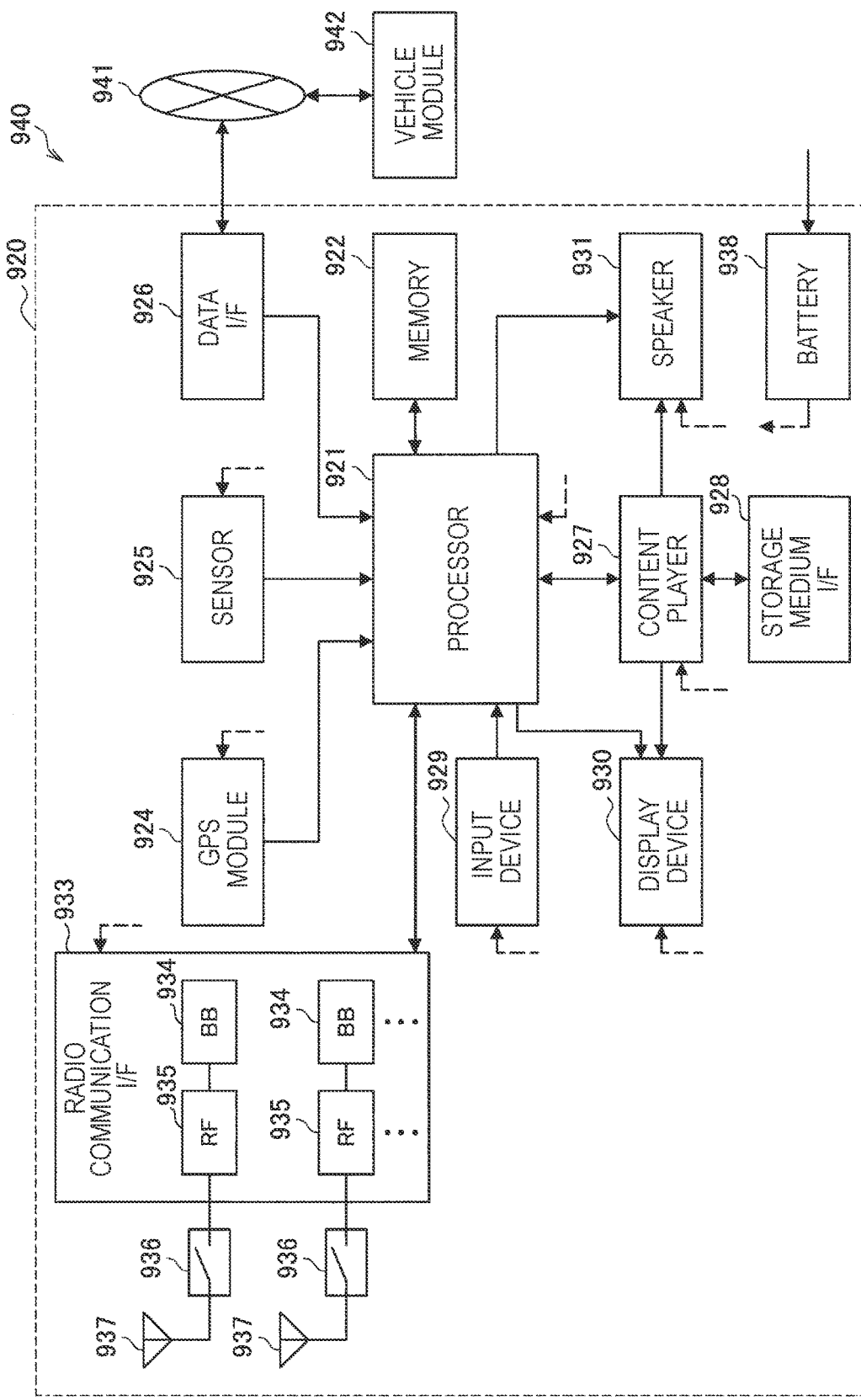
FIG. 52 is a block diagram illustrating an example of a schematic configuration of a car navigation apparatus.

FIG. 52 is a block diagram illustrating an example of the schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function and another function of the car navigation apparatus 920. The memory 922 includes a RAM and a ROM, and stores a program that is executed by the processor 921, and data.

The GPS module 924 uses GPS signals received from a GPS satellite to measure the position (e.g., latitude, longitude, and altitude) of the car navigation apparatus 920. The sensor 925 may include, for example, a group of sensors such as a gyro sensor, a geomagnetic sensor, and a barometric sensor. The data interface 926 is connected to, for example, an in-vehicle network 941 via a terminal that is not illustrated, and acquires data such as vehicle speed data generated by the vehicle side.

The content player 927 reproduces content stored in a storage medium (e.g., CD or DVD) that is inserted into the storage medium interface 928. The input device 929 includes, for example, a touch sensor configured to detect touch onto a screen of the display device 930, a button, a switch or the like and receives an operation or an information input from a user. The display device 930 includes a screen such as an LCD or an OLED display, and displays an image of the navigation function or content that is reproduced. The speaker 931 outputs the sound of the navigation function or the content that is reproduced.

The radio communication interface 933 supports any cellular communication scheme such as LTE and LTE-Advanced, and executes radio communication. The radio communication interface 933 may typically include a BB processor 934, an RF circuit 935, and the like. The BB processor 934 may perform, for example, encoding/decoding, modulating/demodulating, multiplexing/demultiplexing and the like, and executes various kinds of signal processing for radio communication. Meanwhile, the RF circuit 935 may include a mixer, a filter, an amplifier and the like, and transmits and receives radio signals via the antenna 937. The radio communication interface 933 may also be a one chip module that has the BB processor 934 and the RF circuit 935 integrated thereon. The radio communication interface 933 may include the plurality of BB processors 934 and the plurality of RF circuits 935 as illustrated in FIG. 52. Note that FIG. 52 illustrates the example in which the radio communication interface 933 includes the plurality of BB processors 934 and the plurality of RF circuits 935, but the radio communication interface 933 may also include the one BB processor 934 or the one RF circuit 935.

Further, in addition to a cellular communication scheme, the radio communication interface 933 may support another type of radio communication scheme such as a short-distance radio communication scheme, a near field communication scheme, or a radio LAN scheme. In that case, the radio communication interface 933 may include the BB processor 934 and the RF circuit 935 for each radio communication scheme.

Each of the antenna switches 936 switches a connection destination of the antenna 937 between a plurality of circuits (e.g., circuits for different radio communication schemes) included in the radio communication interface 933.

Each of the antennas 937 includes one or more antenna elements (e.g., a plurality of antenna elements included in an MIMO antenna), and is used for the radio communication interface 933 to transmit and receive radio signals. The car navigation apparatus 920 may include the plurality of antennas 937 as illustrated in FIG. 52. Note that FIG. 52 illustrates an example in which the car navigation apparatus 920 includes the plurality of antennas 937, but the car navigation apparatus 920 may include the one antenna 937.

Further, the car navigation apparatus 920 may include the antenna 937 for each radio communication scheme. In that case, the antenna switches 936 may be omitted from the configuration of the car navigation apparatus 920.

The battery 938 supplies power to the respective blocks of the car navigation apparatus 920 illustrated in FIG. 52 via feeder lines that are partially illustrated as dashed lines in the figure. In addition, the battery 938 accumulates power supplied from the vehicle side.

In the car navigation apparatus 920 illustrated in FIG. 52, one or more components (the information acquisition unit 241 and/or the communication processing unit 243) included in the processing unit 240 described with reference to FIG. 5 may be implemented in the radio communication interface 933. Alternatively, at least some of these components may be implemented in the processor 921. As an example, a module that includes a part (e.g., BB processor 934) or the whole of the radio communication interface 933 and/or the processor 921 may be mounted in the car navigation apparatus 920, and the above-described one or more components may be implemented in the module. In this case, the above-described module may store a program for causing the processor to function as the above-described one or more components (i.e., a program for causing the processor to execute the operations of the above-described one or more components) and may execute the program. As another example, the program for causing the processor to function as the above-described one or more components may be installed in the car navigation apparatus 920, and the radio communication interface 933 (e.g., BB processor 934) and/or the processor 921 may execute the program. As described above, the car navigation apparatus 920 or the above-described module may be provided as an apparatus that includes the above-described one or more components, and the program for causing the processor to function as the above-described one or more components may be provided. In addition, a readable recording medium having the above-described program recorded thereon may be provided.

In addition, in the car navigation apparatus 920 illustrated in FIG. 52, the radio communication unit 220 described, for example, with reference to FIG. 5 may be implemented in the radio communication interface 933 (e.g., RF circuit 935). In addition, the antenna unit 210 may be implemented in the antenna 937. In addition, the storage unit 230 may be implemented in the memory 922.

In addition, the technology according to the present disclosure may also be implemented as an in-vehicle system (or a vehicle) 940 including one or more blocks of the above-described car navigation apparatus 920, the in-vehicle network 941, and a vehicle module 942. That is, the in-vehicle system (or the vehicle) 940 may be provided as an apparatus that includes the information acquisition unit 241 and/or the communication processing unit 243. The vehicle module 942 generates vehicle-side data such as vehicle speed, engine speed, or trouble information, and outputs the generated data to the in-vehicle network 941.

8. Conclusion

With reference to FIGS. 3 to 52, the above describes the apparatus and the processing according to an embodiment of the present disclosure.

According to an embodiment of the present disclosure, for example, in the case where focus is placed on the downlink of the system 1, the base station 100 notifies the terminal apparatus 200 of a compression coefficient in a time direction or a frequency direction (e.g., compression coefficient decided for each cell) decided in accordance with a communication environment as an FTN parameter. In addition, the base station 100 modulates a transmission target data destined for the terminal apparatus 200, and performs FTN mapping processing on the modulated bit sequence to adjust the symbol intervals or a subcarrier interval in the bit sequence. The base station 100 then transmits a transmission signal obtained by performing digital/analog conversion, radio frequency processing, and the like on the bit sequence on which FTN mapping processing has been performed to the terminal apparatus 200. On the basis of such a configuration, the terminal apparatus 200 performs FTN de-mapping processing on the bit sequence obtained from a reception signal from the base station 100 on the basis of a compression coefficient in the time direction or the frequency direction of which the terminal apparatus 200 has been notified beforehand, thereby making it possible to decode the data transmitted from the base station 100.

In addition, as another example, in the case where focus is placed on the uplink of the system 1, the base station 100 notifies the terminal apparatus 200 of a compression coefficient in a time direction or a frequency direction (e.g., compression coefficient decided for each cell) decided in accordance with a communication environment as an FTN parameter. Upon receiving this notification, the terminal apparatus 200 modulates transmission target data destined for the base station 100, and performs FTN mapping processing on the modulated bit sequence to adjust the symbol intervals or a subcarrier interval in the bit sequence. The terminal apparatus 200 then transmits a transmission signal obtained by performing digital/analog conversion, radio frequency processing, and the like on the bit sequence on which FTN mapping processing has been performed to the base station 100. On the basis of such a configuration, the base station 100 performs FTN de-mapping processing on the bit sequence obtained from a reception signal from the terminal apparatus 200 on the basis of a compression coefficient in the time direction or the frequency direction of which the terminal apparatus 200 has been notified beforehand, thereby making it possible to decode the data transmitted from the base station 100.

As described above, according to an embodiment of the present disclosure, the communication system according to the present embodiment takes into consideration the load of the processing of addressing inter-symbol interference or inter-subcarrier interference in a reception apparatus, and is configured to be capable of adaptively adjusting a compression coefficient. Such a configuration makes it possible to balance between the load in a reception apparatus and frequency use efficiency in a more favorable manner. That is, according to the present embodiment, it is possible to use and accommodate various kinds of frequency and various apparatuses in a communication system, and further improve the extendibility and flexibility of the communication system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

a communication unit configured to perform radio communication; and a control unit configured to perform control such that transmission is performed from the communication unit to a terminal by narrowing at least one of a symbol interval of a complex symbol sequence in a time direction and a subcarrier interval of the complex symbol sequence in a frequency direction, the complex symbol sequence being converted from a bit sequence, the symbol interval and the subcarrier interval being set on a basis of a predetermined condition.

(2)

The apparatus according to (1), in which the control unit sets a narrowing amount of the symbol interval or a narrowing amount of the subcarrier interval fixedly.

(3)

The apparatus according to (1), in which the control unit sets a narrowing amount of the symbol interval or a narrowing amount of the subcarrier interval for each cell or each component carrier.

(4)

The apparatus according to (3), in which the control unit sets the narrowing amount of the symbol interval or the narrowing amount of the subcarrier interval in accordance with information transmitted with signaling of a higher layer.

(5)

The apparatus according to (1), in which the control unit sets a narrowing amount of the symbol interval or a narrowing amount of the subcarrier interval dynamically for a predetermined time.

(6)

The apparatus according to (5), in which the control unit sets the narrowing amount of the symbol interval or the narrowing amount of the subcarrier interval in accordance with information transmitted with a physical control channel.

(7)

The apparatus according to any of (1) to (6), in which the control unit operates in a first mode in which the control is performed such that the transmission is performed from the communication unit to the terminal by narrowing the symbol interval and a second mode in which the control is performed such that the transmission is performed from the communication unit to the terminal without narrowing the symbol interval.

(8)

The apparatus according to (7), in which the control unit uses a same transmission time length between the first mode and the second mode.

(9)

The apparatus according to (8), in which the control unit uses different resource element disposition configurations between the first mode and the second mode.

(10)

The apparatus according to (7), in which the control unit uses a same number of transmission symbols between the first mode and the second mode.

(11)

The apparatus according to (10), in which the control unit uses a same radio frame length between the first mode and the second mode.

(12)

The apparatus according to any of (1) to (12), in which the control unit operates in a third mode in which the control is performed such that the transmission is performed from the communication unit to the terminal by narrowing the subcarrier interval and a fourth mode in which the control is performed such that the transmission is performed from the communication unit to the terminal without narrowing the subcarrier interval.

(13)

The apparatus according to (12), in which the control unit uses a same resource block bandwidth between the third mode and the fourth mode.

(14)

The apparatus according to (13), in which the control unit uses different resource element disposition configurations between the third mode and the fourth mode.

(15)

The apparatus according to (12), in which the control unit uses a same number of subcarriers per resource block between the third mode and the fourth mode.

(16)

The apparatus according to (15), in which the control unit uses different numbers of resource blocks per component carrier between the third mode and the fourth mode.

(17)

The apparatus according to any of (1) to (16), in which the control unit uses a plurality of cells or component carriers in carrier aggregation.

(18)

The apparatus according to (17), in which the control unit causes at least one of a narrowing amount of the symbol interval and a narrowing amount of the subcarrier interval to differ between the different cells or the different component carriers.

(19)

The apparatus according to (18), in which the control unit aligns boundaries between different cells or different component carriers in the time direction in a first mode in which the control is performed such that the transmission is performed from the communication unit to the terminal by narrowing the symbol interval.

(20)

The apparatus according to (17), in which the control unit causes at least one of a narrowing amount of the symbol interval and a narrowing amount of the subcarrier interval to be same between the different cells or the different component carriers.

(21)

The apparatus according to any of 817) to (20), in which the control unit excludes the cells or the component carriers from a combination of the carrier aggregation in a case where a narrowing amount differs between the cells or the component carriers and boundaries in the time direction or boundaries in the frequency direction are not synchronized in a first mode in which the control is performed such that the transmission is performed from the communication unit to the terminal by narrowing the symbol interval or a third mode in which the control is performed such that the transmission is performed from the communication unit to the terminal by narrowing the subcarrier interval.

(22)

The apparatus according to any of (1) to (21), in which the control unit uses a plurality of cells or component carriers in dual-connectivity.

(23)

The apparatus according to (22), in which the control unit causes at least one of a narrowing amount of the symbol interval and a narrowing amount of the subcarrier interval to differ between the different cells or the different component carriers.

(24)

The apparatus according to 822), in which the control unit causes at least one of a narrowing amount of the symbol interval and a narrowing amount of the subcarrier interval to be same between the different cells or the different component carriers.

(25)

The apparatus according to (1), in which the control unit causes a narrowing amount of the symbol interval to differ between a boundary in the time direction and a region other than the boundary in a first mode in which the control is performed such that the transmission is performed from the communication unit to the terminal by narrowing the symbol interval.

(26)

The apparatus according to (25), in which the control unit does not narrow the symbol interval at the boundary in the time direction.

(27)

The apparatus according to (1), in which the control unit causes a narrowing amount of the subcarrier interval to differ between a boundary in the frequency direction and a region other than the boundary in a third mode in which the control is performed such that the transmission is performed from the communication unit to the terminal by narrowing the subcarrier interval.

(28)

The apparatus according to (27), in which the control unit does not narrow the subcarrier interval at the boundary in the frequency direction.

(29)

The apparatus according to any of (1) to (28), in which, in a case where the control is performed such that the transmission is performed from the communication unit to the terminal by narrowing the symbol interval or the subcarrier interval, the control unit causes a narrowing amount of the symbol interval or a narrowing amount of the subcarrier interval to differ between a boundary of at least one of time resources or frequency resources with which a signal is transmitted to a different user and a region other than the boundary.

(30)

The apparatus according to (29), in which the control unit does not narrow the symbol interval or the subcarrier interval at a boundary of at least one of the time resources or the frequency resources with which the signal is transmitted to the different user.

(31)

A method including:

performing radio communication; and performing, by a processor, control such that radio transmission is performed from the communication unit to a terminal by narrowing at least one of a symbol interval of a complex symbol sequence in a time direction and a subcarrier interval of the complex symbol sequence in a frequency direction, the complex symbol sequence being converted from a bit sequence, the symbol interval and the subcarrier interval being set on a basis of a predetermined condition.

(32)

A computer program for causing a computer to execute:

performing radio communication; and performing control such that radio transmission is performed from the communication unit to a terminal by narrowing at least one of a symbol interval of a complex symbol sequence in a time direction and a subcarrier interval of the complex symbol sequence in a frequency direction, the complex symbol sequence being converted from a bit sequence, the symbol interval and the subcarrier interval being set on a basis of a predetermined condition.

REFERENCE SIGNS LIST 1 system
10 cell
100 base station
110 antenna unit
120 radio communication unit
130 network communication unit
140 storage unit
150 processing unit
151 communication processing unit
153 notification unit
200 terminal apparatus
210 antenna unit
220 radio communication unit
230 storage unit
240 processing unit
241 information acquisition unit
243 communication processing unit

The invention claimed is:
1. An apparatus, comprising:
a controller configured to generate a complex symbol sequence based on a bit sequence; and
a radio communication interface configured to transmit the complex symbol sequence via radio communication, wherein
the controller is further configured to:
set a symbol interval of the complex symbol sequence and a subcarrier interval of the complex symbol sequence based on a specific condition;
control the transmission of the complex symbol sequence from the radio communication interface to a terminal based on at least one of the symbol interval of the complex symbol sequence in a time direction or the subcarrier interval of the complex symbol sequence in a frequency direction is narrower than a Nyquist interval; and
set one of a narrowing amount of the symbol interval or a narrowing amount of the subcarrier interval for one of each cell of a plurality of cells or each component carrier of a plurality of component carriers based on information associated with a signaling operation of a higher layer of the apparatus.
2. The apparatus according to claim 1, wherein the controller is further configured to set one of the narrowing amount of the symbol interval or the narrowing amount of the subcarrier interval fixedly.
3. The apparatus according to claim 1, wherein
the radio communication interface is further configured to transmit the information with a physical contact channel, and
the controller is further configured to set one of the narrowing amount of the symbol interval or the narrowing amount of the subcarrier interval for a specific time based on the transmitted information.
4. The apparatus according to claim 1, wherein the controller is further configured to operate:
in a first mode in which the transmission of the complex symbol sequence is based on the symbol interval that is narrower than the Nyquist interval, and
in a second mode in which the transmission of the complex symbol sequence is based on the symbol interval that is equal to the Nyquist interval.
5. The apparatus according to claim 4, wherein the controller is further configured to utilize a same transmission time length between the first mode and the second mode.
6. The apparatus according to claim 5, wherein the controller is further configured to utilize different resource element disposition configurations between the first mode and the second mode.
7. The apparatus according to claim 4, wherein the controller is further configured to utilize a same number of transmission symbols between the first mode and the second mode.
8. The apparatus according to claim 7, wherein the controller is further configured to utilize a same radio frame length between the first mode and the second mode.
9. The apparatus according to claim 1, wherein the controller is further configured to operate:
in a third mode in which the transmission of the complex symbol sequence is based on the subcarrier interval that is narrower than the Nyquist interval, and
in a fourth mode in which the transmission of the complex symbol sequence is based on the subcarrier interval that is equal to the Nyquist interval.
10. The apparatus according to claim 9, wherein the controller is further configured to utilize a same resource block bandwidth between the third mode and the fourth mode.
11. The apparatus according to claim 10, wherein the controller is further configured to utilize different resource element disposition configurations between the third mode and the fourth mode.
12. The apparatus according to claim 9, wherein the controller is further configured to utilize a same number of subcarriers per resource block between the third mode and the fourth mode.
13. The apparatus according to claim 12, wherein the controller is further configured to utilize different numbers of resource blocks per component carrier between the third mode and the fourth mode.
14. The apparatus according to claim 1, wherein in a first mode:
the controller is further configured to utilize one of the plurality of cells or the plurality of component carriers in carrier aggregation to align a plurality of boundaries between one of different cells of the plurality of cells or different component carriers of the plurality of component carriers in the time direction, and
the transmission of the complex symbol sequence is based on the symbol interval that is narrower than the Nyquist interval.
15. The apparatus according to claim 1, wherein
the controller is further configured to utilize one of the plurality of cells or the plurality of component carriers in carrier aggregation to exclude one of a set of cells of the plurality of cells or a set of component carriers of the plurality of component carriers from a combination of the carrier aggregation based on one of the narrowing amount of the symbol interval or the narrowing amount of the subcarrier interval differs between one of the plurality of cells or the plurality of component carriers,
one of a plurality of boundaries in the time direction or a plurality of boundaries in the frequency direction are unsynchronized in one of a first mode or a third mode, in the first mode, the transmission of the complex symbol sequence is based on the symbol interval that is narrower than the Nyquist interval, and in the third mode, the transmission of the complex symbol sequence is based on the subcarrier interval that is narrower than the Nyquist interval.

16. The apparatus according to claim 1, wherein the controller is further configured to utilize one of the plurality of cells or the plurality of component carriers in dual-connectivity.

17. The apparatus according to claim 1, wherein in a first mode:
the controller is further configured to set the narrowing amount of the symbol interval at a boundary in the time direction different from the narrowing amount of the symbol interval at a region other than the boundary,
the transmission of the complex symbol sequence is based on the symbol interval that is narrower than the Nyquist interval.

18. The apparatus according to claim 17, wherein the controller is further configured to maintain the set narrowing amount of the symbol interval at the boundary in the time direction.

19. A method, comprising:
generating, by a controller of an apparatus, a complex symbol sequence based on a bit sequence;
transmitting, by a radio communication interface of the apparatus, the complex symbol sequence via radio communication;
setting, by the controller, a symbol interval of the complex symbol sequence and a subcarrier interval of the complex symbol sequence based on a specific condition;
controlling, by the controller, the transmission of the complex symbol sequence from the radio communication interface to a terminal based on at least one of the symbol interval of the complex symbol sequence in a time direction or the subcarrier interval of the complex symbol sequence in a frequency direction is narrower than a Nyquist interval; and
setting, by the controller, one of a narrowing amount of the symbol interval or a narrowing amount of the subcarrier interval for one of each cell or each component carrier based on information associated with a signaling operation of a higher layer of the apparatus.

* * * * *